United States Patent [19]

Schuler

[11] Patent Number: 5,517,320

[45] Date of Patent: * May 14, 1996

[54] ANALOG/DIGITAL VIDEO AND AUDIO PICTURE COMPOSITION APPARATUS AND METHOD FOR VIDEO COMPOSITION

[75] Inventor: Chester L. Schuler, Sudbury, Mass.

[73] Assignee: LEX Computer and Management Corporation, Keene, N.H.

[ * ] Notice: The portion of the term of this patent subsequent to Dec. 22, 2002, has been disclaimed.

[21] Appl. No.: 215,420

[22] Filed: Mar. 21, 1994

Related U.S. Application Data

[60] Division of Ser. No. 709,985, Jun. 4, 1991, which is a continuation-in-part of Ser. No. 556,539, Dec. 2, 1983, which is a continuation-in-part of Ser. No. 452,287, Dec. 22, 1982, Pat. No. 4,538,188.

[51] Int. Cl.$^6$ ............................... H04N 5/76; H04N 5/78
[52] U.S. Cl. .......................................... 358/335; 360/33.1
[58] Field of Search ........................ 358/335; 360/14.1, 360/14.2, 14.3, 33.1, 72.2; 369/83; 348/565; H04N 5/76, 5/78, 5/781, 5/782, 5/783, 5/92

[56] References Cited

U.S. PATENT DOCUMENTS

| | | |
|---|---|---|
| 2,832,840 | 4/1958 | Morin . |
| 2,927,154 | 3/1960 | Wolfe et al. . |
| 3,037,073 | 5/1962 | Roizen et al. . |
| 3,084,215 | 4/1963 | Bounsall . |
| 3,123,668 | 3/1964 | Silva . |
| 3,125,632 | 3/1964 | Sweet . |
| 3,342,949 | 9/1967 | Wessels . |
| 3,541,271 | 11/1970 | Joslow et al. . |
| 3,575,552 | 4/1971 | Grant et al. . |
| 3,644,683 | 2/1972 | Braun . |
| 3,721,757 | 3/1973 | Ettlinger . |
| 3,740,463 | 6/1973 | Youngstrom et al. . |
| 3,748,381 | 7/1973 | Strobele et al. . |
| 3,753,240 | 8/1973 | Merwin . |
| 3,787,617 | 1/1974 | Fiori . |
| 3,824,336 | 7/1974 | Gould et al. . |
| 3,925,815 | 12/1975 | Lemelson . |
| 3,939,490 | 2/1976 | Opelt . |
| 4,001,882 | 1/1977 | Fiori et al. . |
| 4,040,098 | 8/1977 | Beeson et al. . |
| 4,067,049 | 1/1978 | Kelly et al. . |
| 4,100,607 | 7/1978 | Skinner . |
| 4,115,819 | 9/1978 | Shigeta . |
| 4,136,936 | 1/1979 | Roe . |
| 4,152,053 | 5/1979 | Menary . |

(List continued on next page.)

*Primary Examiner*—Thai Q. Tran
*Attorney, Agent, or Firm*—Weiner, Carrier & Burt; William F. Esser; Irving M. Weiner

[57] ABSTRACT

A video composition apparatus and method select segments from image source material stored on at least one storage media (either random access and/or serial access) and denote serially connected sequences of the segments to thereby form a composition sequence. The apparatus and method employ a pictorial labels associated with each frame of image source material, and also associates at least one of such labels with each segment for ease of manipulating the segments to form the composition sequence. The labels are displayed on a plurality of ordered spatial arrays of display monitors to simulate the temporal relationship between the segments in what is typically a "snapshot" non-temporal display. The composition control function is highly user interactive and responds to user commands for selectively displaying segments from the source material on a pictorial display. The control function allows the user to denote a start and end of each of a plurality of selected segments to form defined segments, identify each selected segment by a pictorial image segment label which is displayed as described above, and assemble the selected and defined segments, and the corresponding labels, into a serially connected image sequence and a serially connected label sequence corresponding to the image sequence. The composition mode of operation employs continuous looping of the display segment(s) to aid the composing process.

15 Claims, 28 Drawing Sheets

U.S. PATENT DOCUMENTS

| | | |
|---|---|---|
| 4,161,001 | 7/1975 | Sakamoto . |
| 4,179,712 | 12/1979 | Opelt . |
| 4,195,317 | 3/1980 | Stratton . |
| 4,210,785 | 7/1980 | Huber et al. . |
| 4,210,939 | 7/1980 | Ninomiya et al. . |
| 4,210,940 | 7/1980 | Prysby et al. . |
| 4,213,163 | 7/1980 | Lemelson . |
| 4,214,278 | 7/1980 | Hunt et al. . |
| 4,224,644 | 9/1980 | Lewis et al. . |
| 4,272,790 | 6/1981 | Bates . |
| 4,283,745 | 8/1981 | Kuper et al. . |
| 4,321,635 | 3/1982 | Tsuyuguchi . |
| 4,403,259 | 9/1983 | Masaki . |
| 4,516,166 | 5/1985 | Tellone . |
| 4,538,188 | 8/1985 | Barker et al. . |
| 4,612,569 | 9/1986 | Ichinose . |
| 4,685,003 | 8/1987 | Westland . |
| 4,754,342 | 6/1988 | Duffy . |
| 4,774,600 | 9/1988 | Baumeister . |
| 4,777,539 | 10/1988 | Nomura . |
| 5,144,438 | 9/1992 | Kim ......... 348/565 |

ANALOG/DIGITAL VIDEO AND AUDIO PICTURE COMPOSITION APPARATUS AND METHOD FOR VIDEO COMPOSITION

CROSS REFERENCES TO RELATED APPLICATIONS

This is a divisional of application Ser. No. 709,985 filed Jun. 4, 1991, which in turn is a Continuation-In-Part of application Ser. No. 556,539 filed Dec. 2, 1983, which in turn is a Continuation-In-Part of application Ser. No. 452,287 filed Dec. 22, 1982 now U.S. Pat. No. 4,538,188.

BACKGROUND OF THE INVENTION

1. Field of the Invention

This invention relates generally to an apparatus and method for composing visual source material. In particular, the invention provides an apparatus and method for dynamically composing stored source material for producing a composition sequence, the electronic data necessary to form the composition sequence, or edited output.

Over the past two decades, video tape has substantially replaced the traditional photographic, e.g. silver halide, and other "non-electronic" film as the preferred media on which to film or compose a movie, news, or other program material. The increasing use of video tape has occurred despite certain inherent limitations associated with video tape in comparison with traditional film. Video tape, like a developed photographic film, is inherently a "serial access" medium; however an editor is unable to "see" the images on the video tape medium. The video editor must instead rely upon electronic apparatus to read and view the images and to compose them to produce an edited product. To the contrary, the film editor is able to have "hands-on" access to the film and can directly view the visual scenes thereon. The film editor can cut and splice the film in the editing room.

The departure from film to video tape has dampened creative talents in some respects, in that the director is no longer able to apply subjective talents directly to the program medium. Instead, intermediate technically-skilled operating personnel are employed to control the electronic composing process, taking orders from the director. The orders are in terms of data, e.g., alphanumeric addresses of different taped sequences, rather than in terms of visual images.

The intermediate personnel thus perform the real hands-on manipulation of the video tape in an abstract environment of alphanumeric information and work with bays of switches on a complex control panel. The director's feel for the composition process is diminished, and the composing process is, as a consequence, slow and tedious, with lessened subjective interaction.

It is also known that one advantage to composing film media is the ability to react to the temporal nature of the media. Edited film can be browsed back and forth, picked up and viewed, like a book, and physically spliced. These advantages do not yet exist in present day video composing equipment.

Therefore, primary objects of the invention are increasing the throughput in the composing of video source material, lessening or even removing the need for intermediate personnel so that the director is closer and more involved in the composing process, and solving the time-space problem inherent in video tape composition. Other objects of the invention are a flexible composition apparatus and method, and a reliable and user-friendly apparatus and method that can be employed directly, or indirectly, to create automatically a final edited master. Other objects of the invention will in part be obvious and will in part appear hereinafter.

SUMMARY OF THE INVENTION

Stated broadly, the invention proved equipment and methods for processing image information with improved human interaction. In a preferred practice of the invention, the image information is video images, as conventionally recorded and stored with electronic signals. The equipment and method have many applications.

In one aspect, the video processing equipment according to the invention makes is possible for an operator to scan visually through a vast library of stored video images with greater speed and control than previously possible. This new search capability which the invention provides has many uses. An illustrative one is for a news service to search a video data base for film clips of a subject that has suddenly become newsworthy.

Another aspect of video processing equipment according to the invention makes it possible for an operator to assemble a collection of video images into a program sequence, with a new degree of speed, facility and ease. An example of this use of the invention is to compose a television program from a collection of shots recorded at different times and/or from different sources.

In each application of the invention, the video source material is in the form of groups of frames, typically sequential, as results from filming a scene with a video camera. The groups of frames, referred to herein as segments, can be stored, when received by the equipment, in an unknown or an undesired order. The composition equipment enables an operator to search the sequences of video segments, examine them as desired, and to select portions of any sequences for sorting or reorderlag, for trimming, and for introducing. different transitions from one segment to another—all with human ease, responsiveness, and subjective interaction akin to that of a skilled driver of a performance automobile.

Equipment according the invention generally employs any appropriate electronic storage means for storing two or more duplicate counterparts of the video source material. The equipment also has several monitors and/or a single monitor with windows therein on which the video source material and video labels can be displayed for operator viewing. Appropriate electronic storage means include serial storage means such as a bank of video tape recorders (VTR), random access storage means such as Winchester hard disk drive, laser read/write digital discs and large computer RAMs, and static storage means such as a bubble memory and crystal memory. A video label is, in the context of this invention, a representation derived from a frame of source material. A typical label is a low resolution digital representation of a high resolution source image. Such a label can be electronically stored and accessed at high speeds, yet when viewed by an operator, the label provides nearly the same information as the corresponding high resolution source material.

In one illustrative embodiment of this equipment, there is a first, main monitor or screen on which a selected sequence or other video segment can be repeatedly displayed, as if recorded on an endless loop. A set of secondary monitors or screens can display selected scenes of a video sequence, typically of the sequence being displayed on the main monitor. In addition, there preferably is at least one pair of linear arrays of passive display monitors or screens. In each pair, one array is positioned above the other so that each monitor or screen of the upper array is paired with, and aligned above, a monitor or screen of the lower array; and each such array pair pertains to one temporal sequence representation or to one bin, as discussed further hereinbelow.

In another illustrative embodiment of this invention, there is a single large monitor or primary display screen, the monitor exhibits main, secondary and passive display "windows" provided therein.

An operator standing or sitting before this video display system controls it with two sets of controls, one for each hand. Each control set has a cluster of finger switches, e.g., push-buttons, arranged with a large wheel for tactile operation with the minimal hand movement.

In general operation, the illustrated embodiment of this equipment can include operating modes termed "output", "sort", "trim" and "splice". An operator enters video source material into the equipment, i.e. stores it on the appropriate electronic storage means with the input mode. The operator can view the video images, typically on the main monitor or screen, as they are being entered. The operator generally controls the equipment to prepare and store label pairs of the source material as it is being entered. Preferably, the equipment will automatically digitize a label for each incoming video frame so that subsequent video compositions steps can be performed very rapdily, i.e., without pauses or interruptions. Alternatively, if memory is limited, it is possible to digitize labels for less than all the incoming video frames. For example, label pairs can be operator selected incoming video frames, or can be automatically selected by the equipment on a repeating basis, e.g., every thirtieth input frame. Each label includes information identifying the corresponding segment of source material, preferably identifying an address where that segment is stored in electronic storage means.

In the illustrated sort mode of operation, an operator assembles selected label pairs, representing stored video source material, in a desired program sequence. The sequence of the label pairs is independent of the sequence according to which the source material is stored in the equipment.

More particularly, in this sort mode, an operator can select one or more labels representing any stored video segment and place it in selected sequence with one or more labels representing another video segment. Further, the operator can rearrange the sequence of the selected labels. In one use of the equipment, the operator selects a label pair and the video segment which it represents is then displayed with continuous repetition on the main monitor or screen while the labels for that segment are displayed on the secondary monitors (or screens).

In the trim mode, the operator can shorten or lengthen any selected segment as it is being repeatedly displayed on the main monitor or screen. The secondary monitors or screen in this mode of operation display labels representing the first and last frames of the "trimmed" segment.

When the operator has assembled two or more selected and sequentially ordered and trimmed segments in this manner, the beginning and ending labels of each trimmed segment can be displayed on one set of the passive monitors or screens, in the selected sequence. Further, the operator can collapse two or more of such sorted segments if they are contiguous and represent, as a single label pair displayed on the passive monitors or screens, the plural segments forming the collapsed group.

An operator uses the splice mode of operation to edit the transition between sorted video segments. The equipment in one embodiment of the invention enables the operator to control the length of a transition, the type of transition, the starting and stopping points of the transition, and the number of frames over which the transition occurs.

The above and further objects, details and advantages of the present invention will become apparent from the following detailed description of preferred embodiments thereof, when read in conjunction with the accompanying drawings.

BRIEF DESCRIPTION OF THE DRAWINGS

FIG. 3A illustrates a plan view of a typical console of the second embodiment as shown in FIG. 1A.

DETAILED DESCRIPTION OF THE PREFERRED EMBODIMENTS

General Description of the Apparatus

The illustrated embodiment of the invention is directed to composing image source material stored in an electronic memory medium, for example, video tape used in conjunction with a video tape machine, to produce a sequential grouping of segments making up a program or story. In some applications, composition can, but need not, further include the editing function of creating a final edited master. Typically, the image source material either is derived from already existing, production quality video tape(s) or is provided, in real time, from one or more external sources, such as cameras, for recording on video tape.

In its standard format, the video signal has a plurality of frames, each frame having two fields. The video is displayed for normal viewing at a rate of thirty frames per second. When the video tape is prepared, the recording device associates with each field a specific address or identification tag. The address is typically written in accordance with the SMPTE time code, a standard used throughout the television industry. Thus, irrespective of the source of the video material, there is associated with each field of the recorded signal, a unique address or location which is read when the field is read or otherwise retrieved.

Figure 1:
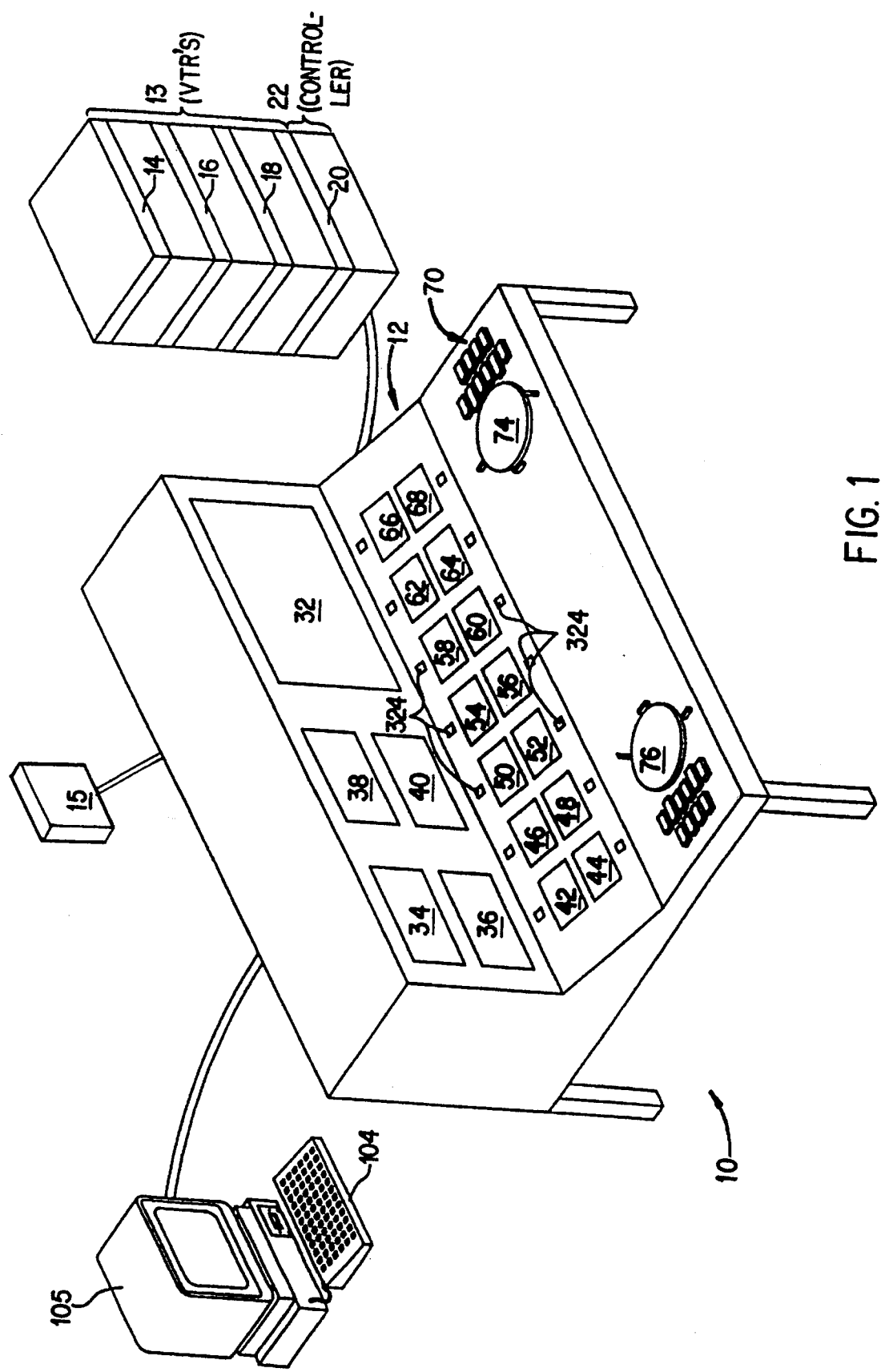
FIG. 1 illustrates a perspective view of the composing apparatus in accordance with the present invention.

Referring to FIG. 1, the video composition apparatus 10 comprises a control console 12 from which an operator/editor controls the operation of the apparatus and provides the composing instructions which enable the system to prepare a listing of video segments to be serially connected to form a finished composition sequence. As used herein, "segment" refers to a sequence of frames. The frame sequence may form a shot, a scene (a sequence of shots), a picture sector (a sequence of scenes), a program or story (a sequence of picture sectors), or any other desired grouping of frames.

Figure 2:
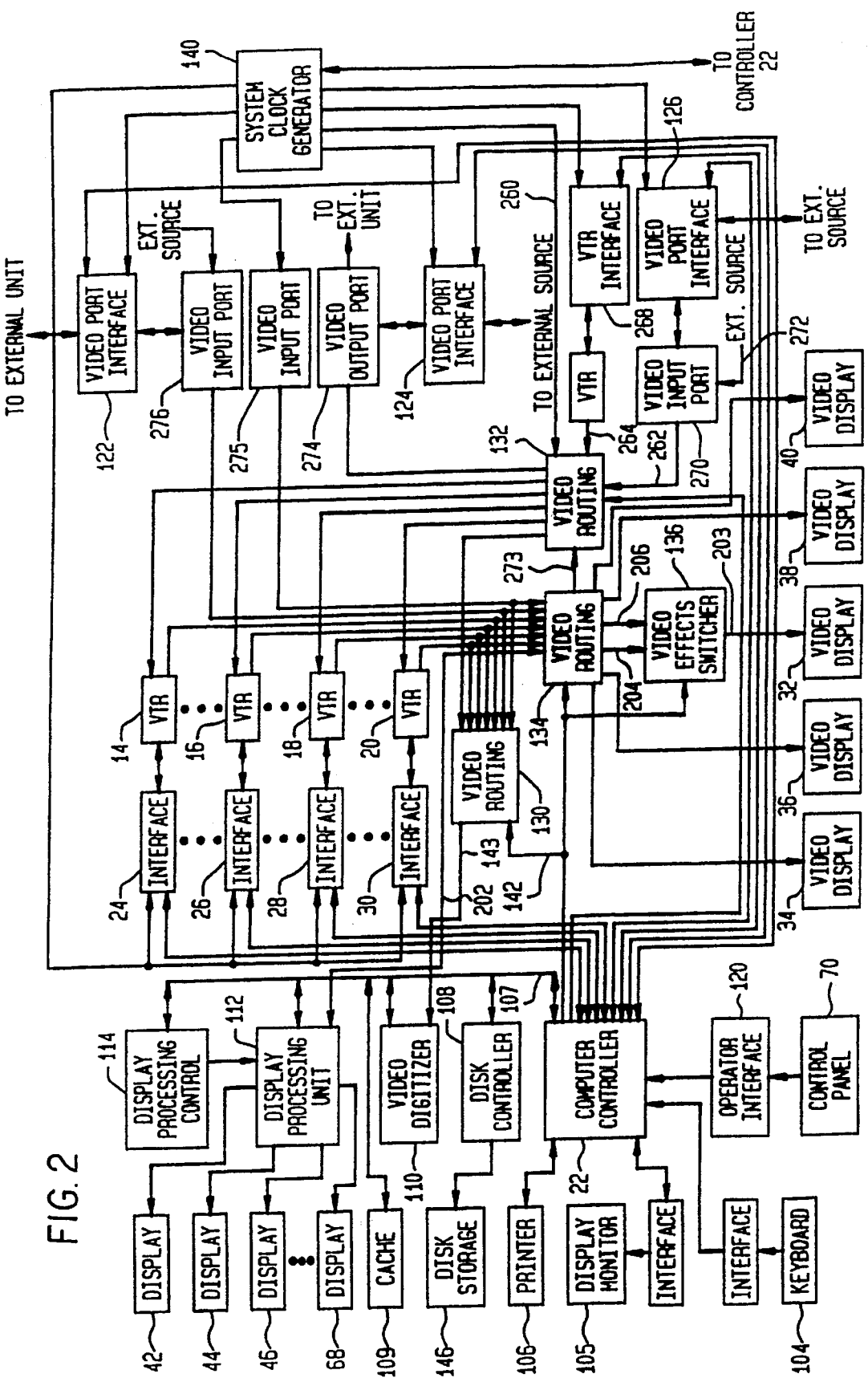
FIG. 2 illustrates a detailed schematic block diagram of the electrical circuitry according to the invention.

According to the illustrated embodiment of the invention, the system may employ a plurality of serial storage media 13 and/or an appropriate random access storage means or static storage means as indicated at 15. In the illustrated embodiment, the serial storage media comprise video tape recorders (VTR's) such as those commercially sold and manufactured by Sony Corporation under model No. 2500 while the storage means is preferably one or more Winchester hard disk drives and/or Laser read/write disks. This VTR operates according to a Beta II or Beta III tape format, has multiple heads for both a simultaneous recording and retrieval, provides a times-two and a times-ten or times-fifteen speed control, a frame freeze for both forward and reverse modes, and allows significant remote control capability. Referring also to FIG. 2, the illustrated VTR's, labeled 14, 16, 18, and 20, interface with a computer/controller 22 through respective recorder interfaces 24, 26, 28, and 30. While only four VTR's and one storage disk 15 are shown in the figures, it is contemplated that the system 10 will include up to twenty-two or more VTR's and/or several storage disk 15's to accomplish the many functions and provide the many features to be described hereinafter. For purposes of simplicity in the drawing, more VTR's have not been shown but have been indicated by the plurality of dots between the various recorders 14, 16; and 16, 18; and 18, 20. If Winchester hard disks and/or Laser read/write disks are used as the random access storage means 15, input video frames are digitized and compressed before they are transferred onto the storage disks for later retrieval decompression and display.

Figure 3:
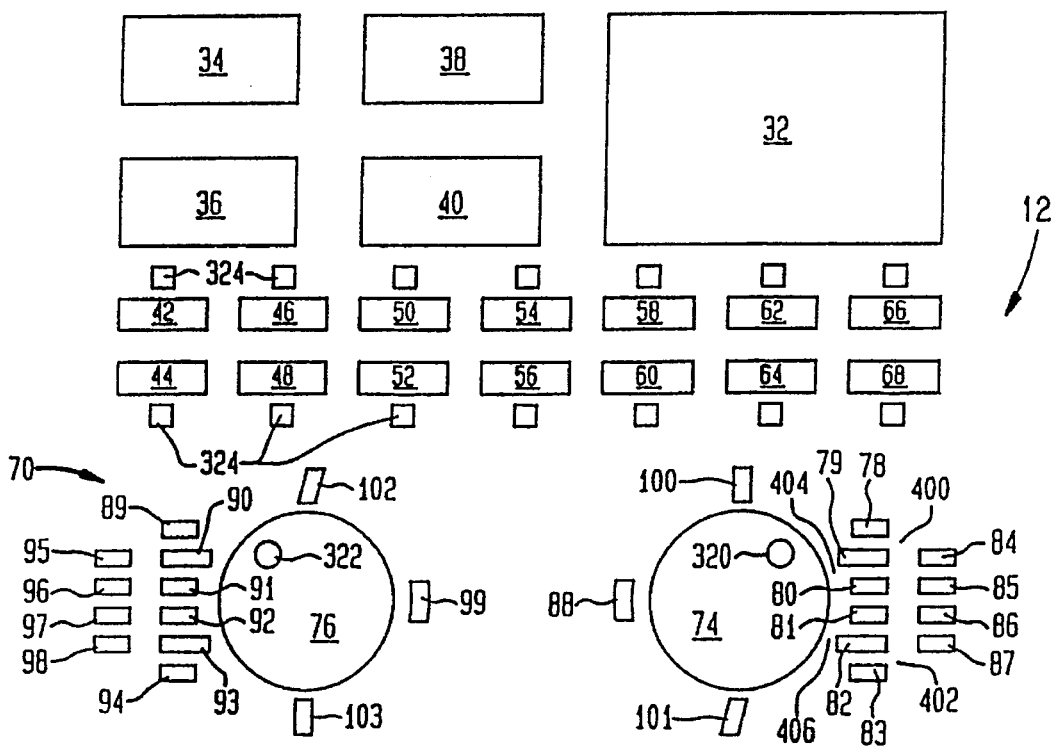
FIGS. 3A and 3B illustrate a detailed plan view of a typical console according to the invention.

The control of the apparatus depends upon the man-machine interaction available from the control console 12. Referring to FIGS. 1 and 3, the control console includes a large main display screen 32 flanked by a plurality of smaller display screens 34, 36, 38, and 40. There are further provided a plurality of yet smaller label display screens 42, 44, 46, . . . , 68, arranged in a two row ordered array. Below the label display screens is a manual control panel 70 which includes a right hand control wheel 74 and a left hand control wheel 76. Adjacent the control wheels are a number of control keys 78, 79, 80, . . . , 99, and levers 100, 101, 102, 103 whose functions are described in greater detail below.

Figure 1A:
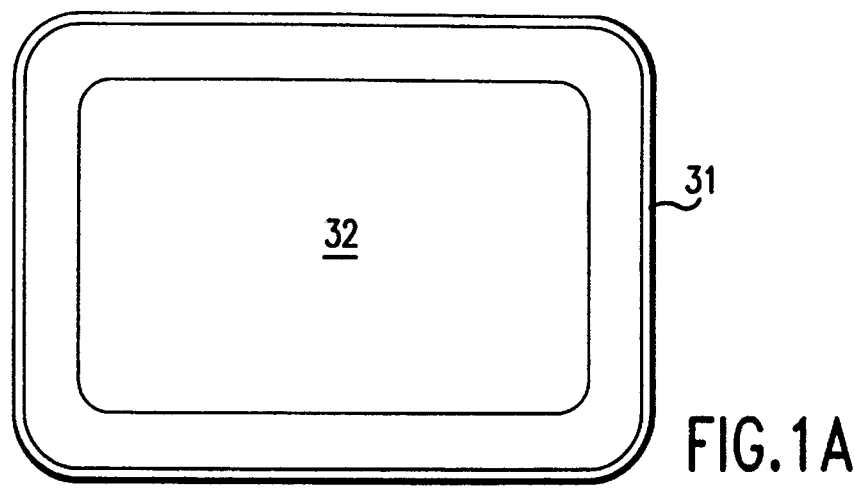
FIGS. 1A, 1B and 1C illustrate a second embodiment of the composing apparatus shown in FIG. 1.
Figure 1B:
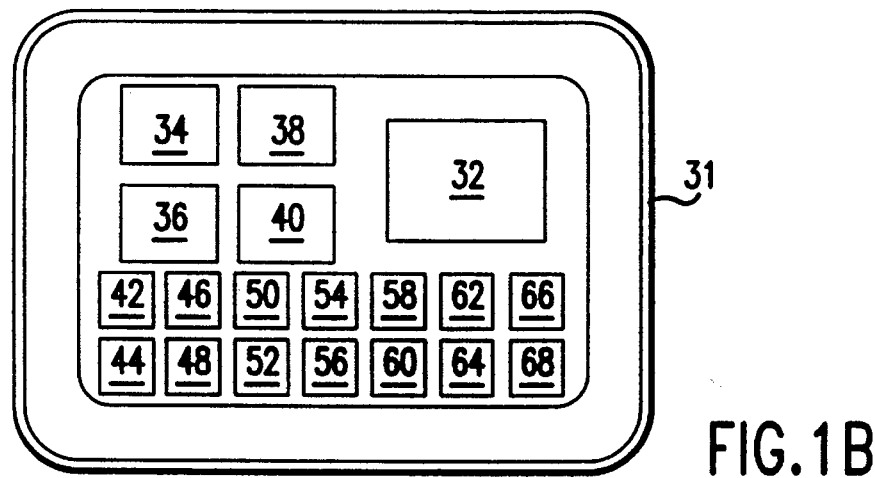
Figure 1C:
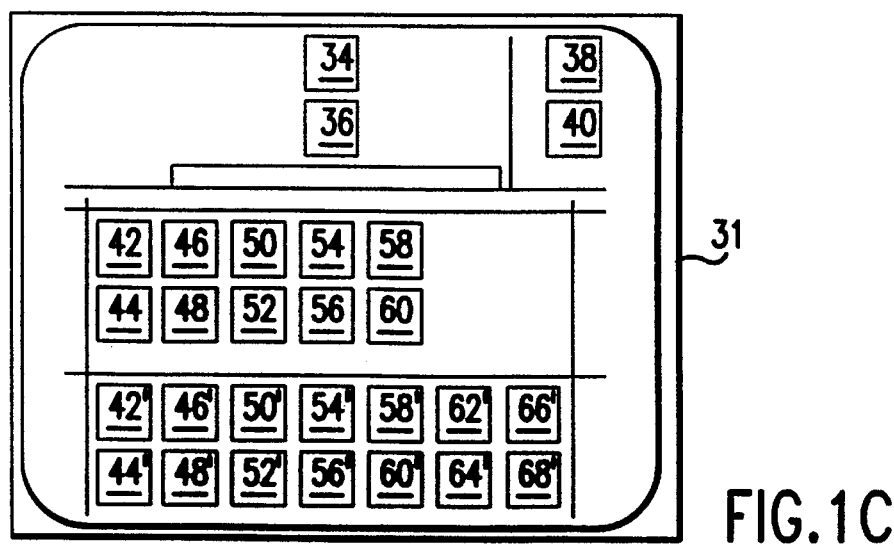

A further embodiment of the apparatus best seen in FIG. 1A includes a large segment-type display monitor 31 capable of accommodating, as "windows" or screens within the monitor 31, the main display screen 32, smaller display screens 34, 36, 38, 40 and label display screens 42, 44, 46 . . . , 68, arranged similar to that shown in FIG. 1 in an ordered spatial array. This "segmented screen" approach permits the user to view all the screens in one glance since the screens are not spread out over a great distance. Further screens 42', 44', 46', . . . , 68', may be exhibited in a similar array. A further advantage of the segmented screen is that a single display processor 114' (best seen in FIG. 4A) is required. In addition, a larger number of "windows" are available permitting the user/editor to view multiple bins and select the "active" bin as discussed further hereinbelow.

The apparatus 10 also has a keyboard unit 104 having a simplified typewriter keyboard for entering alphanumeric information into the computer/controller 22 and for responding to requests for information or instructions which appear on a display screen monitor 105. In the illustrated embodiment of the invention, the typewriter keyboard and monitor are housed apart from console 12, although the monitor and keyboard could also be integrated with the console 12 as described in U.S. Pat. No. 4,538,188. The preferred and described layout of the control console 12 can be changed in accordance with the needs of the particular application. Thus, other applications can require a different arrangement of the components and/or different numbers of display screens or other controls.

The apparatus is heavily user interactive. From the control panel 70 the operator/editor can effect substantially any operating mode which is required for composing a video program from one or more available sources. As noted above, the scenes recorded on a storage medium such as video tape are made up of a sequence of frames, each frame being composed of two interlaced television fields. The composition apparatus 10, in the illustrated embodiments is capable of operating upon the frames forming the source video at any of a number of operating levels. According to the preferred embodiment of the invention, each operating level can be viewed as a "bin". Each bin contains a plurality of segments displayed as groups of label pairs, and each class of bins has a separate and distinct purpose. For example, at the lowest or most elementary level, there is a "source bin". The source bin represents the operating level at which source material is read by and stored in the apparatus. At another operating level, there exists a "discard bin." The discard bin, as its name implies, contains those segments which, while once belonging in the source bin, have been "discarded" and removed, for example from source bin. The "discarded" segments can be later retrieved, if desired, as described in more detail below.

Another operating level, the so-called "select bin", acts like a temporary scratch pad memory in which the apparatus stores segments on a last in, first our (LIFO) basis. The select bin operating level is useful for moving segments from, for example, the source bin to, for example, a higher level bin. The higher level bins, of which there are four according to the illustrated embodiment, are "program bins". It is at the program bin operating level that program material is sorted, trimmed, and spliced.

In an alternate embodiment of the invention, by way of further example, the operating levels can be designed according to a completely different philosophy. According to one alternate operating method, at the lowest or most elementary level (the zero level), the apparatus can operate upon predetermined segments of $m^n$ frames where n, an integer, represents the operational level (level "1", level "2", etc.) and m is an arbitrary integer greater than 1. For example, if m equals seven, level one operates upon segments of seven frames, level two upon segments of forty-nine frames, etc.

A predetermined segment, however, will not generally correspond to a shot, a scene, etc. Therefore, the apparatus has the further capability, in this alternate operating level embodiment, of allowing the operator to designate segments of connected frames. At the operator designated levels of operation, the frames, when sequentially connected together, in the most elementary sense, form "shots" (analogous to film clips). A plurality of shots (or clips) can be spliced together for forming a video sector. Correspondingly, a plurality of video sectors together forms an entire program or story. In this alternate embodiment of the invention, the apparatus operates at any of the levels of shot, scene, or sector as well as at predetermined levels "0", "1", "2", and "3" described above. Thus depending upon the level of operation selected, in the alternate embodiment, the apparatus can operate upon either individual frames (level 0), a predetermined group of frames (levels 1, 2, and 3), or at the shot level (level 4), the scene level (level 5), or the sector level (level 6).

Referring again to the preferred and illustrated embodiments of the invention, source material read into the source bin, can have segments (or clips) marked off (but not physically divided) in a number of ways. The segments can be designated by, for example, regular sampling, wherein a segment is marked with labels extracted at a repeating predetermined time duration such as one second. Another method employed, according to the invention, for marking off source video into segments, relies upon an operator actuated control panel key which enables the operator to mark off the incoming source material into segments by marking preliminary decisions on-the-fly. Still further, a label may automatically be digitized for each incoming video frame, and the operator is then free to create or designate a desired segment by selecting the appropriate beginning and ending labels (label pair) for the segment during editing procedures.

In each instance, the composition apparatus 10 uses pictorial labels to designate each segment (or a sequence of frames) of the video material being composed. Thus, instead of forcing the user to manually identify and record a video segment by either the SMPTE time codes or another artificial determination, one or more fields or frames of the segment (preferably digitized frames together with their machine retrievable SMPTE address codes), are employed to pictorially "label" the segment. The labels can be, as described below, the frames at the beginning and the end of the segment. In other circumstances, the labels can be near the beginning and the end of the segment, or elsewhere.

Furthermore, more than one label can be used for a segment. In the illustrated embodiment of the invention, two labels are used, one pictorial label corresponding to the frame at the beginning of the segment and a second pictorial label corresponding to the frame at the end of the segment. (Alternately, one label can be employed during an initial "rough cut" and two labels can be used for the later composition work.) As the segments are assembled, in a desired order as described hereinafter, the labels corresponding to the segments are similarly ordered.

In the illustrated embodiments of the invention the display screens 42, 44, 46, . . . , 68 are designated "passive displays" and are generally employed for presenting a spatial display of the label pairs associated with a sequence of segments, one vertical pair of display screens showing the beginning label (top display) and the ending label (bottom display) of a segment. The video segment associated with a selected one of the label pairs, designated by a control cursor, will typically be displayed on the main screen or "active display" 32. The beginning and ending labels of the segment being displayed on the active display 32 will typically be displayed on various ones of screens 34, 36, 38, 40 depending upon the mode of operation as described below.

In the first embodiment, if the control cursor, the location of which is indicated by illumination elements 324 and controlled by lever 100, (FIG. 3), were set to the center screen pair of the passive displays, that is, to displays 54, 56, the segment corresponding to displays 54, 56 will generally be displayed on the main screen 32. Further, the apparatus displays pictorial label pairs corresponding to the just preceding three earlier segments on the three preceding vertical display screen pairs, i.e., display pairs 42, 44, 46, 48; and 50, 52. Similarly, the pictorial label pairs corresponding to the next succeeding three occurring segments are presented on passive display screens 58, 60; 62, 64; and 66, 68. Thereby, the control console provides a spatial display corresponding to the temporal image presentation. This snapshot-type multiple label display enables the user to maintain in temporal perspective, where the presently displayed segment on screen 32 "fits" in the segment sequence. The second embodiment of the apparatus shown in FIG. 1A would operate in a similar manner absent the elements 324. Additionally, it is possible to have more than two horizontal rows of the passive display screens as windows in monitor 31 (best seen in the bottom diagram of FIG. 1A), which includes a plurality of pairs of rows of passive display screens. Where more than one pair of rows of the passive display windows is employed, it is possible that each pair of rows will pertain to a different temporal image presentation. For example, in the bottom diagram of FIG. 1A, the pair of rows including screens 42, 44, 46 . . . 60 would pertain to a temporal image presentation associated with the image shown in windows 32, 34, 36, 38, 40, while the pairs of rows including screens 42', 44', 46'. . . 68' would pertain to a different temporal image display.

Figure 2A:
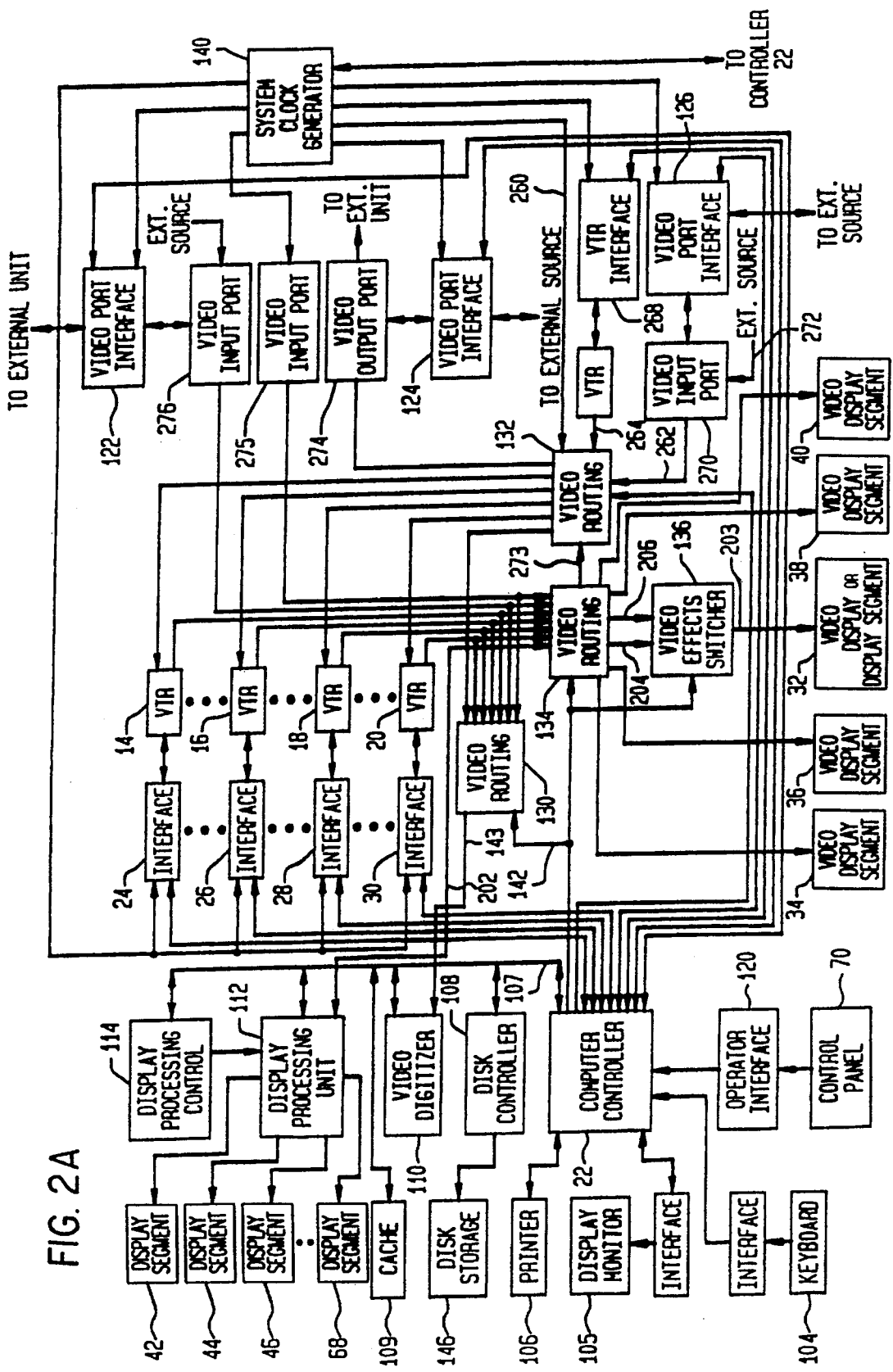
FIG. 2A illustrates a second embodiment of the block diagram of FIG. 2.

Referring now to FIGS. 2 and 2A, the communications and data management center of the apparatus is the composing computer/controller 22. The computer/controller has a central processing unit. Associated with the controller 22 is a printer 106, preferably a laser printer such as HP Laserjet. The controller 22 further has a digital data bus 107 for transmitting digital data between the computer, a disk controller 108, a picture cache memory 109, a video digitizer 110, a display processing unit 112, and a display processing control 114. As best seen in FIG. 4A, the segmented screen embodiment utilizing screen 31 requires a digital data bus 107' interconnected with a display processing control for segmented screen 114'. The controller 22 is further adapted to receive inputs from the control panel 70 through an interface unit 120. As noted above, the controller 22 is in direct communication with the various VTR interfaces 24, 26, 28 and 30 and well as with video port interfaces 122, 124, and 126. (Interfaces 122, 124 and 126 operate in response to controller 22 for controlling external video equipment, for example external VTR's). The controller 22 also operates video routing circuitry 130, 132, and 134, and a video effects switching circuit 136. Preferably, the controller 22 operates with a system clock generator 140 for system signal synchronization.

According to the illustrated embodiments, at the beginning of a composing session, controller 22 operates in a default mode, which is an automatic segmenting mode, for dividing "raw video" source material into plural segments. The illustrated apparatus is thus designed to effect a segmentation of the source material according to a predetermined method and sequence. This segmentation process is described above as a periodic sampling process. On the other hand, as noted above, it is also desirable for the operator to review the source material quickly and roughly and indicate his initial feel for the divisions between segments. This operator controlled segmentation function can be implemented in any arbitrary manner, and is described in detail below. In either segmentation mode, it is preferred that the system will digitize a label for each incoming video frame.

Controller 22 is further responsive to the operator console for providing a storyboard output to printer 106. The storyboard output includes a sequence of labels, generally at a program bin level, which describes the flow of the story. In addition, if textual material had been entered from the keyboard 104 with respect to any segment label, the material is also printed on the storyboard. The operator/editor can then use the storyboard as a "hard copy" guide and aid during the composition process.

According to a related aspect of the invention, any source location of any input video frame (as stored on any of the possible storage means discussed above) can be associated with any computer file (in computer 105) containing information such as director's note, script line references, etc.

Passive Display Operation

Referring to FIGS. 2–7, in accordance with one embodiment of the invention, each passive display screen 42, 44, 46, . . . , 68 is provided as a 3.7 inch monitor on which a relatively low resolution, 128×120 picture element (pixel) raster is displayed. In the preferred embodiment of the invention best seen in FIG. 1A and 3A, the segment-type display monitor 31 is capable of exhibiting main display screen 32, smaller display screens 34, 36, 38, 40 and a plurality of yet smaller label display screens 42, 44, . . . , 68 arranged in two rows, and possibly additional display screens 42', 44', . . . 68'; 42", 44", . . . 68"; etc.

Referring again to FIG. 2, the digital display data, which represents the pictorial labels, is generated by the video digitizer 110 under control of the controller 22. Digitizer 110 receives analog video input data from video routing circuitry 130 over a line 143. The video digitizer, which includes a fast A-D converter and a two picture capacity random access memory, stores the digitized video, digitized to four bits, for later presentation over the digital bus either to the display processing unit 112, to the disk storage 146, or to the cache memory 109. Controller 22 controls the flow of digital data from the video digitizer, disk, or cache storage to the display processing unit and is capable of dynamically updating the pictorial labels displayed at the console 12 at a rapid rate, for example, twenty-four per second.

The digitizer 110, through its computer interface, receives instructions from controller 22 over the computer bus 107. The digitizer 110 is fast enough to grab a frame on-the-fly from an ongoing stream of video information over line 143. The interface can therefore be instructed by the controller 22, upon recognition of the time code location, to trigger upon recognition of the next vertical interval pulse, and the video or video segment associated therewith will then be digitized and stored. The frame time code is used by the apparatus to identify the frame. The digitizer can also digitize a frame displayed in the freeze mode of VTR operation, read its time code, and store the data for future use by the controller.

The video output from the video routing circuitry 130 to the video digitizer 110 is selected and dictated by the signal levels from the controller 22 over lines 142. The video routing circuitry 130 is an EXCLUSIVE OR routing circuitry which takes one of the video inputs (form the VTR's 14, . . . , 16, . . . , 18, . . . , 20, from video input ports 275, 276, and from routing circuit 132) and provides that selected input to the video digitizer over line 143. The selected video input signal can thus be digitized to become available to be displayed as pictorial label. The video input and frame selection process is at least partially controlled, as described below, by the operator/editor at control console 12.

Controller 22 has associated with its disk controller 108, the high speed disk storage device 146. Storage 146 can be employed, for example, to store a digitized label for each input video frame, or to store at least all labels of interest so that they can be output to the display processing unit 112 as needed. Since each illustrated passive display screen requires only eight kilobytes of information, the disk controller and disk storage are fully capable of changing all of the displays stored by the display processing unit 112 within a short time duration and therefore provide a great flexibility to operation of the pictorial label presentation.

Even though the disk controller 108 and disk storage 146 can operate with access speeds on the order of ten milliseconds, the retrieval of labels from different sections of the disk can result in a non-uniform rate of change for the passive displays 42, 44, 46, . . . , 68. The apparatus therefore employs the picture cache memory 109, a high speed solid state memory attached to the controller bus 107, for maintaining a fast uniform label change rate. The cache memory 109 typically has sufficient storage capacity for sixty label pairs and has an access time on the order of tens of micro-seconds which is significantly faster than the access time for disk storage 146. The cache memory 109 operates under the control of the controller 22 and receives new label pairs, as needed, from the disk storage 146 under control of controller 22.

Figure 4:
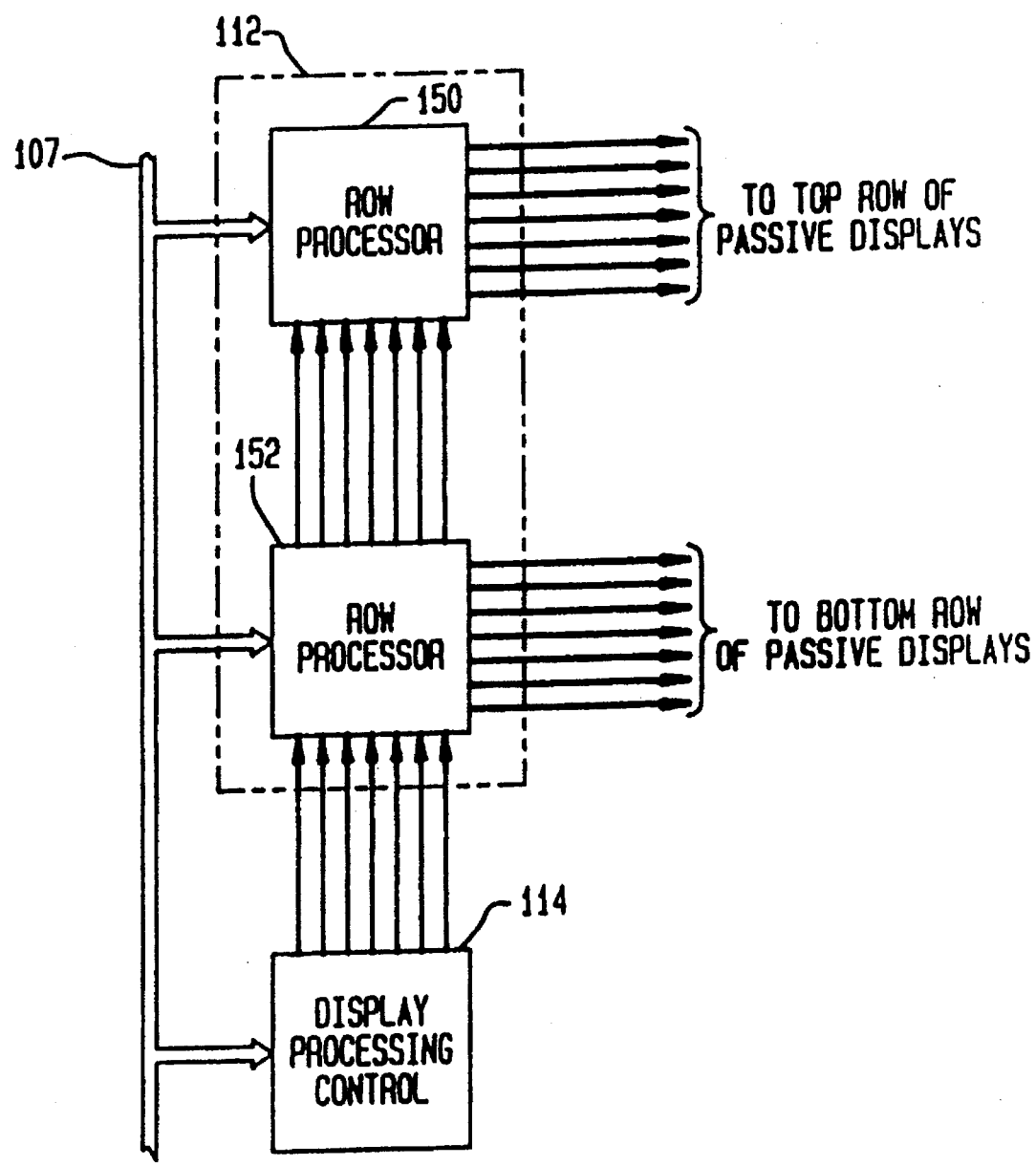
FIG. 4 illustrates an electrical block showing those elements used for the smooth scrolling display generation and control for the passive display screens.
Figure 4A:
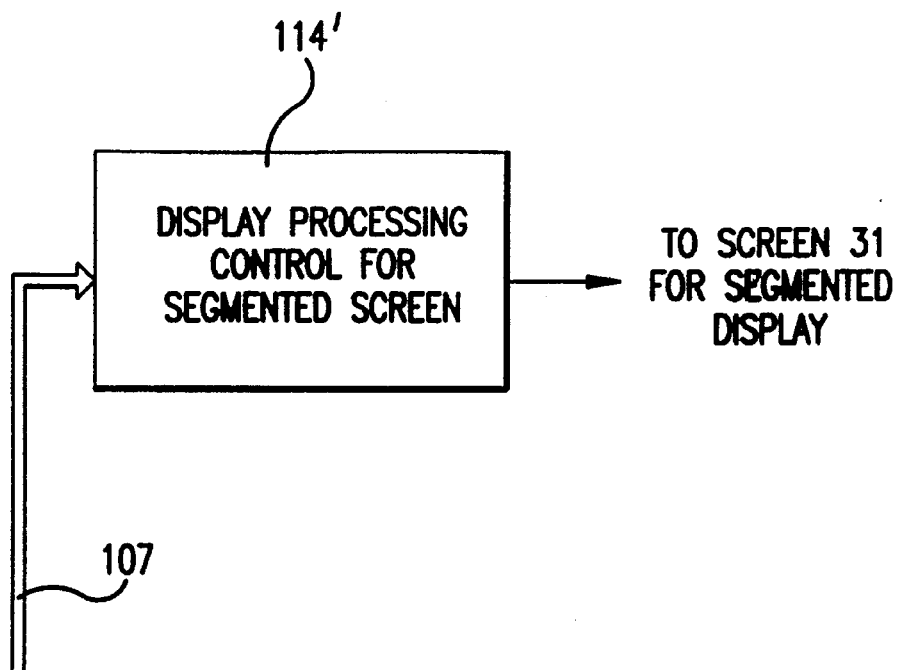
FIG. 4A illustrates an electrical block diagram in accordance with the second embodiment shown in FIG. 1A.

The display processing unit 112, referring in particular to FIG. 4, has two identical row processing circuits 150, 152 for driving, respectively, the top row of passive displays or screens and the bottom row of passive displays or screens. Each row processor 150, 152 connects to the data bus 107 and to the display processing control 114.

The row processors are described in detail in the parent application U.S. Ser. No. 556,539, filed Dec. 2, 1983 and shown in FIG. 5.

Figure 5:
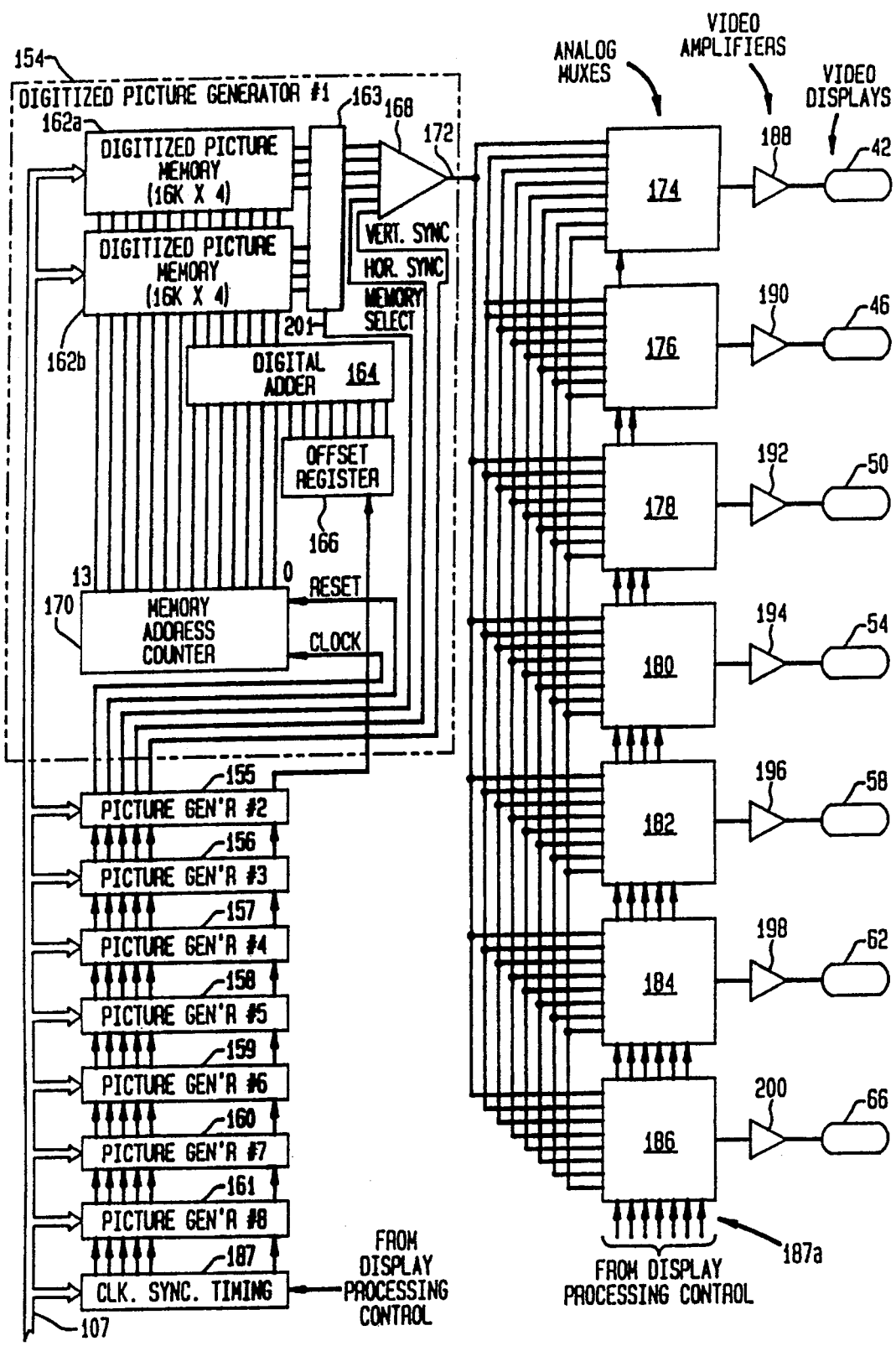
FIG. 5 illustrates a detailed electrical diagram showing the elements necessary for providing a smooth scroll of the video images across the passive display screens.
Figure 5A:
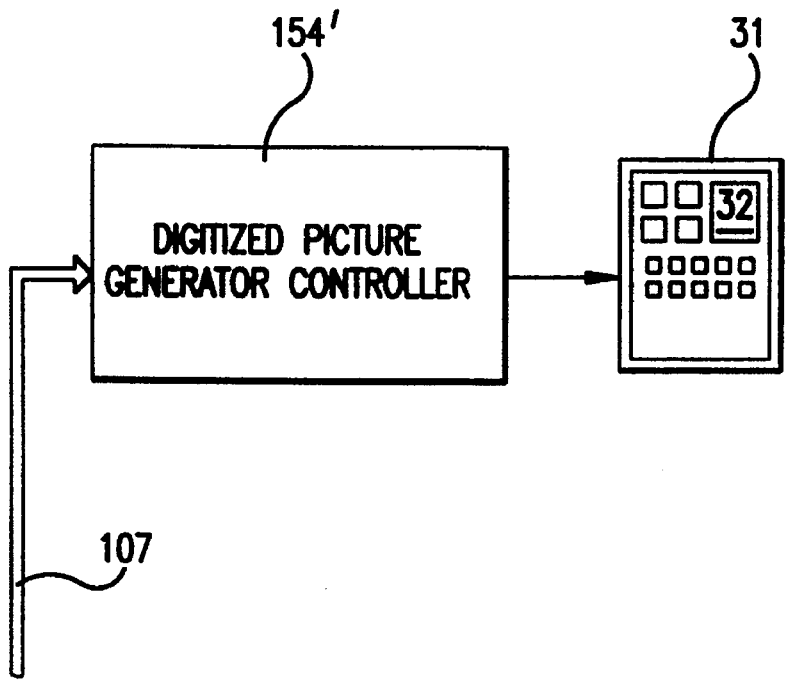
FIG. 5A illustrates an electrical diagram in accordance with the second embodiment shown in FIG. 1A.

The need for multiple row processors is eliminated with the second embodiment of the apparatus as best seen in FIG. 5A. Data bus 107 connects to a digitized picture generator controller 154'. The operation of the digitized picture generator controller 154' is similar to the operation of the row processors 154, and can be illustrated as follows.

Assume that video display 42, at the left edge of the upper row of passive display screens, is displaying a picture stored in picture generator controller 154'; that video display 46 is displaying a second picture stored in picture generator 154', and so on, so that video display 66 is displaying a picture stored in picture generator 154'. Assume now that in accordance with the operation of control wheel 74 (as will be described later) a new picture is to be shifted into the top row from the right, that is, scrolling (or picture shifting) is effected to the left. This is accomplished by directing the output of picture generator controller 154' to segment-type display monitor 31.

In this manner, a picture can be moved from one screen to another in what would appear to the viewer to be a relatively "jerky" instantaneous charge whereby all screens change simultaneously.

It has been found desirable, in connection with the passive display screens, to scroll the video "smoothly" (hereinafter referred to as "smooth scrolling") from one screen to the next. Smooth scrolling refers to that motion wherein it appears as though the pictures were frames of a continuous imaginary film strip which was moved, at a constant rate, behind openings corresponding to the passive display screens (in the described example, the film is moved to the left). Thus, as smooth scrolling occurs, for a spatial extent corresponding to one complete picture, there is a time duration during which image movement occurs to the left, and further during which a single picture image is split between two adjacent screens. In the example herein, the image disappears at the left edge of a display screen and appears at the right edge of the next adjacent screen (if any) to the left.

Smooth scrolling takes place in a sequence of eight or sixteen equal steps, each step lasting one television field (that is, one-sixtieth of a second). In other embodiments, greater or fewer steps can be used. The detailed discussion below relates to operation and control of the circuitry for video display screen 42. The other displays screens are controlled and operate in a similar fashion.

With reference to FIGS. 1 and 5, as previously set forth, smooth scrolling to the left, in sixteen equal steps, wherein, initially, screen 42 displays the picture stored in picture generator 154, screen 46 displays the picture stored in picture generator 155, . . . , and screen 66 displays the picture stored in generator 160. Initially screen 42 displays one complete video picture. Functionally, after the first "step" in the sixteen step smooth scrolling process, (a) the leftmost one-sixteenth of the picture from the digital picture generator 154 disappears from view in display screen 42; (b) the remaining fifteen-sixteenths of the picture are displayed on screen 42 starting at the left edge of the screen; and (c) at the rightmost one-sixteenth of the screen 42 displays the leftmost one-sixteenth of a new picture from picture generator 155. The same steps occur in the embodiment shown in FIGS. 1A and 5A.

The resulting split image presentation is the result of a combination of two separate effects. The first effect is to add an offset count to the output of the memory address counter for all of the picture generator circuits, such as 154 or 154'. This procedure, in effect, rotates, in wrap-around fashion, each horizontal line of the display. This first step is implemented as follows. Each four bit memory word, representing a pixel, is addressed by a fourteen bit address count, the seven least significant bits representing the horizontal position on the display screen, and the seven most significant bits representing the vertical position on the screen. The address "0" corresponds to the top leftmost pixel on the screen. Therefore, an offset count equal to eight picture elements (128 picture elements divided by sixteen equal steps) from the offset register 166 can be added to the memory address count output of counter 170 to offset the picture horizontally and if effect to move (wrap-around) the otherwise first displayed one-sixteenth of the picture (the leftmost portion) to the rightmost one-sixteenth of the screen. This offset is implemented by placing a count of eight in the offset register 166. The output of the offset register is added by digital adder 164 to the seven least significant bits (the horizontal position bits) of the position count. Thereafter, every further increment (of eight) to the count in the offset register moves the rightmost edge of the stored display further to the left by one-sixteenth of a horizontal picture line.

When the offset is "eight", a horizontal address count input to the memory 162 reaches the right edge of the picture stored in the digital picture generator when the displayed line is fifteen-sixteenths of the distance across the display screen. The horizontal address input to the memory at this juncture is, in binary: "1111111". The next address count from the memory address counter causes the digital adder 164 to overflow. The carry bit from the adder 164 however is not connected to the memory address counter and therefore the displayed picture "wraps-around" to its stored leftmost portion and the new horizontal address count is, in binary: "0". The left one-sixteenth of the stored picture line is then, absent any other manipulation, displayed at the rightmost one-sixteenth of the passive display screen, such as screen 42.

Since, in this embodiment, each digitized picture generator is displaced by the same offset count and operates synchronously with each other generator, all of the passive displays reach the "wrap-around" point simultaneously. It is at this time, when all displays reach the "wrap-around" point, that the second effect or process step of the smooth scrolling implementation takes place. At the time when the "wrap-around" point is reached, all of the analog multiplexors are switched to a new (the next "higher" in this example) picture generator. That is, at the "wrap-around" point, display 42 begins to receive its video from picture generator 155, display 46 from generator 156, etc., display 66 receiving its video from generator 161. Thus the rightmost one-sixteenth of the picture displayed on screen 42 is the leftmost one-sixteenth of the image stored in digitized picture generator 155. The screen 66 thus begins to display a new picture (from generator 161). The embodiment shown in FIG. 5A simplifies this process since only a single picture generator controller 154' is required.

The generation of the second step of the "smooth scroll" is effected by incrementing the offset registers 166 of all of the picture generators to a next higher incremental count i.e., in the sixteen step embodiment to a count of sixteen. Thus, the video on each screen begins at the second incremental step into the stored picture. This corresponds to one-eighth of the sixteen horizontal picture element distance in the sixteen step embodiment. The multiplexors start each horizontal line in the same "original" state (display screen 42 receiving its video from generator 154, for example), and then switch to a next picture generator seven-eighths, i.e., fourteen-sixteenths, of the distance across each horizontal line. This spatial distance corresponds to the wrap-around point.

The remaining fourteen steps required to complete a sixteen-step smooth scroll are a straight forward extension of this progression. Thus, the offset registers increment to a new count, in the illustrated embodiment, once each frame. The multiplexors switch twice for each horizontal picture line, (first at the "wrap-around" point and again at the end of the line). At the rightmost screen of the linear row array, in this example, there is "scrolled" into view the picture stored, but previously not displayed, in the "extra" picture generator, i.e., generator 161.

If scrolling toward the right, for example, in eight steps, is called for by clockwise movement of control wheel 74, the same procedure detailed above is followed, except that the stepwise movement occurs in a reverse order. Thus, the analog multiplexors first select the "new" picture being scrolled onto a screen, and switch at the wrap-around point to the old image. Similarly, a first offset of, in decimal, "112" is entered into offset register 166, and the offset register is decremented by sixteen each vertical frame time. (Eight steps correspond to a movement of sixteen pixels each step). Correspondingly, in other embodiments of the invention, more or fewer "scrolling" steps can be chosen to provide a greater or lesser perceived smoothness of motion or speed of movement. For example, if four steps were desired, an offset value of thirty-two (incremented by thirty-two each step) would be entered in the offset register for a left hand scroll.

An advantage of smooth scrolling, aside from the psychological advantage of a less confusing display, is found when the picture data base contains a large number of label pairs. Then smooth scrolling to the right or left gives the effect of viewing a summary of a movie film during film editing. Also, however, stepping the pictures instantly from display screen to display screen (i.e. using the analog multiplexors with an offset of zero) produces the effect, if only one display screen were viewed, of watching a conventional moving picture.

It is important to note that since each analog multiplexor 174, 176, . . . , 186 is independently controlled by the display processing control 114, it is possible to scroll images of some of the displays while leaving other displays unchanged. For example, it is possible to leave the pictures on displays 42, 46, and 50 unchanged and to scroll the pictures on displays 54, 58, 62, and 66 to the left thereby "shifting out" the picture originally on monitor 54. This feature is implemented by maintaining the offset registers for those digitized picture generators being displayed on monitors 42, 46, and 50 set at "zero" (and correspondingly not switching the associated analog multiplexors). The other registers and associated multiplexors are "cycled" as described above. Thus, the analog multiplexors and the offset registers 166 can be independently controlled by the display controller 114. In the preferred embodiment employing the "windowed" monitor 21, the scrolling of images occurs in the same manner, the images shift to different windows or screens on the monitor 31.

In accordance with the preferred embodiment of the invention, there is further featured, using the smooth scrolling technique, a method for substantially continuous scrolling in order to locate a particular segment of the video. In accordance with this method, a control wheel 74 or 76 is rapidly rotated a plurality of times to effect smooth scrolling. Since an operator can rotate the wheel at a relatively high rotation speed, that is, many detents per second, when compared to the typical speed of smooth scrolling, the processor 22 stores the number of detent positions passed during the rotation of the control wheel and implements the smooth scrolling procedure to move the label pairs displayed on the passive display screens by that number of screen positions, to the right or left. The operator is then in a position to view the label pairs passing along the display screens. If, as these labels pass by, the operator notes a position at which he wishes to terminate scrolling, he need only rotate the control wheel one detent position in the opposite direction. The controller 22 recognizes this wheel movement as a command to stop the smooth scrolling process. The apparatus then reverts to a normal end of smooth scrolling condition as if the smooth scrolling had come to a natural termination.

In the absence of early termination of smooth scrolling as outlined above, the controller 22 continues the scrolling until the number of positions of movement along the passive display screens equals the number of detent positions of movement by the control wheel. At that time, the passive display screen presentation returns to its normal and stationary one screen-one video frame presentation.

With further reference to FIGS. 2 and 5, as noted above, the picture generator memories 162*a* and 162*b* connect to the computer data bus 107 to receive the picture data stored therein. Although the source of the picture data can be either the picture cache memory 109, the video digitizer 110, or disk storage 146, the picture cache memory supplies the image date to the data processing unit. As noted above, this enables a more uniform presentation which is particularly helpful during the smooth scrolling procedure wherein the two groups of memories 162*a* and 162*b* are reloaded essentially during an eight or sixteen field time interval (one at the beginning of the interval and the other at the end) in order to maintain a continuing, smooth movement. The memory loading takes place under the control of controller 22. Controller 22 provides the necessary address information to the picture cache memory and the destination information to the display processing unit for enabling a direct transfer of data from the picture cache memory to the appropriate storage in digital picture memory 162*a* and 162*b*. Controller 22 can also implement similar data transfers between the video picture digitizer and the disk controller and storage on the one hand, and the digital picture memories 162*a* and 16*b*, on the other.

The row processors 150, 152 of the first embodiment, or the digitized picture generator of the second embodiment, in combination with the display processing control 114 can also be employed for a film style presentation, as described below, during the trim and splice operating modes. In the splice mode, for example, a horizontal display of a splice can be effected independently scrolling the top and bottom rows of displayed images in accordance with the respective rotational movement of control wheels 74 and 76. The top row corresponds to the "from" video segment and the bottom row corresponds to the "to" video segment. By moving the "from" and "to" segments relative to one another, a temporal view of the splice can be achieved. The independent movement of the images is created by independently controlling the analog multiplexors and offset registers for each row of passive display screens.

Video Display Processing The Active Displays

Figure 3A:
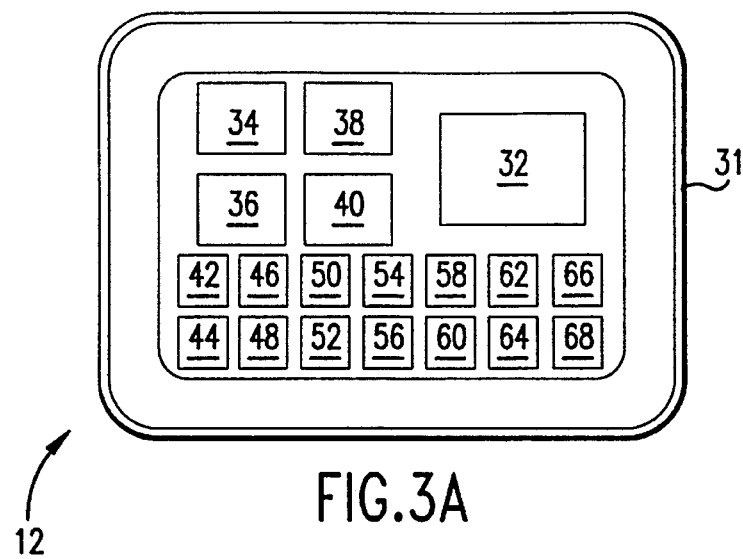
Figure 3B:
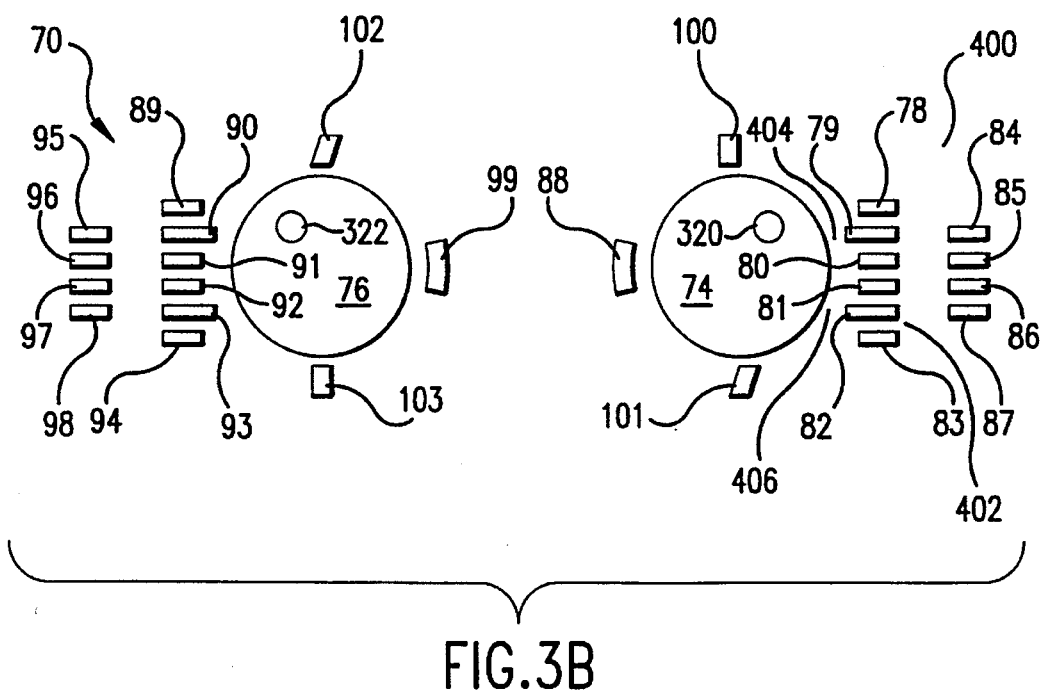
Figure 6:
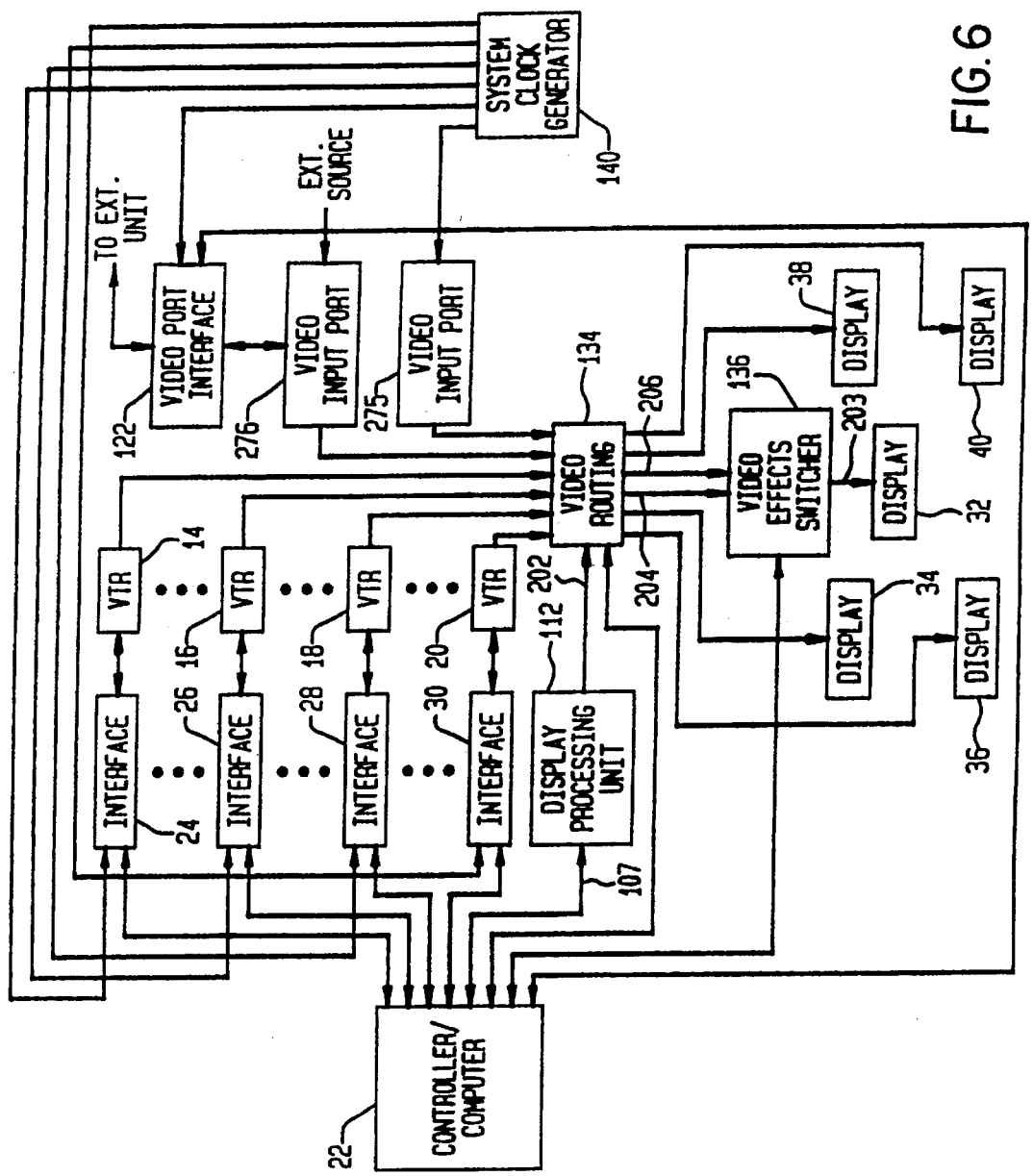
FIG. 6 illustrates a partial electrical schematic diagram corresponding to FIG. 2 and showing the elements necessary for displaying and controlling video on the active display screens.

Referring now to FIGS. 3, 3B and 6, the console 12 has the active main display screen 32 and the four subsidiary active display screens 34, 36, 38, and 40. The active display screen 32 is preferably a color monitor. These screens receive analog video signals from the video routing circuit 134 and video effects switcher 136. These circuits, operating under the control of controller 22, select video signals from among the real time video signal outputs of the video tape recorders, the video input ports, and the reduced resolution displays from the display processing unit 112. The routing circuit 134 receives the processing unit video over lines 202, of which there is one line for each display screen. The routing circuit 134 and video effects switcher 136 display the video they received on the various active display screens. Thus, in the embodiment seen in FIGS. 3 and 6, those active displays which require the display of a single frame, such as a pictorial label, can employ either the analog video from a VTR operating in a freeze frame mode or the analog signal over lines 202 derived from a low resolution digital raster stored in a memory of the display processing unit.

In the first embodiment, under the direction of the controller 22, up to six video inputs to circuitry 134 are selected for display on the five available monitors. Monitors 34, 36, 38, and 40 each connect to a generally, but not necessarily, different one of the video output lines available form video routing circuit 134. The main color monitor receives a video output from video effects switcher 136 over a line 203. Video effects switcher 136, under the control of controller 22, selects one or the other, or causes a transition from one to the other, of the video input signals over lines 204 and 206, to be its output video signal. In this manner, under control of controller 22, the monitor 332 can display, for example, a continuous loop presentation of a video segment (as discussed further below) or a continuous loop presentation, including the transition, between two video segments. The routing circuitry 134 and video effects switcher 136 can also be employed, for example, to blank all monitors except the main color monitor and to display on it the output of a single video input to circuitry 134.

Figure 6A:
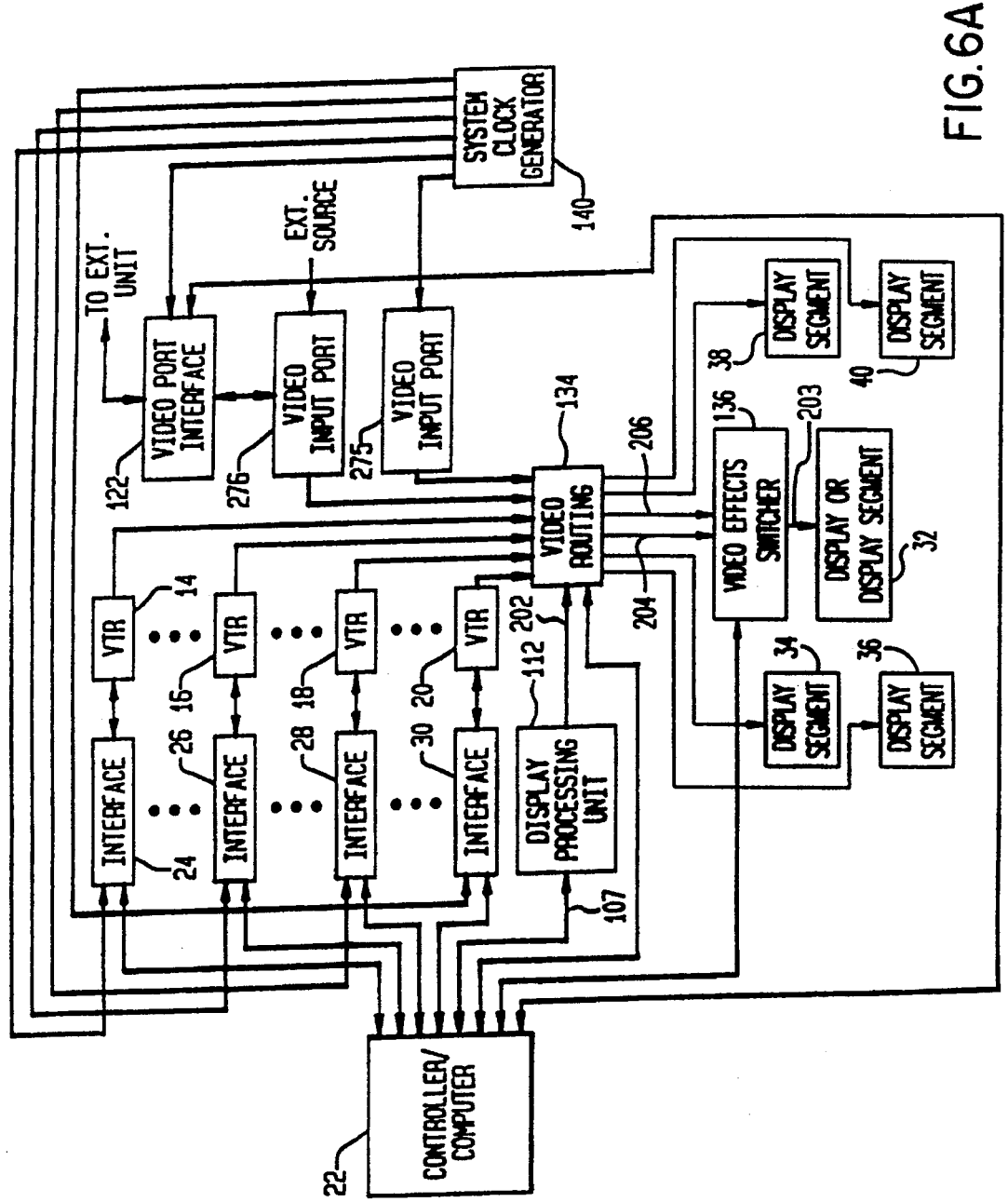
FIG. 6A illustrates a second embodiment of the diagram shown in FIG. 6.

As seen in FIG. 3A and 6A, the preferred embodiment of the present invention includes a console 12 having a segment-type display screen 31 capable of exhibiting multiple screens or "windows" including active display screen 32, four smaller, subsidiary active display screens 34, 36, 38 and 40. The monitor 31 is preferably a color monitor. The need for a line 202 for each display screen is eliminated in this embodiment.

In addition, the "windowed" display monitor 31 permits the user/editor to view more than one "bin" or temporal sequence representation in the passive display screens, as discussed above. The monitor 31 may be set to include two or more sets of passive displays in the lower portion of the monitor 31. Thus, the fixed number of screens provided in the previous embodiment has been expanded to an unlimited number, dependent only on the size of the monitor 31. This permits the user/editor to view multiple bins.

In the first embodiment of the invention, video routing circuit 134 and video effects switcher 136 are commercially available devices designed to provide the necessary video routing and "effects" functions. In effect, circuitry 134 provides a routing function which chooses from among the various input signals for display of an output signal. For example, circuit 134 can employ seven multi-pole video switches with each being dedicated to one video output. All of the selection circuits receive the same video inputs.

Video Input/Output Recording

Figure 7:
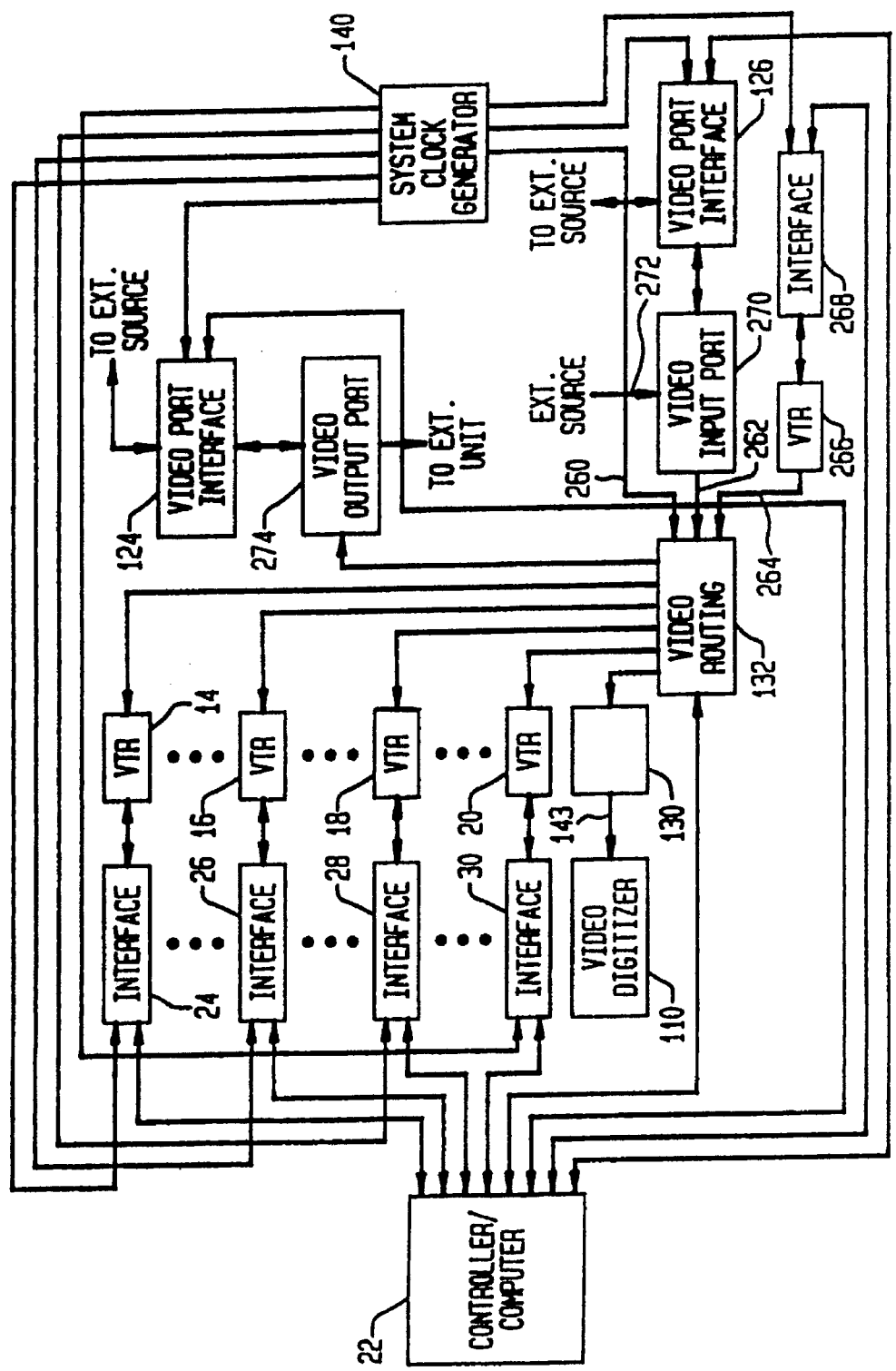
FIG. 7 illustrates a partial electrical schematic diagram corresponding to FIG. 2 and showing the portions of the system which input video to the apparatus.

Referring now to FIG. 7, the video routing circuitry 132, under control of controller 22, directs one or more of the video signals input it receives over lines 260, 262, and 264, to one or more of the video tape recorders 14, 16, . . . , 20, to the random access storage means 15, to the video digitizer, and/or to a video output port 224 (the latter for delivery to, for example, an external device such as a video recorder which is not associated with the present embodiment of the invention). The video input to the routing circuit can be available from a video tape recorder 266, which has associated with it a video interface 268, from a video input port 270, or from the system clock generator 140. Video input port 270 receives video over a line 272 from an external source, and operates under the control of the video port interface 126. The video input port 270 can receive a video signal over line 272 from, for example a video camera. The video information over line 262 can be combined with clock identification signals from the system clock generator 140 over separate line 260. The system clock generator 140 provide SMPTE time code signals for use in the composing process. Alternatively and preferably, in the illustrated embodiment, the capability of providing SMPTE time code data is distributed among the interface circuits 24, 26, . . . , and clock generator 140 provides master clock timing for the apparatus.

The video routing circuitry 132 thus connects a selected video signal from lines 260, 262, 264, and 273 to either a video output port 274, controlled by the video port interface 124, and/or to any or all video tape recorders for recording. And, if necessary, the time code location over lines 260 from the clock generator 140 is also available for writing onto the video tape recorders. This occurs, for example, if the video signals do not already contain the time code information.

The video routing circuitry 132 can employ commercially available devices, and operates as an EXCLUSIVE OR gate with respect to the video inputs and as an INCLUSIVE OR gate with respect to directing video output. Thus, any video input can be placed on any or all of the output lines. The operation of the routing circuit 132 is, as noted above, under the control of the controller 22. The circuitry in effect places a video input signal (including time code information if needed) on the output line or lines as desired for specified operation.

Video Tape Recorder Interface Operation

Figure 8:
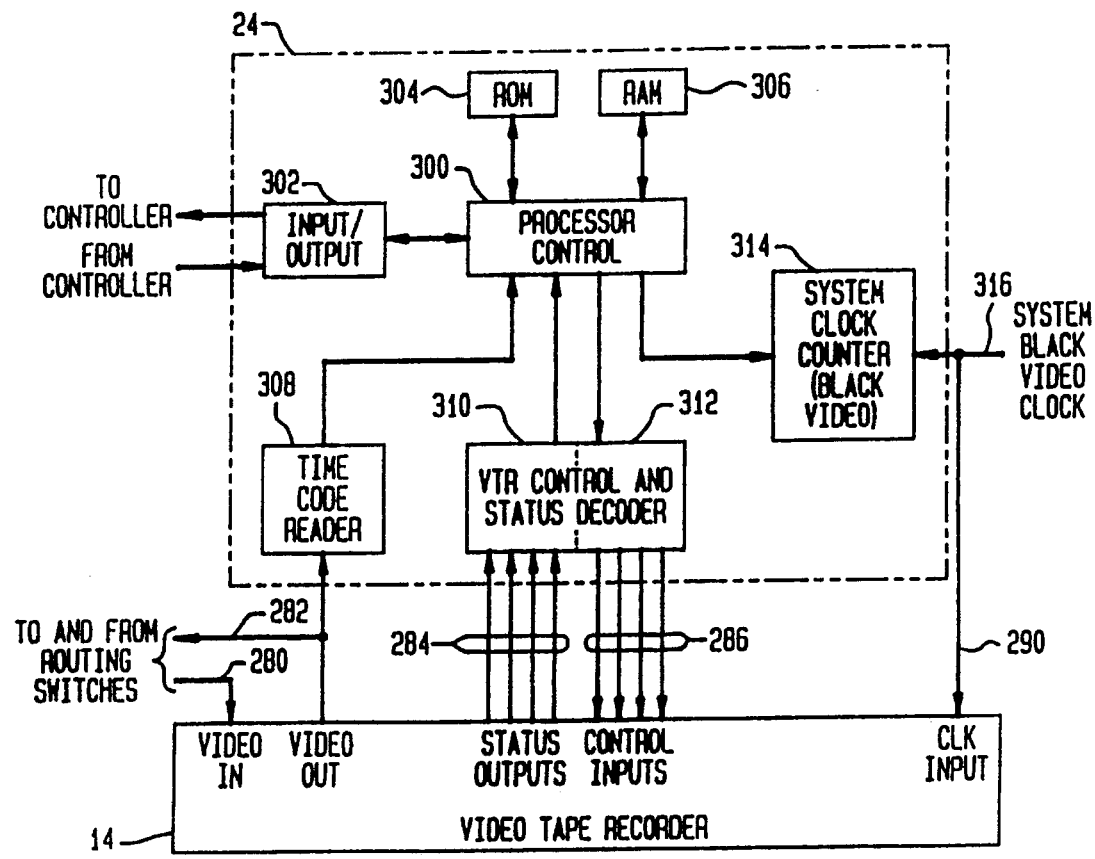
FIG. 8 illustrates a detailed block diagram of the video tape recorder interface of FIG. 2.

As noted, a video tape recorder interface is associated with each video tape recorder. This is, in essence, a smart terminal. Referring now to FIG. 8, a typical video tape recorder, for example recorder 14, and its associated interface 24 are shown in greater detail. Each video tape recorder has a video input line 280, a video output line 282, a plurality of status output lines 284, a plurality of controlling input lines 286, a power output line 288, and a clocked input line 290. The commercially available video tape recorder has circuitry for enabling the output of the video tape recorder to be RF modulated for display on a standard television channel. This is not necessary according to the preferred embodiment of the invention wherein the video displays need not be provided with the RF modulator output required for typical broadcast television. Therefore, according to the preferred embodiment of the invention, the RF output section of the video tape recorder is disabled and an interface "card" as described below, is mounted on the recorder.

The VTR interface 24, which is identical to all other video tape recorder interfaces employed, has a microprocessor control element 300 which receives digital instructions from controller 22 through an input/output network 302. This provides a distributed processing structure and allows the controller 22 to act more as a remote manager over what can be multiple simultaneously occurring operations. Associated with the microprocessor are a read-only memory 304 and a random-access memory 306. Processor 300 is a Z80 device manufactured by Zilog. The processor 300 receives status data input from the video tape recorder through a time code reader 308 and a VTR status decoder 310. VTR status decoder 310 further includes a VTR control circuitry 312 which enables the microprocessor 300 to control the operation of the video tape recorder. The microprocessor also has access to the system clock through a system clock counter 314. The system clock counter receives an input from the system clock generator 140 over a line 316.

In operation, the microprocessor control 300 receives operating instructions from the controller 22. The operating instructions include, for example, a tape start location, a tape start time, and a tape end location for the video tape recorder. The microprocessor control positions the video tape recorder in response with these operating instructions. The location of the video tape is indicated by the output of the time code reader, which uniquely identifies each frame on the tape. Operation of the video tape recorder can then take place in accordance with the system clock available through clock counter 314. When required, data can be written onto tape, under control of the microprocessor 300, and can include the clock input for providing the time code information.

According the preferred embodiment of the invention, one VTR interface writes an internal time code designation in addition to the SMPTE time code which is normally associated with each video frame when it is originally generated. Thus, as source material is being recorded on a plurality of VTR's one interface for example, interface 24 associated with VTR 14, writes an internal part time code in association with each frame. The internal time code is sequential and the now modified video being recorded on VTR 14 is also directed by controller 22 to all of the other recording VTR's through video routing circuits 134 and 132. Thus, VTR recording is synchronized so that a frame has associated therewith and an internal time code designation which is the same on all recordings.

Further, the internal time codes are recorded sequentially on the video tape and provide an easy procedure for accounting for time durations in response to commands which controller 22 generates. Thus, for example, there are always eight frames between frames "one" and "ten". (The source material comes from different sources and is often prepared as different times. Hence, inevitably there are gaps in the sequence of source generated time codes when the different sources generated materials are sequentially recorded on one tape.) Further operation of the video tape recorder is in a standard manner as is well known to those skilled in the art.

If, on the other hand, the random access storage means 15, rather than the serial storage means 13, is used to store the input video frames, the input frames are digitized and compressed for transfer onto a Winchester hard disk or a Laser read/write disk, for example, and when the video frames are later retrieved they are appropriately decompressed for display.

General Operation of the Apparatus

In operation, the illustrated composing apparatus is controlled solely form the control console and in particular from the control panel 70 by the control wheels 74, 76, control keys 78, 79, . . . , 99, and control levers 100, 101, 102, 103, (see FIGS. 3, 3B and 3A). The two control wheels 74, 76 are hand operated, rotary controls which allow the manipulation and selection, for example of earlier or later pictorial labels in the sort mode of operation, by counterclockwise (for later) and clockwise (for earlier) rotational movement respectively. These wheels can also effect change of the beginning and end of a segment (the trim mode of operation) or the beginning and end of a transition between segments (the splice mode of operation). Thus the wheels 74, 76 in the illustrated embodiment are active during the sort (wheel 74 only), trim, and splice modes.

The wheels can be constructed of, for example, wheels, three inches in diameter and three-quarters of an inch high and preferably have a finger-sized indentation 320, 322, on their upper surface. The preferred wheels have thirty detent positions for each complete revolution and provide a signal through interface 120 to controller 22 for each detent movement. The interpretation of one detent of movement depends upon the operating mode. For example, in either the trim mode or the splice mode, each wheel operates to aide in editing the segment represented by a selected active pictorial label, and one detent of movement corresponds to one frame of video. In the sort mode, however, a movement of one detent position corresponds to the shift of all label pairs one position to the right or left on the passive displays.

As outlined above, the composing apparatus 10 operates in a number of operating modes. Entry of the apparatus into and out of the various operating modes is the function of control keys 78, 83, and 89. Each key operates a mechanical switch which signals through interface 120 to controller 22. Control key 83 places the apparatus in the sort or composition mode. Depressing this key, to enter the sort mode, allows the operator to thereafter move and manipulate the label pairs appearing on displays 42, 44, . . . , 68. Thereby, the segments represented by the label pairs can be pulled and inserted, deleted, arbitrarily inserted in various positions, etc.

After an operator has organized the sequence of segments into a desired order, depressing the trim key 78 places the composition apparatus in the trim mode of operation. In this mode of operation, the beginning and end of a segment can be changed, to thereby shorten or lengthen the frame sequence, under the control of, and by rotational movement of, the control wheels 74 (beginning) and 76 (end). The segment however is not actually "trimmed" until both accept key 88 and accept key 99 are simultaneously depressed. In the trim mode, the labels identifying the beginning and end of the selected segment are displayed on screens 34 and 36 respectively. Simultaneously, the selected segment appears in a continuous loop fashion (with a "break" between the end of the segment and the beginning of the next display of the segment as described more fully below) on the main screen 32. As the beginning and end of the segment are adjusted respectively by rotating control wheels 74 and 76, the resulting changes in the segment composition are substantially instantaneously reflected on screens 34 (which displays the first frame of the segment) and 36 (which displays the last frame of the segment). By rotating the wheel 74 or wheel 76 back and forth, there appears in the corresponding display 34 or 36 the "action" portrayed at the beginning or end of the segment. By carefully controlling the rocking motion of the control wheel, the operator can accurately "zero in" on the exact frame at which the segment is to either begin or end. This technique, designated "action scrolling", enables precise decisions to be made with regard to the beginning and end of the segment.

It is further important to recognize that a single 360° rotation of the control wheel corresponds to thirty detent positions in the preferred embodiment and hence equals thirty frames or one second of video in the trim and splice modes of operation. It is therefore convenient for the operator, without reference to actual time measurement or time code signals, to accurately adjust the duration of the video segment. In addition, however, to further aid the operator, the apparatus provides during the sort and trim modes of operation, on screen 40, and the time duration of the segment being edited. The time duration for the segment defined by the label pair on screens 34 and 36 is generated by the controller 22.

Once the operator is satisfied with and finalizes the length of the segments, the splice between successive segments can be changed, if desired, from the abrupt cut, i.e., the default option, which typically occurs between segments. Depressing key 89 places the apparatus in the splice mode of operation. In this mode of operation four different splices can be achieved: key 90 provides for a dissolve, key 91 for a wipe, key 92 for a soft cut, and key 93 for an "ordinary" cut (the default option).

As noted above, the illustrated control console includes two pairs of levers 100 and 101, and 102 and 103. One pair is adjacent each control wheel for convenient lever operation with the hand still in contact with that wheel. All of the levers have seven positions in the preferred embodiment, although, it may be desirable in other embodiments of the invention to provide for more or fewer discrete positions or for a continuous adjustment or movement for one or more of the levers. Lever 100 controls the position of a cursor: the cursor has an upper and a lower component for denoting a label pair on the passive displays. The cursor position corresponds to the illuminated ones of illumination elements 324 which appear (in FIG. 3) above the top row of passive displays and below the bottom row of passive displays 42, 44, . . . , 68. Each passive display thus has associated therewith a cursor illumination element 324. In the embodiment shown in FIG. 3A, the cursor or element 324 is displayed within or adjacent to a screen of the segmented screen of monitor 31. The elements 324 thus indicate the location of the upper and lower components of the cursor. Movement of lever 100 generally causes the cursor components to move together from, for example, the display screen pair 50, 52 to the display screen pair 54, 56. The display screen pair selected by the cursor is that display pair which, in the sort and trim modes, designates the segment to be "looped" on main screen 32 and which designates the labels to be displayed in screens 34 and 36. In the splice mode however, the upper cursor component is not above the lower cursor component. Rather, the upper component is offset by one position to the right, and the cursor bottom component thereby indicates the ending label of the first segment and the top component indicates the beginning label of a second segment. There are in addition other embodiments of the invention, as will be discussed below, wherein the cursor control and position vary further.

Lever 101 controls the speed of a splice. As noted above, lever 101, in the first embodiment, is a seven position switch and provides splice speed as a discrete operating parameter. In other embodiments of the invention it may be desirable to provide a continuous splice speed variation. It is important to note also that the speed of the splice can be varied during the transition itself by movement of lever 101 as the splice proceeds.

Lever 102 controls the bin (or level) from which the labels displayed on the passive display screens are selected. As noted above, there are, in the preferred embodiment, seven different bins (or levels). Movement of lever 102 provides a substantially instantaneous change of bin (or level). Movement of the lever to the right, corresponds to movement to a higher bin (or level). Movement of lever 102 to the left, corresponds to movement to a lower bin (or level).

Level 103, in the preferred embodiment, controls the manner of selecting and recording source audio information during the composing process.

Particular Operation of the Apparatus

Input Mode

Prior to editing any source material, that source material must be properly input to the composing apparatus. The source material can be, for example, an existing video tape or live video material received directly from a video camera. In either instance, referring to FIG. 7, the source material is routed, by video routing circuitry 132, to at least two or more of the video tape recorders and/or the random access storage means 15. The primary goal of the video tape recorder storage is to make each segment of the video source material available on at least two separate recorders and preferably ten or more. This allows access times comparable to those obtainable with optical disk media and, as described below, facilitates the display of the segments during the various edit functions. As a result, in the preferred embodiment, if the amount of source material has a total running time of less than four and one-half hours (a standard VTR tape cartridge), the source material is duplicated on each and every video tape recorder in the system. This simplifies the input operation and decreases the apparatus response when playing a sequence of segments in real time. Where the random access storage means is utilized, it is possible to use only one or two Winchester hard disks or Laser read/write (optical) disks.

The controller 22 controls the routing of the source material through routing circuitry 132. It also controls, in response to control information input through the keyboard 104, the method in which the source material is segmented and in which label pairs are generated therefrom. Thus, as noted above, a label can be automatically generated for each input video frame or the source material can be automatically marked for subdivision at the period interval, for example every second, specified by the editor. Alternatively, as note above, the editor can specify the interval marking as the incoming source material is being received. In the latter instance, the controller 22, in response to activation of the mark key, subdivides the incoming material.

In either instance, during the receipt of source material, the illustrated controller 22 collects the label paris for each segment being recorded. For each segment, the controller 22 generates an "IMAGE" or image pair which includes digitized snapshot of the frames, typically one label for each frame, or at least labels for the first and last frames of the segment, which are employed as the label pair for the segment. Further this IMAGE or image pair includes the precise location of the segment both in the external medium used for input (if the external medium is tape) and in the apparatus video tape recorders. The IMAGES are stored on magnetic disk for later retrieval as required for display and generation of the storyboard.

According to the preferred embodiment of the invention, the apparatus collects two frames for each segment in the automatic segmentation mode of operation. In other embodiments, however, since the segments are continuous, the apparatus can sample only one frame per segment and that frame becomes the end label of one label pair and the beginning label of the next sequential label pair in the source bin.

The segments of the video source material, once they are input to the apparatus and the IMAGES formed therefrom, are represented as PAIR'S of IMAGES. The controller 22 orders the PAIRS into a list as they are created during the input process. This original list, corresponding to the source bin, contains, for each PAIR, the physical time code addresses (both the source time code and the internally generated system time code) of its component IMAGES, the addresses which indicate the previous and next PAIRS within the storage list, and information regarding the edit transition to the next PAIR in the sequence. All of this data is required to completely describe a sequence of segments. This becomes important as the editing progresses and the initial ordering of the source material is changed.

Referring to FIGS. 2 and 7, as noted above, controller 22 directs the input video source material through a routing circuitry 132 to the video tape recorders or to the random access storage means 15. In addition, the controller 22 directs the video to routing circuitry 130 for delivery to the video digitizer 110 over line 143. As noted above, the video digitizer 110 operates at a high enough conversion rate to grab a succession of frames on-the-fly. Consequently, the controller 22 operates the system to digitize the first and the last frame of each segment and to provide that digital data for storage on disk unit 146. Preferably, each inputted frame is digitized and compressed for storage. Additionally, controller 22 provides the disk storage with the necessary location and sequencing data outlined above.

Figure 10:
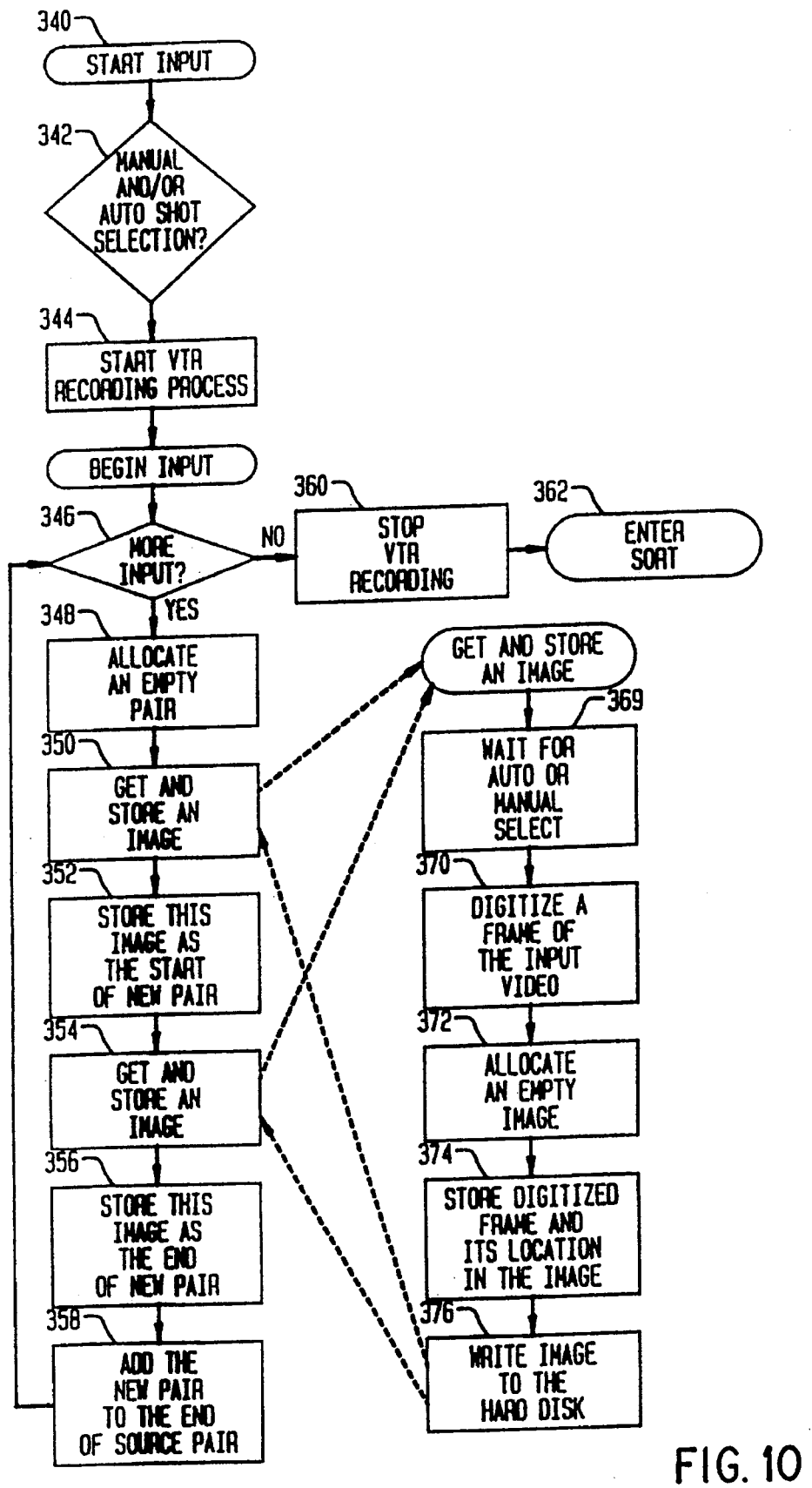
FIG. 10 illustrates a flow chart showing controller operation during the input mode of operation.

Referring now to the input mode flow chart of FIG. 10, the input of data is specified at 340. The operator then selects either automatic or manual shot (segment) selection at 342 and thereafter the source device, for example, a video tape recorder, is initiated and the apparatus video tape recorders 14, 16, 18, . . . 20 and/or the random access storage means 15 begin recording at 344. Once source material begins to be received, at 346, the controller 22 allocates storage for an empty "PAIR" at 348. The apparatus then grabs an "IMAGE" on-the-fly and stores the image at 350. The first IMAGE of a pair is stored as the starting frame of the new PAIR at 352. A second IMAGE is then obtained at 354 and this IMAGE is stored as the ending frame of the new PAIR at 356. The now formed new PAIR is added to the end of the previously stored PAIR's in the source bin at 358. The sequence returns to the decision at 346 and the next segment of source material is generated and processed. When there is no additional source material, the system proceeds to stop the recording video tape recorder(s) at 360 and then enters (or continues in) the sort mode of operation at 362. The operation of obtaining and storing an IMAGE (at 350 or 354) requires, at 369, a signal indicating a manual or automatic designation of the segment. Each designation of a segment, for all but the first and last segments, causes two frames to be digitized, a first digitized frame, representing the ending IMAGE of a segment and a second digitized frame representing the beginning IMAGE of a next segment. The frame is digitized and stored temporarily in the digitizer at 370. An IMAGE is allocated to an empty image storage location at 372 and the actual storage of the digitized frame, and its associated time codes, at that allocated location for the IMAGE occurs at 374. The IMAGE then is written onto hard disk at 376.

If, on the other hand, images are to be automatically generated for all input video frames, the controller operation is simpler than that shown in FIG. 10, since storage space is allocated on a single image basis (rather than the basis of image pairs), and similarly images are stored on single image basis. Automatic generation of labels for all incoming video frames is a preferred aspect of the invention because it significantly facilitates, and significantly increases the speed of executing, subsequent procedures of the video composition method according to the invention. Particularly, where labels have been created and stored for each video frame, currently available storage technology makes it possible to call up any desired label(s), already in an appropriately digitized form, within a fraction of a second.

Conversely, if labels are initially generated for only select ones of the incoming video frames (e.g., every thirtieth frame) the apparatus will necessarily pause whenever a user's edit decision creates or changes a segment's reference points to allow for digitizing a new set of labels. Also, if labels are initially generated for only select video frames, the trim and splice functions will require a longer pause to allow digitization of every frame of the smaller segment of interest.

The Sort Mode of Operation

Figure 11A:
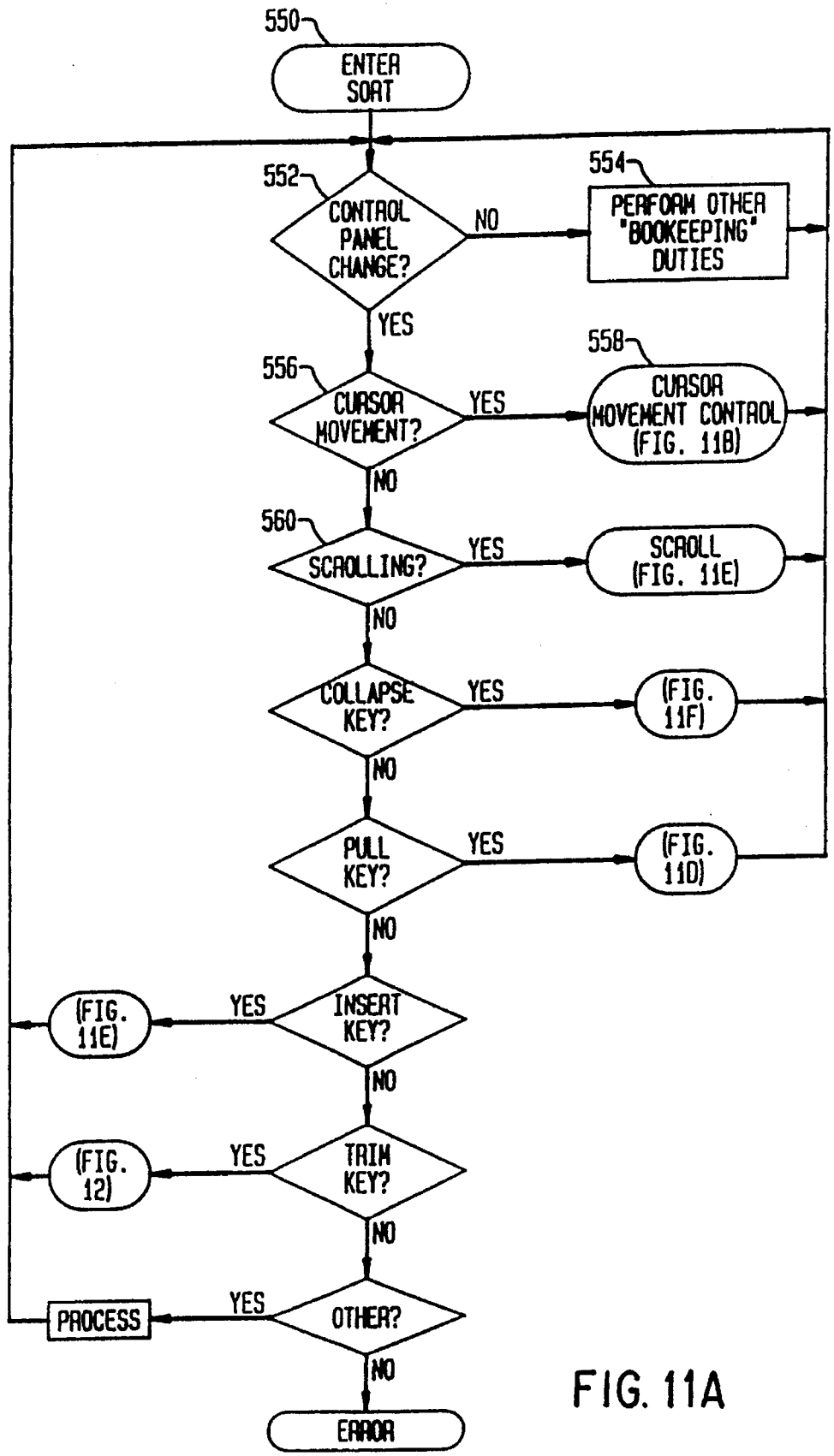
FIGS. 11A–11F illustrate flow charts showing controller operation during the sort mode of operation.

The sort mode of operation is the mode to which the system defaults. Referring to FIG. 11A, the sort mode of operation is typically entered from the input mode by pressing the sort key 83. This is indicated at 550. In the sort mode, the controller 22 monitors the control panel, at 552, to determine whether a key has been depressed, a lever has been changed, or a control wheel has been rotated. If any of these events occur, the controller 22 continues through a "checklist" to determine what has been activated at the control panel and to take an appropriate action. If the status of the control panel has not changed, the controller 22 performs (at 554) the other ministerial bookkeeping duties which occur during the sort mode of operation (such as control of the VTR's) and returns again to check tin: status of the control panel.

Figure 11B:
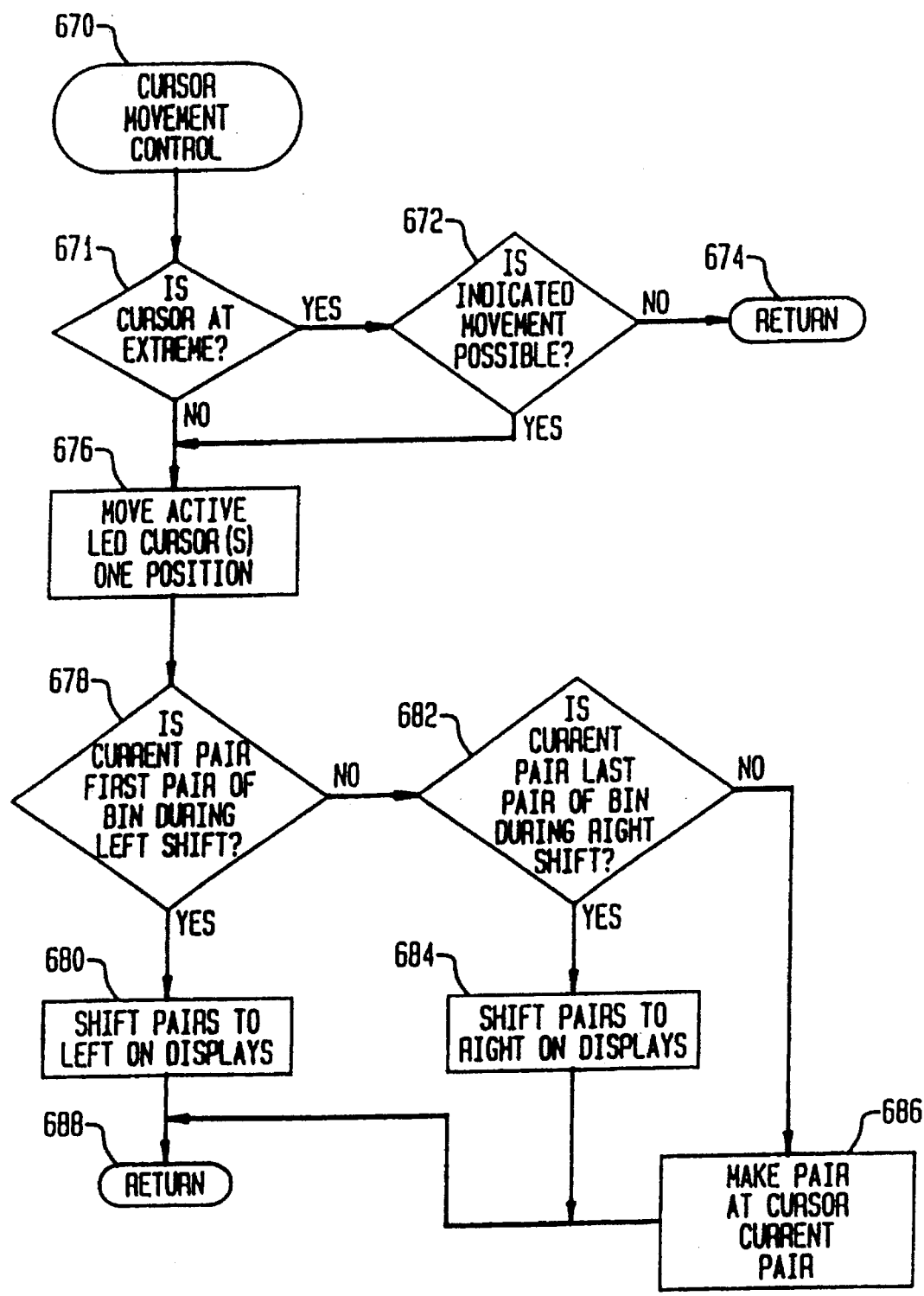

An important feature of the sort mode of operation is the capability of moving and controlling the location of the cursor whose location is designated by the cursor position indicating LED's 324. As noted above, the position of the cursor is controlled by the cursor position lever 100. During normal operation in the sort mode, referring to FIG. 11A, the controller 22 typically monitors the status of the control lever 100. This is indicated at 556. If the control lever 100 moves to a new position, the sort mode of operation enters a cursor movement control procedure (at 558) as detailed beginning at 670 of FIG. 11B. If the cursor is at the extreme edge of the display screens (at 671), and the directed movement is to a position beyond that edge, as indicated at decision block 672, the apparatus does nothing and returns to its normal monitoring condition as indicated at 674. Otherwise, the apparatus moves the active cursors to the position indicated by lever 100. This is indicated at 676. Typically, the control apparatus operates quickly enough so that lever 100 can move only one position for one cycle of the monitoring system.

If, prior to a left cursor movement, the cursors are pointing to the first pair in a particular bin, that first pair is "dragged" along with the cursor when the cursor moves to the left. Thus, at 678, the apparatus determines if the cursor is at the first label pair of the bin during a left shift, and if so, the apparatus shifts the pair to the left as the cursor move to the left, thereby moving all of the label displays to the left one screen position at a time. This is indicated at 680. Similarly, if the current label pair is the last pair in the bin and if the cursor is being moved to the right, at 682, the apparatus again "drags" the label display with it as the cursor moves to the right. This is indicated at 684. If neither of the conditions at 678 and 682 are satisfied, the new label pair designated by the cursor becomes the "current pair", at 686, and the apparatus returns at 688 to the normal monitoring mode.

Another important operational function in the sort mode is movement of the label pairs to the left and right (scrolling) on the passive display screens 42, 44, 46, . . . 68. This monitoring step is indicated at 560 in FIG. 11A. The right hand control wheel 74 controls the incremental position of the contiguous sequence of pictorial label pairs displayed, under the control of the controller 22, on the passive display screens. Counterclockwise movement of the wheel 74 increments the picture label pairs to the left. As the label pairs increment to the left, each spatial position, for example central screens 54 and 56, represents successive, subsequent pictorial labels. Clockwise movement of the wheel increments the picture label pairs to the right wherein each vertical screen pair will represent successive prior pictorial labels. One wheel detent represents one increment of movement for one pair of vertically related pictorial labels (the label pair).

Figure 11C:
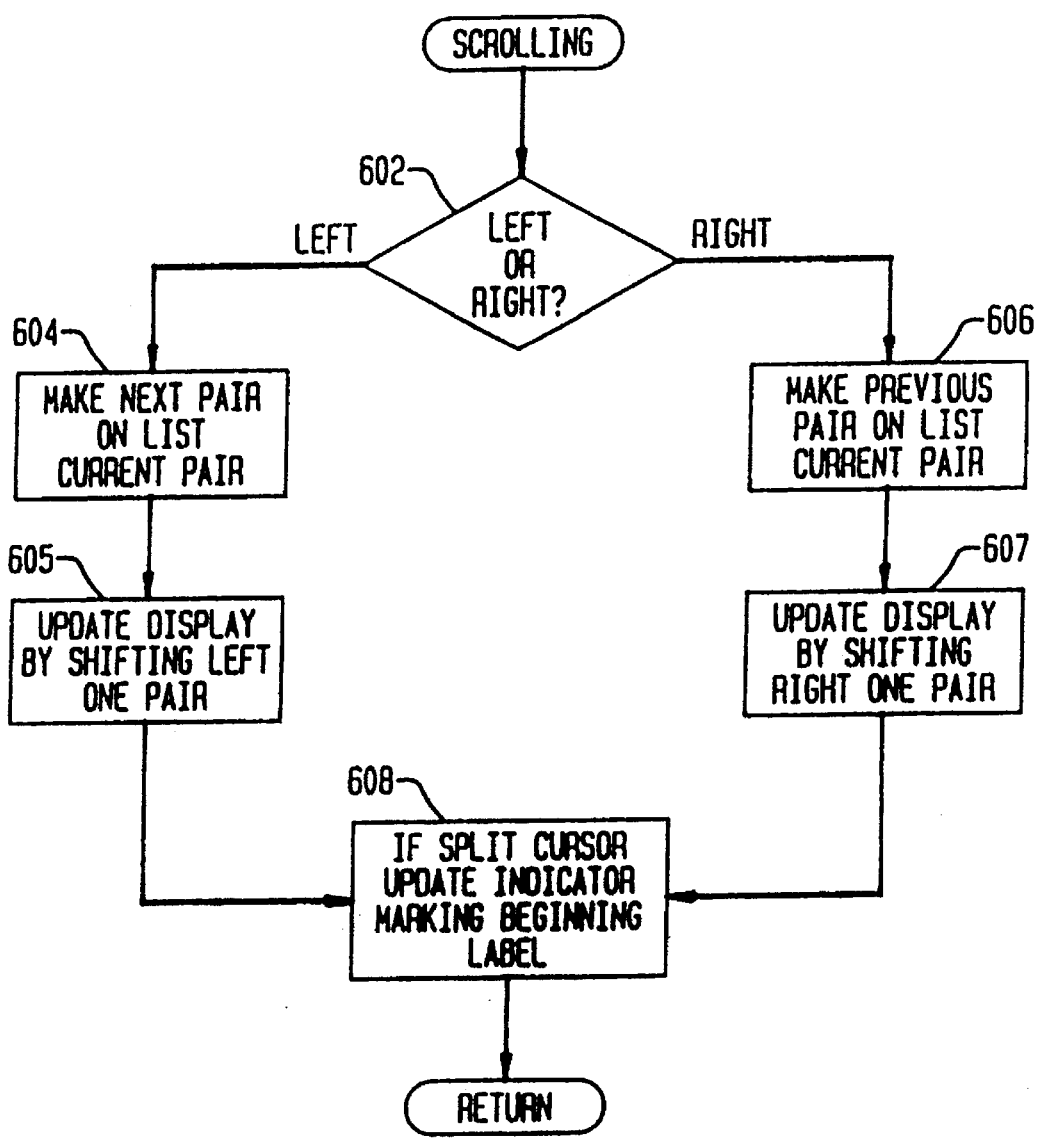

Referring to FIG. 11C, the controller 22, when in the sort mode of operation, checks the status of the control wheel 74 (at 560, FIG. 11A) in connection with the scrolling operation of the label pairs across the passive display screens. If scrolling is indicated, the next step at 602 (FIG. 11C) is to determine whether scrolling is to the left or to the right. Depending upon the outcome of this determination, the next or previous pair of the current label pair list for the bin becomes the current label pair and labels of the display are updated by shifting to the left or to the right by one position. This is indicated at 604, 605 and 606, 607. Thereafter, the controller 22 determines, at 608, if the apparatus is in a "split" cursor mode, as described hereinafter, in which case the cursor indicating element that marks the beginning label is updated. The apparatus then returns to the monitoring procedure of FIG. 11A employed with the sort mode of operation.

In the sort mode of operation, the active control panel keys (FIGS. 3 and 9) are the pull key 79, the discard key 80, and the return key 81, the home key 82, the insert key 84, the replicate key 85, the mark key 86, the black key 87, the collapse key 94 and the split key 98. These keys generally act upon the pictorial labels designated by the cursor and hence indirectly upon the segment or segments to which the designated labels relate. The physical positions, length, etc., of the segments on the video tape or other storage means however do not change. In the sort mode of operation, the label pairs and at least symbolically the segments to which they relate, can be discarded, moved, marked, and otherwise manipulated into a sequence, designated by the operator, to properly represent a desired program sequence.

For example, assume that the cursor position designated by lever 100 points to the central passive display screens 54 and 56. Initially, the label displayed on screen 56 will appear on screen 36. The segment designated by that label pair will continuously loop on active main screen 32 if the apparatus is operating at a program bin level. If new video source material is being read into and stored on the VTR's with automatic sampling, the apparatus can still enter the sort mode of operation. Upon pressing the sort key, the operator has the capability of manipulating the label pairs already in the source bin as described in detail hereinafter. The operator will not however be able to see a display of the segment on the active display screen 32 as is typical during the sort mode of operation. Thus, this procedure advantageously allows sorting operation to proceed at the source bin level while input material is being recorded on the VTR's or other storage means. (Clearly, the VTR's cannot simultaneously record input material and at the same time provide video for a continuous loop display on screen 32.)

Further assume, however, that a segment is to be removed (pulled) from its present position of the program sequence. This pull and insert procedure can be effected as follows. Assume that the apparatus is operating at a program bin level, and it is desired to move the segment identified by the labels appearing on screens 62 and 64 to a position between the segments identified by the label pairs on screens 44, 48, and 50, 52. There are a number of different procedures available to the operator/editor. One method for accomplishing this task is (a) to position the cursor, using lever 100, above and below screens 62 and 64, (b) depress the pull key 79, thereby removing the label pair originally on screens 62, 64 into the select bin (later occurring label pairs move one increment to the left), (c) move the cursor to a position above and below screens 50 and 52, and (d) depress the insert key 84. The originally pulled label pair is inserted into the sequence and appears on screens 50, 52. The label pairs appearing on screens 50, 52, 54 . . . , 68 increment one spatial position to the right (the labels on screens 66, 68 thus disappear from view).

The effect of pressing the pull key is thus to remove the label pair on the screens selected by the cursor from the then existing sequence and place it in the select bin. Depressing the pull key in the illustrated example, thus deletes the label pair originally displayed on screens 62, 64 and moves the label pair originally on screens 66 and 68 to screens 62 and 64, respectively. The next, later occurring sequential label pair, then appears on screens 66 and 68.

Figure 11D:
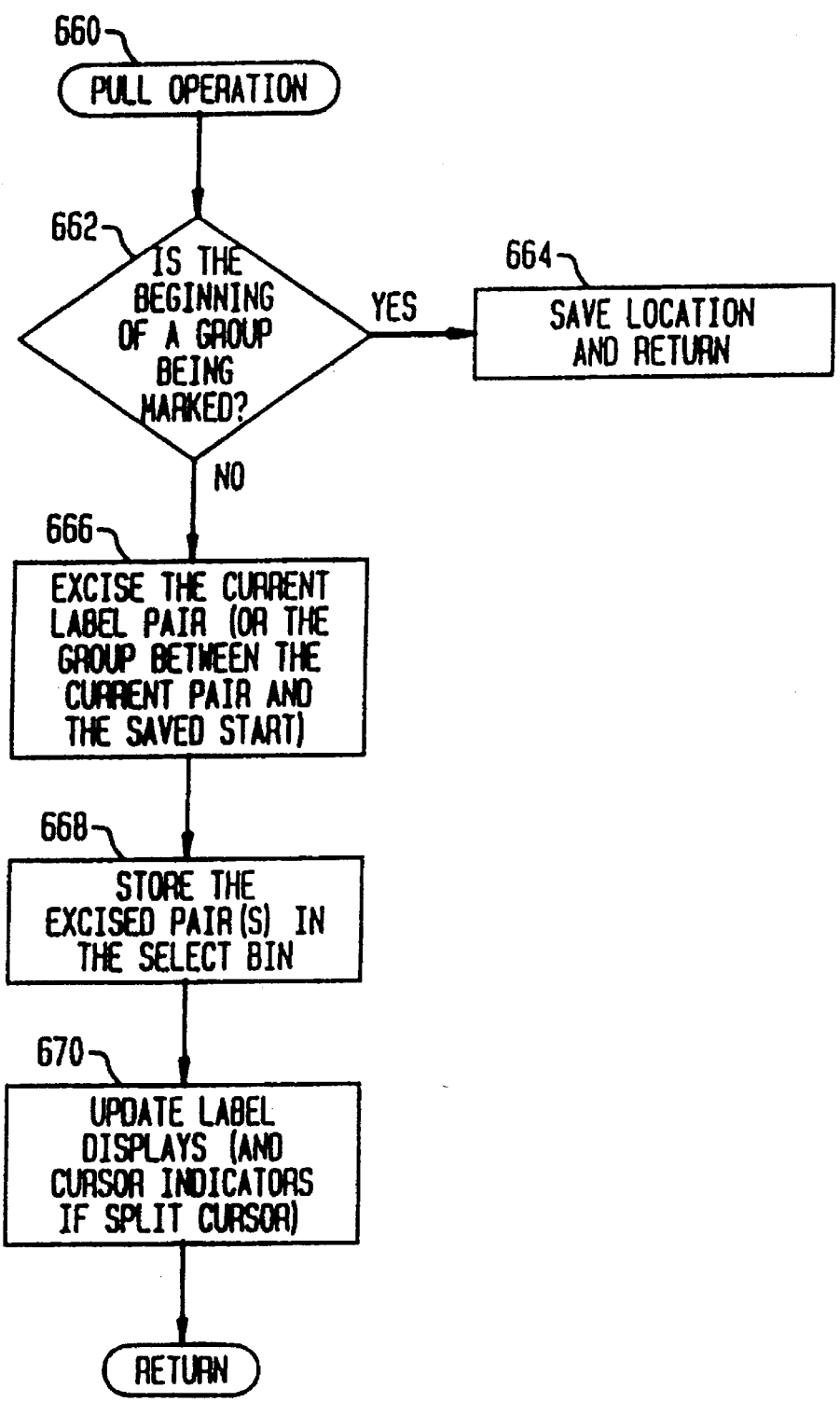

Referring now to FIG. 11D, the pull operation outlined above begins at 660. The pull operation at 660 is entered in one of two ways, namely, by depressing either the pull key or the mark key. If it is the mark key 86 which initiates operation, a decision, at 662, directs the controller 22 to save the marked location at 664 and return to the monitoring decision list at 552 of the sort mode of operation. If, however, the pull key initiated the pull operation, the apparatus proceeds to excise the current pair from the bin, at 666, and to store it in the select bin at 668. (If the discard key had been pressed, the pair would have been inserted into the discard bin instead of the select bin). Thereafter, the label display is updated and the cursor indicating elements, if a group operation had been performed, are changed. This is indicated at 670. The apparatus then returns to the monitor mode of operation.

Depressing the insert key (see FIG. 11E) has the effect of placing the most recently "pulled" label pair, presently available in the select bin, at the position indicated by the cursor and moving all succeeding label pairs, including the one originally displayed at the position identified by the cursor, to the right (later in time) one position.

As an alternative procedure, instead on moving the cursor from screens 62, 64 to screens 50, 52, the control wheel 74 could be employed, after the pull key has been depressed, to move a selected label pair to the location of the cursor. That is, rotating the control wheel 74 three detent positions in the clockwise direction, has the effect of moving the label pair originally appearing on screens 50 and 52 to screens 62 and

64. Thereafter depressing the insert key inserts the previously "pulled" label pair at the required sequential position of the video sequence.

The apparatus, by employing the mark and return keys 86 and 81 respectively, can automate somewhat the more laborious sequence noted above. Thus, in the example outlined, the cursor is positioned at screens 50 and 52 and the mark key 86 is depressed. The cursor is then moved and aligned with the labels originally on screens 62 and 64 and the pull key is depressed. The return key is now depressed and the cursor moves, under control on the controller 22, back to the originally marked labels, to passive screens 50, 52, in the example. Thereafter, with the cursors aligned with the labels at which the insertion is to be made, the insert key 84 is depressed.

As noted above, in the preferred embodiment, the apparatus has a "select" bin which operates in a last in, first out (LIFO) mode. The select bin has an essentially unlimited capacity. In fact the select bin capacity is limited by the memory capacity of the system, which is very large. Thus, the cursors can be aligned with a plurality of different label pairs and the segments associated with the label pairs "pulled" in a selected sequence. The pull is made each time by depressing the pull key. The effect of repeatedly pressing the pull key (without "inserting") is to successively store, in the select bin, a desired sequence of label pairs for later recall.

After the selected shots have been thus "pulled" and stored, the cursor is aligned at the position wherein the insert is to be made and the insert key is depressed, for example a number of times equal to the number of "pulls" which have been collected. Each depression of the insert key inserts, at the position designated by the cursor, the next "last" collected label pair still in the select bin. Thus, if eight segments had been collected by depressing the pull key eight times at, for example, different positions in the video sequence, the eight collected segments can be inserted into the sequence at any selected position(s) by thereafter depressing the insert key eight times. Because the select bin acts like a LIFO buffer, the effect is to recall and inset the segments so that they appear, at the end of the insert operation (and assuming that the cursor is not moved), in the same sequential order in which they were pulled. This multiple pull collection system can be employed in combination with the mark and return keys noted above, and further can be used in connection with a home key 82 to insert all of the pulled segments at the beginning of the video sequence for a program bin. Depressing the home key, after the label pair(s) has (have) been pulled, automatically aligns the cursor with the label pair representing the first segment of the program bin sequence. The sequence of operation is thus "pull", "home", and "insert". Note that the mark key is not needed.

Thus far, it has been implicitly assumed that the pull and insert operation occurs solely within one bin and that the various bins function in an equivalent manner. It is appropriate at this point, to discuss further the characteristics of the several classes of bins and how the pull and insert procedure operates differently depending upon the class of the bin. The pull and insert operation can be carried out, as described above, within any of the program bins. The operation however cannot be employed in the select bin which operates solely according to a last in, first out stacking procedure. In the select bin, the characteristic connected sequence of related label pairs, which is typical of the source bin and the program bins, is not present. The select bin, which can be likened to an infinite LIFO storage register, therefore does not permit the pull and insert operation.

Furthermore, the pull and insert operation cannot be employed solely within either the source bin or the discard bin. However, material in either the source bin, the discard bin, or any of the program bin by "inserting". Thus, in its broadest concept, a label pair can be pulled from any program bin, or from the source or discard bins, which results in the pulled label pair being stored in the select bin, and inserted, at any desired location in any program bin. The operator moves a "pulled" label pair to a different program bin by operation of lever 102. After placing the cursor at a specified location in the new program bin, for example by depressing the return key to automatically move the cursor to a previously marked location, the insert key is then depressed, and the "last-in" label pair inserted into the select bin is thereby removed from the select bin and inserted at the location marked by the cursor.

Figure 11E:
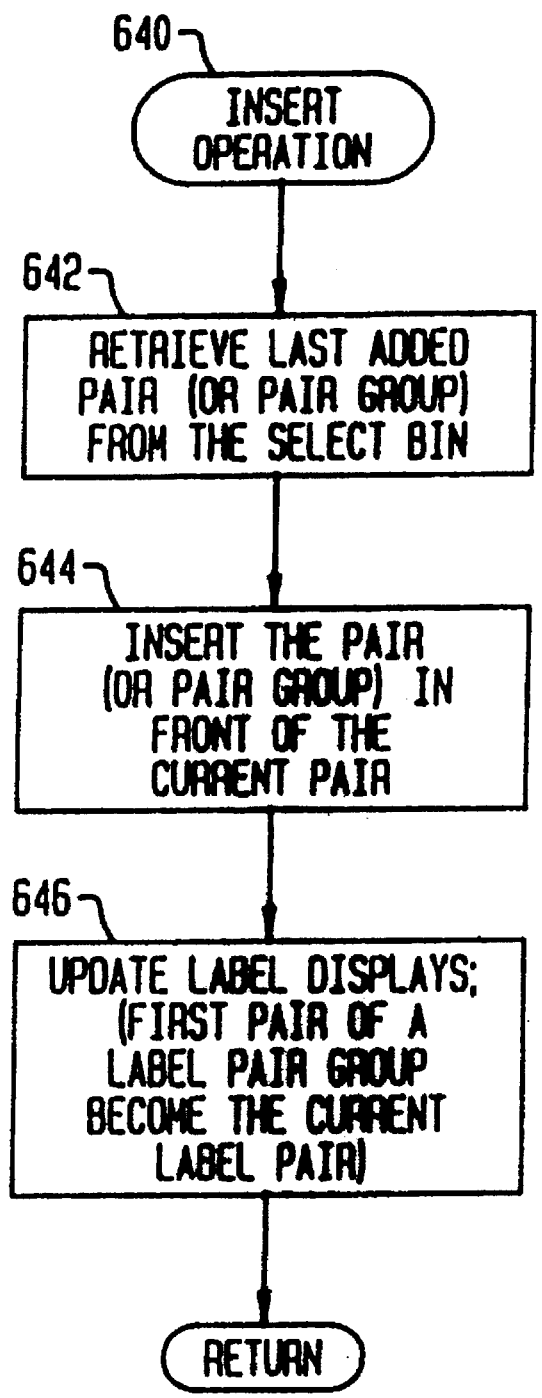

Referring to FIGS. 11A and 11E, when the insert key is depressed, controller 22 begins an "insert operation" at 640. The controller, as noted above, retrieves the last added pair (or pair group) from the select bin at 642 and inserts that pair (or pairs) in front of the current pair, that is, sequentially ahead of the label pair at which the apparatus is presently positioned as indicated by the cursor. This is indicated at 644. Thereafter, the label displays are updated at 646 and the just inserted label pair is made the current pair for the labels. Thus, placing a label pair in front of a current pair has the effect of making the current pair occur later in time than the inserted label pair.

The illustrated source and discard bins do not allow the pull and insert operation to occur solely within the one bin, and the apparatus "defaults" to a different mode of operation for these bin levels of operation. Considering first the source bin, the source bin stores label pairs corresponding to the source video material which has been divided either by machine or by operator into a sequence of segments. Since, in accordance with the preferred embodiment, it is not permissible to pull and insert within the source bin, the operator has two bin related options. The first option allows the operator to designate, through the keyboard 104, a program bin into which pulled label pairs from the source bin are to be inserted. In accordance with this aspect of the apparatus, there is no need to "pull" and "insert"; rather, the label pairs are automatically transferred from the source bin into a designated program bin location when the "insert" key is actuated. In particular, the segments will be inserted in the specified program bin at a specifically marked position, previously designated by the editor. Alternately, as a second option, if no program bin is designated, the apparatus defaults to a predetermined program bin into which pulled source bin label pairs are automatically placed at the "home" position.

The discard bin operates in a manner substantially identical to the source bin. The pull and insert procedure cannot be followed within the discard bin itself; and therefore, the apparatus either inserts "pulled" label pairs from the discard bin at a marked location in a specified program bin, or the label pairs are placed at a machine-determined default option location in a system specified one of the program bins.

The sort mode has a further powerful grouping capability which allows several segments to be treated as one segment. For example, several segments can be grouped or collapsed into a single segment in a single operation. This operation, "segment grouping", is effected by depressing collapse key 94 and the left accept key 99 for fixing the top cursor, thereafter moving the bottom cursor to the right (note that this is the only direction in which the bottom cursor can be moved) using cursor position lever 100. After the bottom cursor is fixed at the desired position, the right accept key 88 is depressed. The result is to collapse into one label pair a plurality of sequential label pairs, that is, to describe a plurality of segments together as a single segment. The top cursor identifies the top (beginning) label of the new label pair and the bottom cursor identifies the bottom (ending) label of the new label pair. Thereafter, the group of segments is treated as a single segment and is represented by a single label pair.

Segment grouping can only be accomplished if the segments to be collapsed occur sequentially (i.e., are contiguous) in the original source material if only the serial storage VTR's 13 are used for storing incoming video frames. This limitation, which is in part a direct result of the method used for describing a segment, that is, using a pointer from the present segment to both the previous segment and the next segment, limits the power of the operation in this implementation. On the other hand, if the serial access storage means 15 is utilized to store the incoming video frames, the ability to recall digitized segments in real time, and in substantially arbitrary order, is not only quite possible, but is relatively easy to implement. For example, an internal bookkeeping system can be established to maintain a list of pointers for segments within a segment. Thus, the above limitation of serial storage is eliminated.

Figure 11F:
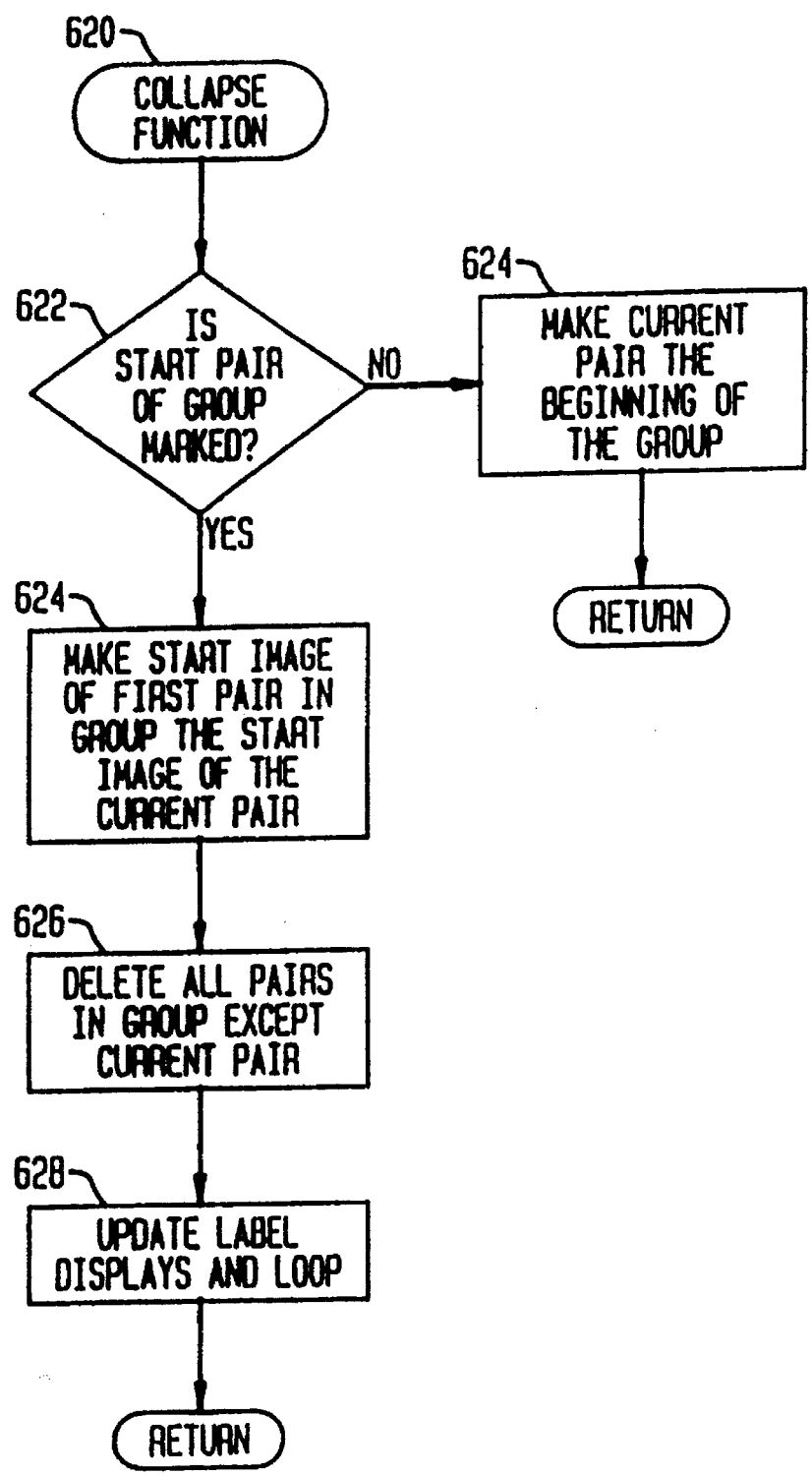

The concept of segment grouping can be further described in connection with the operation of controller 22, with reference to the flow chart of FIG. 11F. Segment grouping can be achieved, as noted above, by first pressing the collapse key 94 and the accept key 99. When this occurs, the apparatus enters the collapse portion of its operation at 620 and first determines whether the accept key has been previously depressed (in which case the starting label pair for the new grouping, would have been previously marked). When the accept key has not been previously pressed by the editor, referring to the decision block 622, the current label pair is denoted as the beginning pair of a new group, (at 624), and the apparatus returns to the normal monitoring mode of operation. When the collapse function 620 is entered after the right accept key 88 has been depressed, that is, as noted above, after the bottom cursor has been moved to identify the ending label pair of the newly defined segment, the controller 22 follows the decision path to the operations indicated at 624. Thus, the first label of the first pair of the group is designated as the starting label for a new collapsed segment; and the ending label of the first segment is changed to the ending label for the last label pair of the collapsed group. Thereafter, at 626, all other pairs in the group, that is all pairs except the current pair, are deleted. The label display and the displayed segment loop are then Updated, at 628; and the controller returns to the normal monitoring mode of operation.

More generally, the grouping capability can be extended to all operations. The grouping function is initiated by pressing accept key 99 and the desired function key simultaneously. This defines the beginning label pair of the group. The bottom cursor then blinks and, as noted above, can be moved by the cursor lever 100 while the top cursor stays positioned above the selected beginning label pair so long as that beginning label pair remains on the passive display screens. Using the control wheels, the selected beginning of the new segment can be scrolled off the display screens, in which case a top cursor indicator is not longer lit. Thereafter, the accept key 88, in conjunction with a function key, defines the entire operation to be performed on a group of segments. For example, the accept keys can be employed in conjunction with the mark key to define a display loop which includes all or part of a program bin.

Once the desired program sequence, or a portion thereof, has been edited, the sort mode has a further powerful capability for reviewing a part or all of the edited program, quickly and prior to the time consuming practice of on-line conformation. Thus, if for example, a program must be further shortened or lengthened, appropriate sequences for reediting can be identified quickly within the context of the surrounding program material. The identified segments can then be reedited using the trim or splice modes without requiring the second confirmation as is the current practice.

This review operation is effected by first placing the cursor at the label pair associated with the first segment in the sequence to be viewed, and then fixing it in position by pressing the accept key 99 together with the sort key 83. The bottom cursor component originally associated with the ending label of the first label pair is then moved from a position juxtaposed to the ending label of the label pair associated with the ending segment. The control wheel 74 and/or the cursor positioning lever 100 operate to move the cursor bottom component and the cursor is fixed in position at the indicating element associated with the ending label of the ending segment label pair by again pressing the accept key 88 together with the sort key 83. The program material referenced by all label pairs located between the two cursors will now be displayed on the main monitor screen 32 in a continuous looping fashion until interrupted by pressing the sort key 83.

In accordance with this aspect of the sort mode, the controller 22 determines a sequence in which the VTR's and/or the random access storage means 15 are to present the continuous loop display of the segments identified as described above. The controller thereafter issues the necessary commands to the VTR interfaces or to the storage means 15 describing the time at which a VTR or other storage means is to operate, the position on the storage medium at which operation is to take place. In this manner, the controller 22 creates what is in effect a time sequenced list of commands which determine how the grouped segments will be displayed on screen 32.

The apparatus has further sort mode capabilities for enabling easy and convenient editing of the source material. Thus, the split key 98 causes a segment represented by an identified single label pair, the label pair being the one denoted by the cursors, to be split into halves, or quarters, etc., by pressing the split key one or more times.

The sort mode employs the replicate key 85 to reproduce a label pair, and in effect the corresponding segments, without removing the original label pair, and in effect the corresponding segments, without removing the original label pair from its current location in, for example, a program bin. Thus, depressing the replicate key causes the controller 22 to reproduce the selected location and position of the label pair PAIR in the bin in which it is presently positioned.

The discard key, operating in the sort mode, moves a label pair (and hence effectively the segment to which it refers) from a present location to a designated position in the discard bin.

The apparatus further has the capability of inserting black video, of a predetermined length, at a selected position in the video sequence of any program bin. The black video is inserted at the position indicated by the cursor, positioned by lever 100. Depressing black video key 87 implements this operation. In the preferred embodiment, a preselected black segment having a length of one second is inserted at the position indicated by the cursor. Longer segments of black can be built up by repeatedly depressing key 87. Optionally, black segments of any desired length can be defined using the keyboard 104 and monitor 105. The black segments are treated like any other segment in the system and can be reduced in time length by operation in the trim mode.

The Trim Mode of Operation

With reference to FIGS. 2, 3, 3B and 3A, in the trim mode, entered by pressing the "trim" key 78, the length of a segment can be shortened or lengthened. The cursor position identifies the segment to be trimmed; and, as noted above, the beginning label of the segment appears on screen 34 and the ending label appears on screen 36. This display of the segment loops on the main screen 32. The trim mode can be used in connection with any program bin and with the select bin.

The left control wheel 76 controls the pictorial display on the intake screen 34, and the right hand control wheel 74 controls the pictorial labels used herein are, as noted above, the first and last frames of a segment. Thus, when the control wheels change the duration (either shorter or longer) of a displayed segment, either at the beginning or end of the segment (or both), the pictorial labels associated with the newly defined segment automatically appear on screens 34 and 36. The original label pair, shown on the passive display screen, does not change. For each wheel 74, 76, counter-clockwise rotation causes contiguous frames prior to the then displayed label to appear as a "temporary" pictorial label on the screens 34, 36, respectively, while clockwise rotation causes contiguous frames subsequent to the then displayed label to appear as a "temporary" pictorial label. Each wheel detent, as noted above, corresponds to one video frame. The central display 32 provides a continuous loop display of all the frames from the "temporary" intake label on screen 34 to the "temporary" outtake pictorial label on screen 36. When the accept keys 88 and 99 are simultaneously depressed, the respective "temporary" pictorial labels are made permanent and the new segment definition is fixed. When the beginning and ending of the segment has been so accepted, the new labels describing the segment automatically replace, in the spatial array of passive display screens, the original labels previously associated with the segment. These "fixed" labels can be trimmed again if needed.

In the trim mode, when a particularly long segment is being shortened, it is generally desirable to employ a first rough approximation to the shortened segment prior to precisely trimming it. There is provided, therefore, as the segment is being displayed in the trim mode on the main active screen, the capability of marking the beginning and the end of the segment "on-the-fly". The proposed new beginning or intake of the segment can be flagged by depressing mark key 86 together with the other accept key 88. Similarly, the proposed new end or outtake of the segment can be flagged by depressing mark key 86 together with the other accept key 99. This rough cut procedure automatically designates the marked frames as the temporary labels appearing on screens 34 and 36 and allows a precise trim to thereafter, and more easily, take place.

The trim mode of operation described above is called the "video-style" of trimming. In addition, there is a second style of trimming, termed "film-style". To enter the film-style of trimming, the operator presses the trim key 78 a second time. The trim key can be pressed repeatedly to switch back and forth between the two styles of presentation.

According to the film-style of trimming, the controller 22 modifies the display presented on the passive display screens and replaces the label pairs adjacent to the label pair of the segment being trimmed with the frames adjacent the beginning and ending labels. That is, the upper row of passive display screens 42, 46, 50, ... 66 display the beginning label (at the cursor position) and the frames immediately preceding and immediately succeeding the beginning label to the left and right of the label, respectively. Similarly, the bottom row of passive display screens displays the ending label of the segment to be trimmed and the frames immediately preceding and succeeding that ending label. The rotation of control wheels 74 and 76 then varies the upper and lower presentations respectively by sliding the respective presentation to the right or left hence moving temporary labels into the selected cursor position. These temporary labels can be made permanent as described above by pressing both accept keys 88 and 99.

Figure 12:
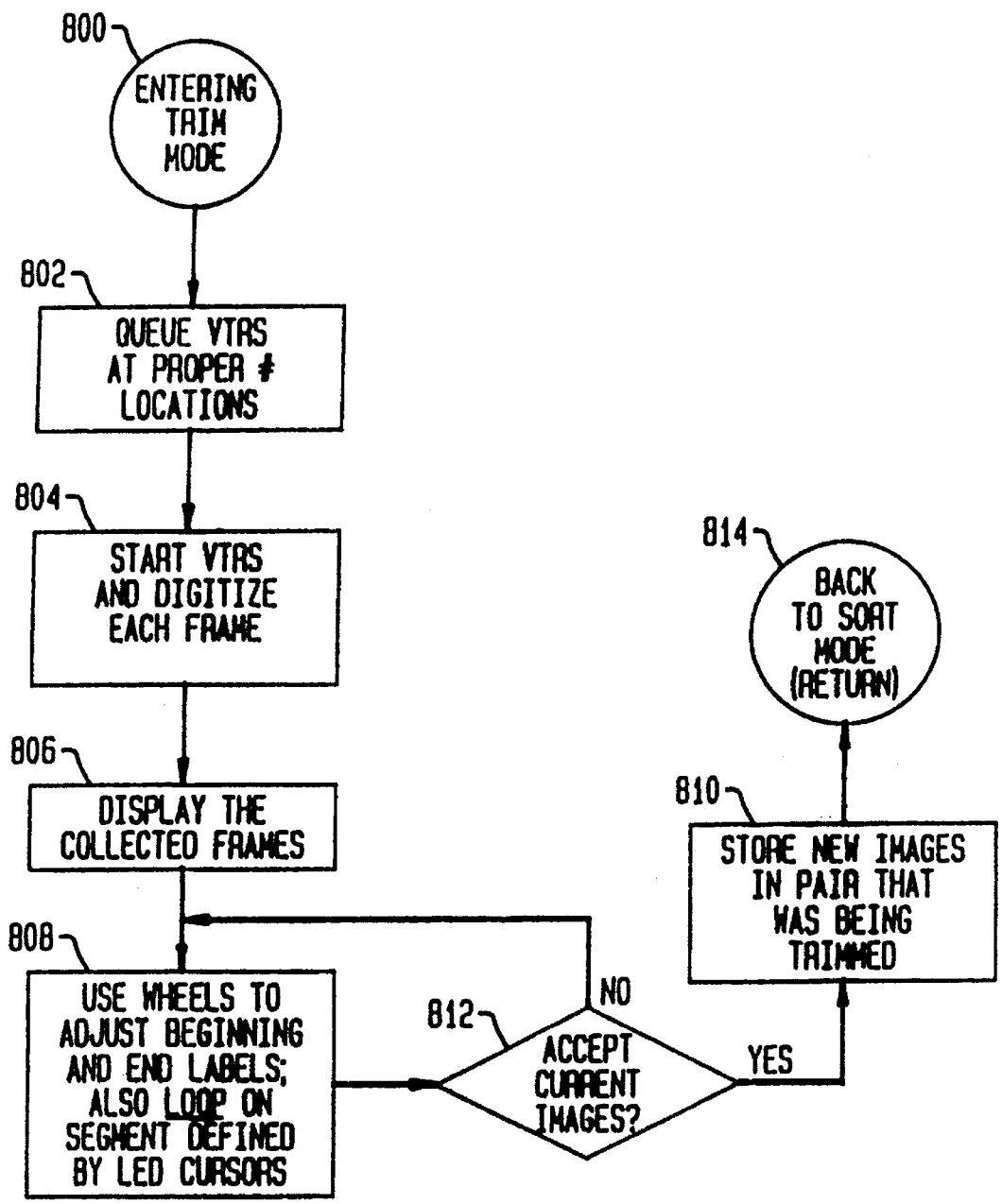
FIG. 12 illustrates a flow chart showing controller operation during the trim mode of operation.

Initially, there will be described a trim operation where the serial storage VTRs have been used to store the video input(s). Referring now to FIG. 12, when the trim key 78 is pressed, the apparatus enters the trim mode at 800 and controller 22 first moves the various video tape recorders (VTRs) to the initial locations for digitizing frames centered around the beginning and ending labels of the PAIR denoting the displayed segment. This is performed at 802. Typically, the controller 22 positions the video tape recorders at positions approximately sixty frames ahead of the beginning and ending labels, and then operates the VTR's to digitize and store all frames in the segment. Thereafter, if the apparatus is in the film-style display mode, a set, comprising fourteen of the collected digitized frames centered around the beginning and ending labels, is displayed on the passive display screens as outlined above. This is indicated at 806. On the other hand, if a video-style trim is to take place, the collected frames are displayed on the active monitors as described previously. The operator can then adjust the beginning and ending labels, as indicated at 808, while the controller responds thereto and continues to loop the segment defined by the cursor on the main display screen. If the current temporary labels are acceptable, they are stored as new images in the PAIR that was being trimmed. This is indicated at 810. If, however, the current temporary label is not acceptable, that is, the accept keys have not been pressed, the controller 22 loops back to redo, if required, those temporary labels. This decision point is indicated at 812. Once the new labels are accepted, the apparatus automatically returns to the sort mode of operation at 814.

On the other hand, where the random access storage means 15 has been used to store the video input(s) and wherein digitized labels have been initially created and stored for each incoming video frame, it is merely for the operator to designate a sufficiently large film segment which is then quickly displayed on the active monitors as discussed above because the digitized labels have been performed. The trim operation then continues in the video-style trim manner, as also discussed above.

In the film-style presentation, the apparatus advantageously highlights the labels as follows. In the upper row of labels, those labels which represent frames to the left of the cursor indicated position are dimmed while those labels, including the label at the cursor indicated position, which represent frames after, in time, the currently displayed beginning label, have a brightened display. Thus, the brightened labels represent the beginning of the segment, starting with the beginning label frame and including those later frames available for selection as the beginning label. Similarly, the dimmed labels of the upper passive display row represent frames which occur prior to the present beginning label. Correspondingly, in the lower row of passive display screens, the labels representing frames prior to and including the present ending label are brightened and the screens representing frames which occur after, in time, the present ending label are dimmed. As a result, the pictorial display shows in brightened labels those frames which form the beginning and ending portions of the looplag segment, and shows in dimmed labels, those frames which are outside of the looping segment.

The Splice Mode of Operation

In the splice mode, entered by depressing the transition key 89, controller 22 displays two segments of video in connected sequence. The segments are selected under cursor control, and the cursor position is selected prior to entering the splice mode. Upon entering the splice mode, the cursor automatically splits, the upper cursor component moving one spatial position (or screen) to the fight of the bottom cursor component. The two segments associated with the respective label pairs are played in time sequence on the main screen 32 to display the splice.

Where serial storage VTRs are being used, the splice display presentation on the main screen requires at least two video tape recorders, one recorder to the "from" segment and the other recorder for the "to" segment. Thus it is transition between two contiguous label pairs which is being edited. Screen 32 displays the transition sequence in a continuous loop presentation from the video recordings available from the VTR's. Screens 40 and 34 display the transition label pair, made up from the end label of the label pair of the first transition segment, this end label being the first label of the transition label pair, and the beginning label of the label pair associated with the second transition segment, this beginning label being the second label of the transition label pair.

Screen 32 displays the output of the first VTR before the transition followed by the output of the second VTR after transition. Further, in the illustrated splice mode, as in the trim and sort modes, a loop interruption delay, for a "psychological break", is advantageous and controller 22 provides the delay before the first segment of the transition is rerun, that is, before each repeat display of the two segments.

Some transitions, such as an overlapping fade-out fade-in transition or a wipe, will require an overlap of two successive segments. During the overlap time, the video effects switcher 136 employs portions of the outputs of both the first segment VTR and the second segment VTR to generate the display for screen 32. The default option, in this case, according to the illustrated embodiment, assigns as the first label of the transition label pair that frame of the first segment at which the "from" segment ends, and the second label of the transition label pair is that frame of the second segment at which the "from" segment ends, and the second label of the transition label pair is that frame of the second segment at which the "to" segment begins. The transition label pair thus defines the transition point. The control wheels 74, 76 control the shifting and marking of the transition labels in the splice mode in a manner corresponding to the trim mode. The acceptance of the new transition labels is indicated by simultaneously pressing the two accept keys.

On the other hand, where the random access storage means 15 is employed, the splice operation may be effected with a single Winchester hard disk or Laser read/write disk in a manner similar to that discussed above using the serial storage VTRs, although it is preferred that a plurality of the random access storage devices be used for speed.

The initial beginning and end of the transition is automatically preset by the apparatus when the operator/editor depresses one of the transition selection keys 90, 91, or 92. For example, when the dissolve key is pressed, the length of the dissolve is determined by the transition speed lever 101 and can vary between, for example 15 and 105 frames, in fifteen frame increments. Preferably, the range of variation can be changed at the keyboard terminal. Further, the default option of the dissolve transition is timed to begin at the first label of the transition label pair and to proceed for its set length. However, an operator can alter this default option using the keyboard so that the transition either ends at the ending transition label or has its length split equally between the beginning and ending transition labels and about the transition point.

Similarly, the wipe key causes the transition to be one of seven preselected "wipes". The wipes are selected by repeatedly pressing the wiped key while the transition speed lever 101 is at the center position. The seven wipes can be selected from among the available SMPTE standards 0–24 through the keyboard. The length of the transition is set by the transition speed lever. The length of the transition is set by the transition speed lever. The length can be, for example, 30, 20, or 10 frames left to right, or 10, 20, or 30 frames in the reverse direction. The keyboard can be employed for determining the transition length.

The soft cut key 92 selects a short dissolve and performs like the dissolve key except that the default speeds are significantly less, for example 2, 4, 6, . . . 14 frames. Similarly, the cut key causes the transition to be a cut which can be considered an extreme of a dissolve wherein the dissolve has zero length.

Lever 101 thus provides the operator with the flexibility of controlling transition speed, even during transition.

In summary, during the splice mode of operation, controller 22 operates the routing circuitry 134 (FIGS. 2 and 6) so that displays 40 and 34 show the freeze frame pictorial labels representing the temporary transition label pair currently being viewed. The freeze frame video is available to routing circuitry 134 from a VTR operating in the freeze frame mode or, preferably, from either the random access storage means 15 or the stored digitized pictures in cache memory. Further, displays 38 and 36 can, if desired, display the output of the "first" and "second" segment sources respectively both before and after the transition point. The outputs displayed on screens 36 and 38 therefore show the "from" segment after the transition point and the "to" segment before the transition point.

As noted above, controller 22 provides, in response to the keys 90, 91, 92, special transition effects between two segments. The transition between two segments is accordance with the fade-in fade-out, wipe, dissolve, etc. procedures, correspond to those standardly used on commercial television, and controller 22 provides these effects using the video effects switcher 136. In this manner, special transition effects can be inserted into the program material by the operator through the console 12.

Figure 13:
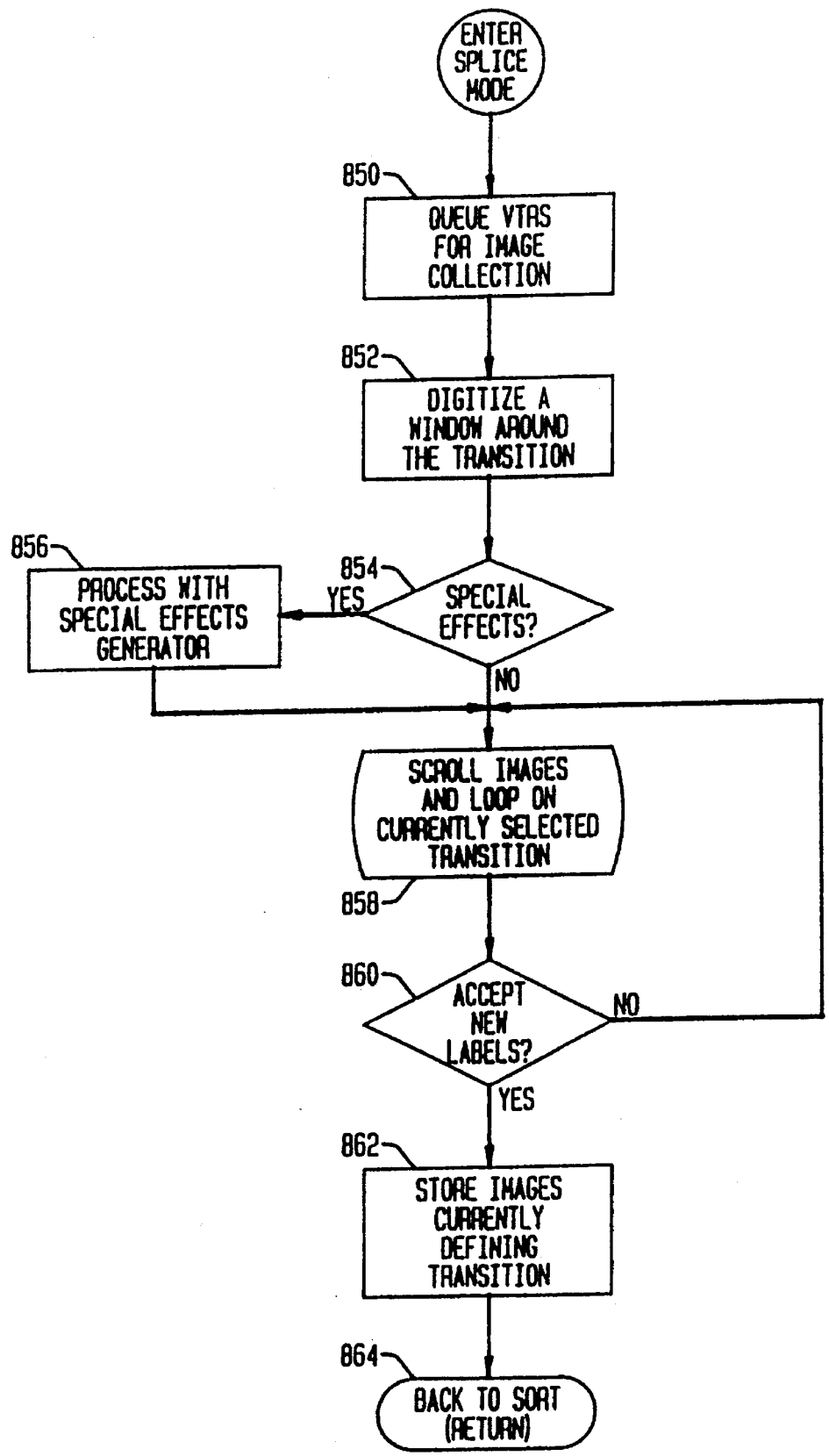
FIG. 13 illustrates a flow chart showing controller operation during the splice mode of operation.

Referring to FIG. 13, in those situations where serial storage is being used and wherein digitized labels are initially created for only select incoming video flames, the controller 22, during the splice mode of operation, first queues the video tape recorders for collecting flames images for digitization, storage, and possible later display. Thus, the video tape recorders are initialized at 850 to a location in advance of the transition point, for example, about sixty flames in advance thereof, for each segment. Thereafter, the flames adjacent the transition point for both the "to" and "from" segments are digitized, at 852, so that the apparatus has in storage the digitized frames which can form a new transition point preferably, all frames in the segment are digitized for storage. Preferably, all frames in the segment are digitized for storage. On the other hand, it is preferred (as discussed above) that each incoming video frame will have a digitized label created therefor, so that the above operation can be eliminated. Thereafter, controller 22 scans the special effects transition keys 90– 92, as indicated at 854. If one of the keys has been pressed, that selected transition is processed by the controller 22 using the special effects switcher 136. This is indicated at 856.

The controller 22 next presents the frames for display either in the film-style display on the passive display screens or in the video-style display on the active display screens, and in either case, concurrently loops the transition on the main display screen 32. This is indicated at 858. (As described in connection with the trim mode of operation, repetitive pressing of the splice key causes the controller 22 to switch between the video-style presentation and the film-style presentation.) The transition point can be changed, at any time, by using the control wheels 74, 76 to designate a temporary transition label pair, and hence a temporary transition point. When a temporary new transition point has been accepted, at 860, by pressing the two accept keys, the temporary transition labels are made permanent, at 862, and the labels are stored and the transition PAIR is updated. The controller then returns to the sort mode of operation at 864. If the temporarily selected labels are not accepted, the controller 22 continues to loop the system until an acceptable transition sequence is adapted (or the splice mode is otherwise exited). Thus, while not shown in FIG. 13, the editor can leave the splice mode of operation by pressing the trim or sort keys, leaving whatever permanent selections have been made intact, and otherwise defaulting to the conditions under which the splice mode was entered.

In the splice mode of operation, when the film-style presentation is employed, the passive display screen has different brightness to better illustrate the present transition. In particular, in the upper row of screens, the pictured frames to the left of the cursor-indicated frame are dim while the cursor-indicated frame and those frames to its right are bright. Thus, the bright frames indicated those frames which form part of the transition and which occur at and after the transition point. The dim frames represent those frames occurring prior to the transition point. Correspondingly, in the lower row of screens, those frames occurring to the left of and including the cursor-indicated transition label are bright, while those frames occurring to the right of the cursor-indicated label are dim. Thus, the screens which are bright represent the flow or sequence of frames into and through the transition point.

System Operation

In typical operation of the preferred embodiment using serial storage VTRs, the apparatus repeatedly displays a single segment in the sort mode as follows. Two video tape recorders, which contain identical copies of the segment, are each initially positioned at a location in advance of the segment. Referring to FIG. 6, data, provided by the controller 22 to each video tape recorder associated interface, designates both a start time and a start position, as well as an ending position, for each recorder. At the earlier start time, which is referenced to the system clock generator 140, one of the video tape recorders begins to provide video signals to the routing circuitry 134 and hence to the video effects switcher 136. Controller 22 directs the selected video to the main display 32. At at time prior to the end of the segment being displayed, the second video tape recorder begins operation in accordance with timing and position instructions previously received from the controller 22. At the end of the segment display provided by the first tape recorder, the video effects switcher changes the source of the signal connected to screen 32 from the first tape recorder to the second tape recorder, (both signals being available to it over lines 204, 206), the timing being such that the second tape recorder, already up to speed, just begins the segment to be displayed at the transfer time. Video effects switcher 136 thus switches from the first tape recorder, over for example line 204, to display the beginning of the segment coming from the second tape recorder over for example line 206. (The timing is changed if a "psychological delay" is inserted between successive segments. In that instance, controller 22 varies the timing to the second tape recorder so that it begins to play just after the delay time. A third VTR can be employed by controller 22, and its output selected, during the delay time.) Alternately, the presence of a "psychological delay" between the display of successive repeating segments can eliminate the need for the second tape recorder so that a single tape recorder can be rewound and restarted prior to the end of the psychological delay time. In that instance, the apparatus can employ one VTR. Note however, if the segment being displayed is relatively lengthy, the rewind time could exceed the allotted psychological delay time. In this instance, either two tape recorders would be employed or the psychological delay can be lengthened to allow the VTR sufficient rewind time.

As the second recorder operates and provides video to screen 32, the first tape recorder stops and rewinds to a position before the beginning of the segment so that at the end of the segment then being displayed from the second tape recorder, the first tape recorder will be ready to display the segment again. This sequence of operations can provide a continuous non-interrupted loop (or as noted above, an interrupted loop) repeating the selected video segment.

Alternatively, where the random access storage means 15 is employed, a single Winchester hard disk or a single Laser read/write disk can be very effectively used in place of the two VTR's in the above-described system operation since these random access storage devices are extremely fast in comparison to the VTRs.

In addition to the display on screen 32, screens 34 and 36 receive, through routing circuitry 134, the pictorial labels associated with the then current segment. These labels are provided under the control of the controller 22, either from other video tape recorders operating in a freeze frame mode, from the display processing unit 112 over lines 202, or from storage such as the cache memory.

The Control Panel

The composing apparatus, whether it operates in the sort, trim, or splice modes requires substantial hand and eye interaction. In particular, the operator/editor must inevitably watch not the hand controls but the various video screens on monitor 31 in front of him to make the necessarily precise decisions with respect to sorting the source material, moving it from bin to bin, trimming it, and effecting transitions from segment to segment. The control panel thus has a configuration to provide significant tactile feedback to the operator so that, without looking at the manual controls, the operator has a full understanding, gained through use, of where the various keys and levers are located.

Figure 9:
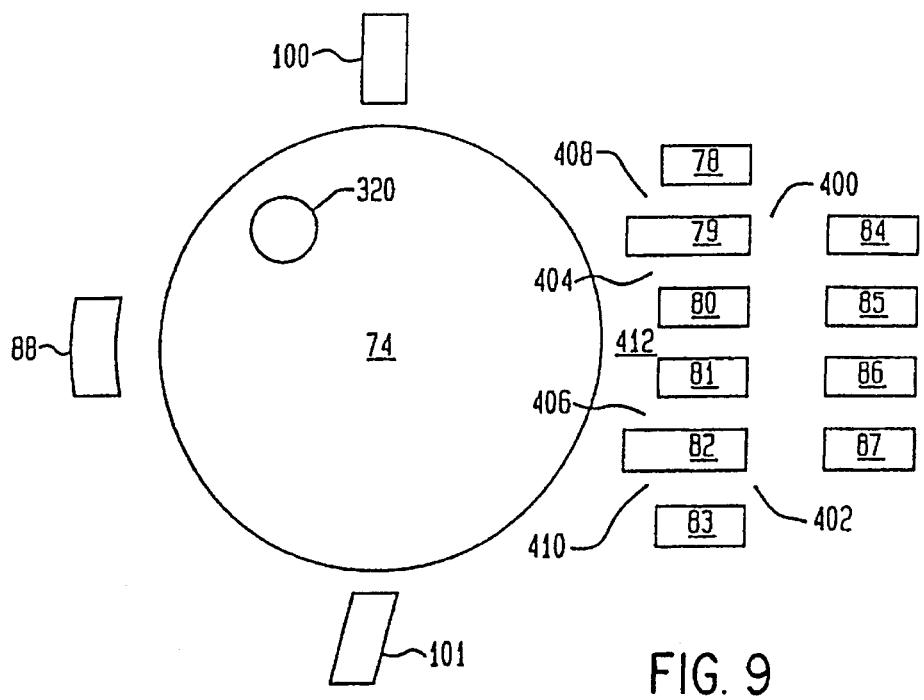
FIG. 9 illustrates an enlarged plan view of a manual control assembly for the apparatus.

Referring now to FIG. 9, which is an enlarged view of the control wheel 74 and its associated keys and levers, the key structural configuration has plural structural subconfigurations for providing positive tactile feedback which enables the operator to select the proper keys without actually looking at them. An upper 400 and a lower 402 exterior region provide respectively automatic positioning for the fingers with regard to keys 78, 79, and 84 (upper region 400) and keys 87, 82, and 83 (lower region 402). Furthermore, the middle keys, keys 79, 80, 81 and 82 have a structure wherein two keys have a longer lateral reach (keys 79 and 82) and two keys have a shorter lateral reach (keys 80 and 81). These keys, having different lateral reaches, define interior upper 404 and lower 406 regions of tactile stimulation which provide positive positioning feedback with respect to the interior keys in the row, adjacent wheel 74. The remaining keys, keys 85 and 86, are automatically referenced with respect to the known keys surrounding them. As a result, all of the elements of the hand operated composition control panel are locatable without visual confirmation.

Note also that keys 78 and 83 have a shorter lateral extent than keys 79 and 82 or keys 80 and 81 to provide a yet further positive tactile stimulation feedback regions 408 and 410. In addition, the short lateral extent of keys 80 and 81 enables a space to be developed between control wheel 74 and keys 80 and 81 to provide a further internal feedback region 412.

Another non-visual feedback parameter, as noted above, is the number of detent positions specified for a full 360° rotation of control wheel 74 (or 76). A complete revolution, thirty detent positions, corresponds to one second of video in the trim and splice modes. This enables the operator to easily and accurately increase or decrease the length of a segment without looking at the control panel. The relatively isolated location of the accept switches 88 and 99, and of the levers 100, 101, 102, and 103 described in detail above, enables an operator to find and use these manual elements without visual confirmation. Thus, the structural configuration of the manual controls permits the operator to maintain visual contact with the video displayed on the screens while tacthe feedback from the manual controls substantially eliminates the need for visual confirmation.

Figure 14:
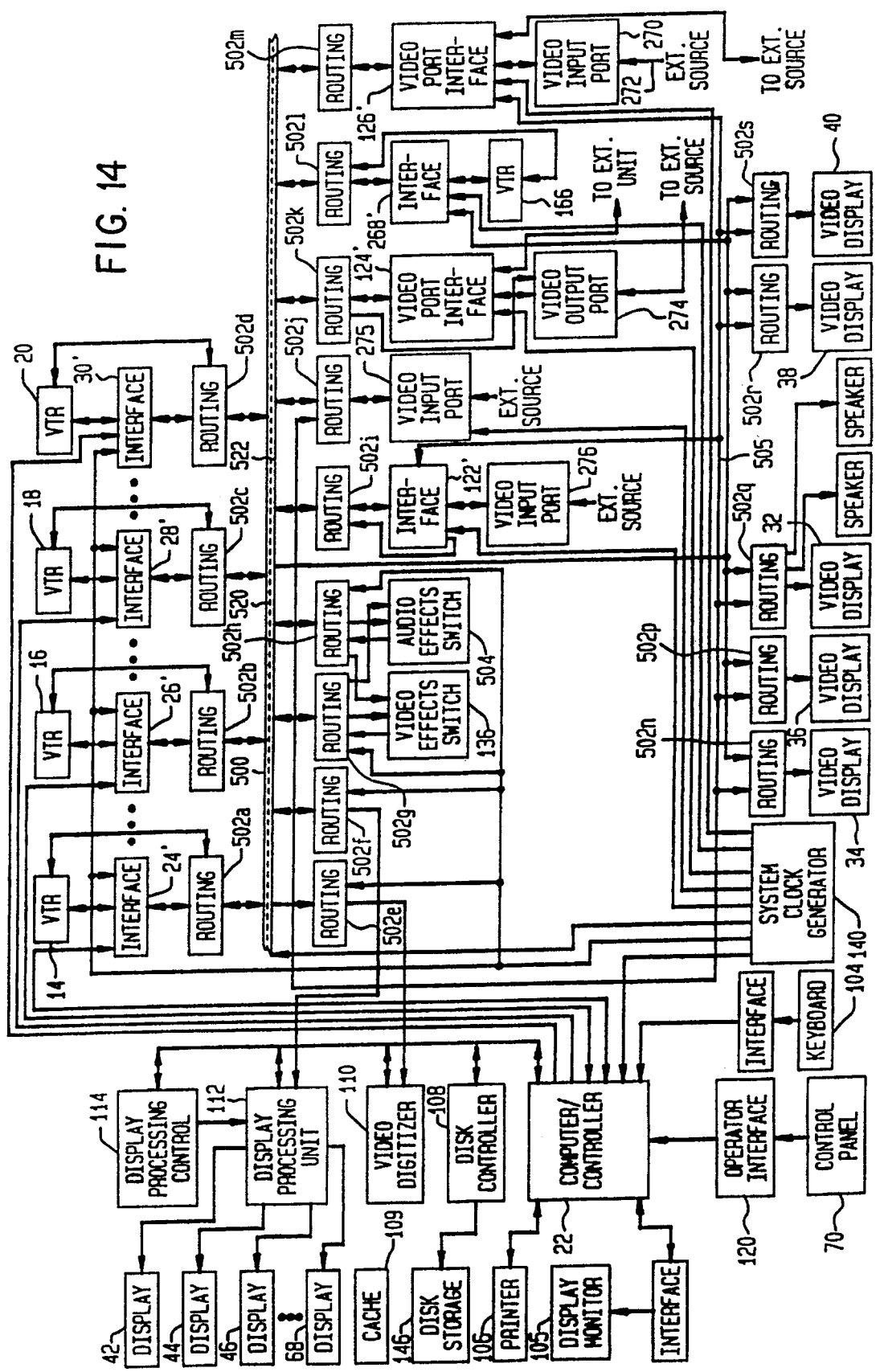
FIG. 14 illustrates another embodiment illustrating an alternate routing circuitry to that of FIG. 2.
Figure 14A:
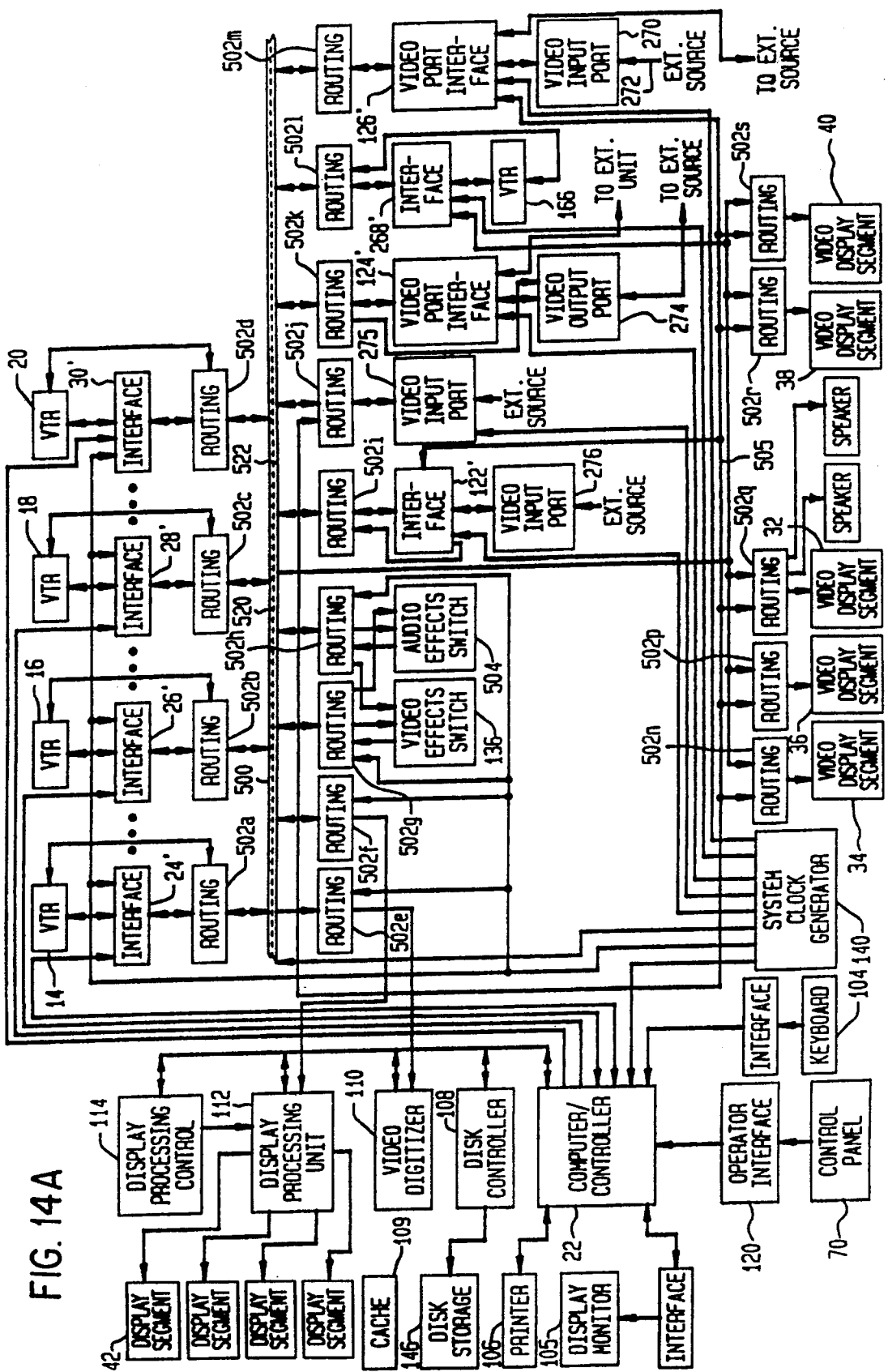
FIG. 14A illustrates an alternate routing circuit to that of FIG. 14.

Referring to FIGS. 14 and 14A, an alternate flexible routing structure features a video/audio bus 500 wherein each video signal and each audio signal is assigned to a distinct transmission path, here a transmission wire pair. Further, each element requiring a signal from or connecting to the bus 500 makes connection through a routing circuit 502a, 502b, . . . 502s. Each routing circuit in this illustrated embodiment is identical to each other routing circuit except that each routing circuit has a different address and is hence addressable, directly or indirectly, from, for example, the controller 22. Each routing circuit operates to connect any line of the bus 500 to an associated operating station under the direct or indirect control of controller 22 and to connect a line of an operating station to its assigned bus line.

Figure 15:
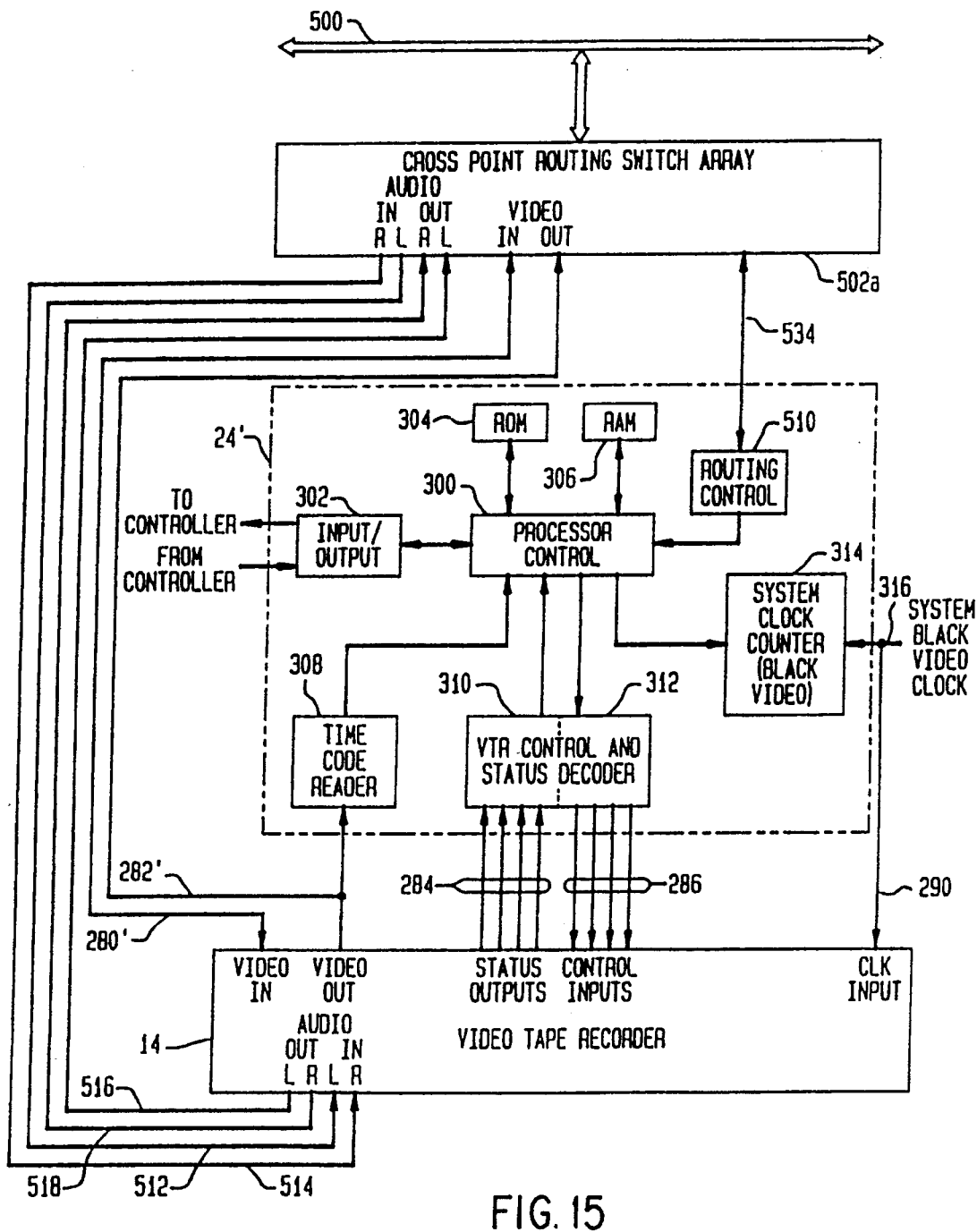
FIG. 15 illustrates a detailed block diagram of a video tape recorder interface as modified for the routing circuit of FIG. 14.

Referring now to the video tape recorders 14, 16 18, 20, each video tape recorder connects to a video tape recorder interface and to a routing circuit. The video tape recorder interface is similar to that interface described in connection with FIGS. 2, 2A and 8 and is modified therefrom to accommodate the routing circuit, that is, to provide control for the associated routing circuit over the video (and audio) signals connected between the video tape recorder and the routing circuit (FIG. 15). Again, it is understood that the embodiment of FIG. 14, 14A may include a random access storage means 15 rather than or in addition to the VTRs 14, 16, 18, 20.

In a substantially similar manner, the video effects switch 136, the video input port 276, the video input port 275, the video output port 274, the video tape recorder 166, the video input port 270, the video digitizer 110, the display processing unit 112, and the video display screens 32, 34, 36, 38, and 40, each have associated therewith a routing circuit for making available to the particular operating station any of the video signals on bus 500 and making available to the assigned bus paths of bus 500, any video signals emanating from the operating station. In addition, there is illustrated in FIGS. 14 and 14A, an audio effects switch 504. This switch allows the audio signal to follow the video signal. The switch can be obtained commercially and operates in response to and under control of the controller 22 to modulate and switch audio signals available from bus 500.

Referring to FIG. 15, a typical modified VTR interface circuit 24', corresponds substantially to the circuit of FIG. 8 with the addition of a routing control circuit 510. Routing control circuit 510 connects to the control processor 300 and receives from processor 300 address and routing bus identification signals which are stored in circuitry 510 and are provided to the routing circuit 502a. Circuitry 510 comprises a plurality of latches which store data from control processor 300, the data including the specific address of the routing circuit 502a and the specific connections between the VTR inputs and the routing bus 500. The processor 300 receives the instruction data from the controller 22. The video tape recorder receives from the routing circuit a video input over a line 280', and audio inputs over lines 512 and 514. Similarly, the video tape recorder provides to the routing circuit, a video output over a line 282' and audio outputs over lines 516 and 518. In other respects, the operation and configuration of interface circuits 24 and 24' are the same.

Figure 16:
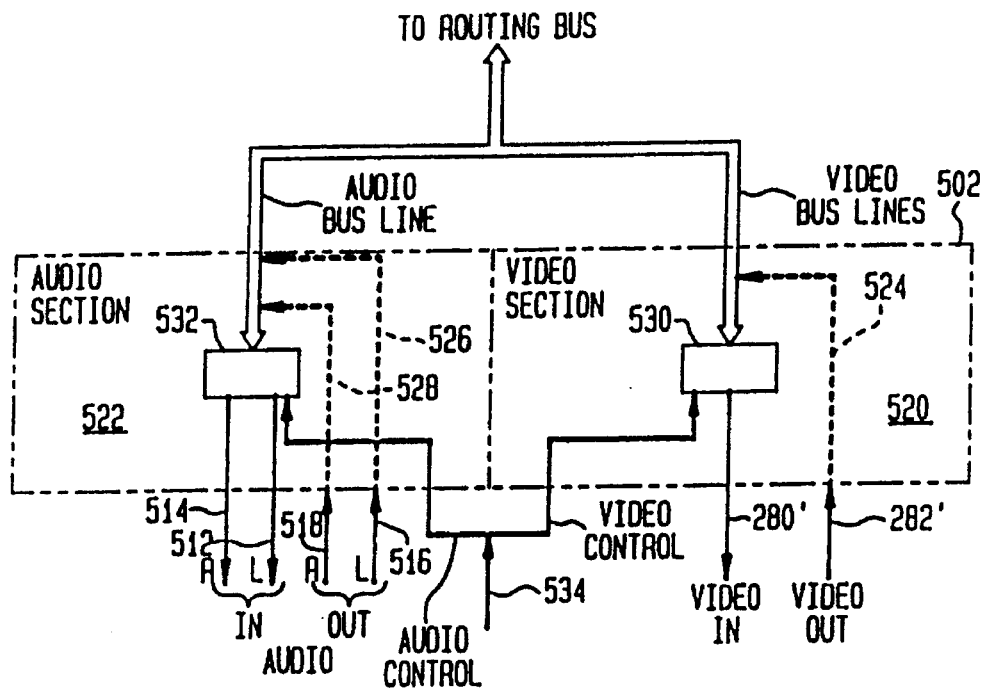
FIG. 16 illustrates a detailed electrical block diagram of the routing circuit of FIG. 14.

Referring now to FIG. 16, each routing circuit 502 has a video section 520 and an audio section 522. In the video section, the video, for example from a VTR over line 282', connects directly to the assigned bus path of the video bus portion of the routing bus. The internal connection is illustrated by the dashed line 524. Similarly, the audio inputs from, for example, a VTR over lines 516 and 518, connect directly to assigned lines of the audio bus portion of the routing bus as indicated by dashed internal connection lines 526 and 528, respectively. More or fewer direct internal connections can be employed.

Each section of the routing circuit 502 employs a cross-point switch array, 530 and 532, for connecting any audio or video line of the routing bus to the inputs of an operating station, such as a VTR video input. The cross-point switch arrays 530 and 532 receive control signals from a VTR interface over lines 534. Lines 534 reflect for example the outputs of the latch element of circuitry 510.

Figure 17:
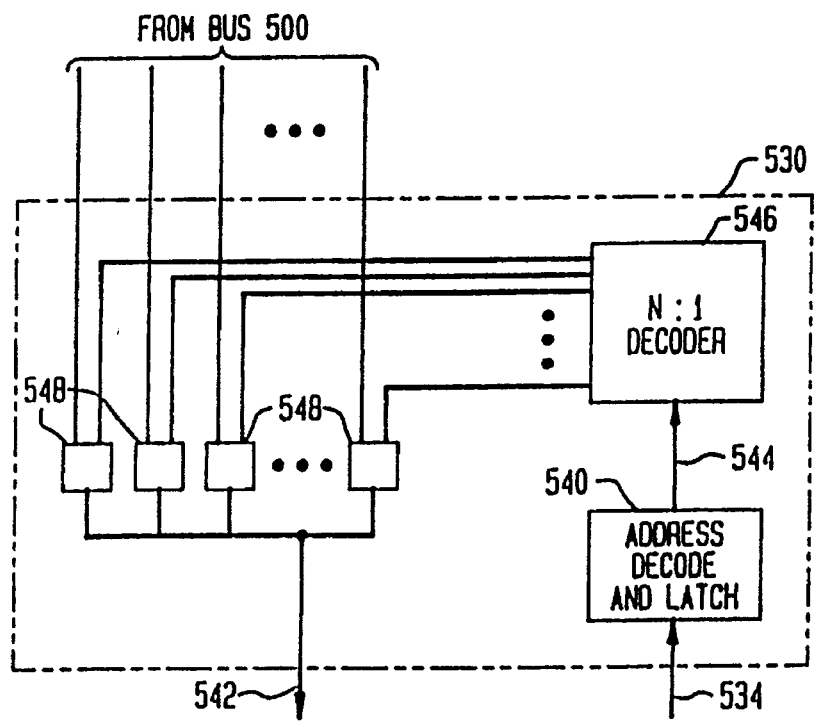
FIG. 17 illustrates a detailed electrical diagram of a cross-point array circuitry shown in FIG. 16.

Referring now to FIG. 17, each cross-point circuit array 530, 532, receives the control signals over lines 534. The arrays 530, 532 function substantially identically, and only array 530 shall be described in detail. If the address on the control lines matches the address present in an address decode and latch circuitry 540, the circuitry 540 latches and stores the signals input over lines 534. Those signals designate the bus line which is to be connected to the output line(s) of the array, for example to line 542. The output of the address decode and latch circuitry 540, over lines 544, represents the instruction portion of the control data and acts to control an N:I decoding circuit 546. Decoding circuit 546 provides an enabling output over one of its "N" output lines corresponding to the instruction input over lines 544.

Each output line of the decoder 546 actuates one of a plurality of switch elements 548 to a pass through state. Each switch element 548 is a gate controlled analog switch which in one state (the actuated state) passes the signal on its analog input line and in its other state blocks that signal. The outputs of the switches 548 have a common connection to the output line 542 of the array. Thus, a selected one of the bus input lines can be provided to the output line 542. The operation of circuitry 532 is substantially identical to that of circuitry 530 with the exception that two groups of switch elements 548 and two corresponding decoders 546 are provided, one for each channel of audio being provided to the video tape recorders. Correspondingly, the address decode and latch circuitry of circuitry 532 can have additional latch registers to store the data which designate the switch(es) of the switch arrays to be actuated.

With respect to routing elements not connected to one of the VTR's 14,16, 18 and 20, a single interface element 268' has therein sufficient output capability to address and control each of the remaining routing circuits. Thus, referring now to FIG. 14, the interface 268' is similar to a modified VTR interface, such as interface 24'; however, its processor 300 is capable of receiving address and instruction data relating to several routing circuits and of directing that data to routing control circuitry 510 to provide over lines 505 address and instruction data signals for controlling the routing circuits 502e–502s. The interface 268' thus corresponds to the interface of FIG. 15 except that the circuitry 510 connects no longer to a single cross-point routing switch array circuit but to a plurality of them. Similarly, as noted above, the control processor 300 receives data from the controller 22 relating no longer to one routing circuit but to a plurality of routing circuits. The output of the circuitry 510 has both address and data information. The address information addresses a particular routing circuit 502e–502s; and the addressed routing circuit then latches within it, using the latches of elements 540, the data which designates the connection between the bus 500 and the associated operating station.

As noted above, the routing bus 500 has both video and audio channels therein. The video portion of the channel, designated 500a, and the audio portion of the channel, designated 500b, together comprise a single multiwire channel, preferably a two hundred line flat wire bus which connects to each of the routing circuits 502. Thus, in accordance with this second embodiment of the routing system, each operating station can receive the video and audio available on any one of the channels of the bus.

Figure 18:
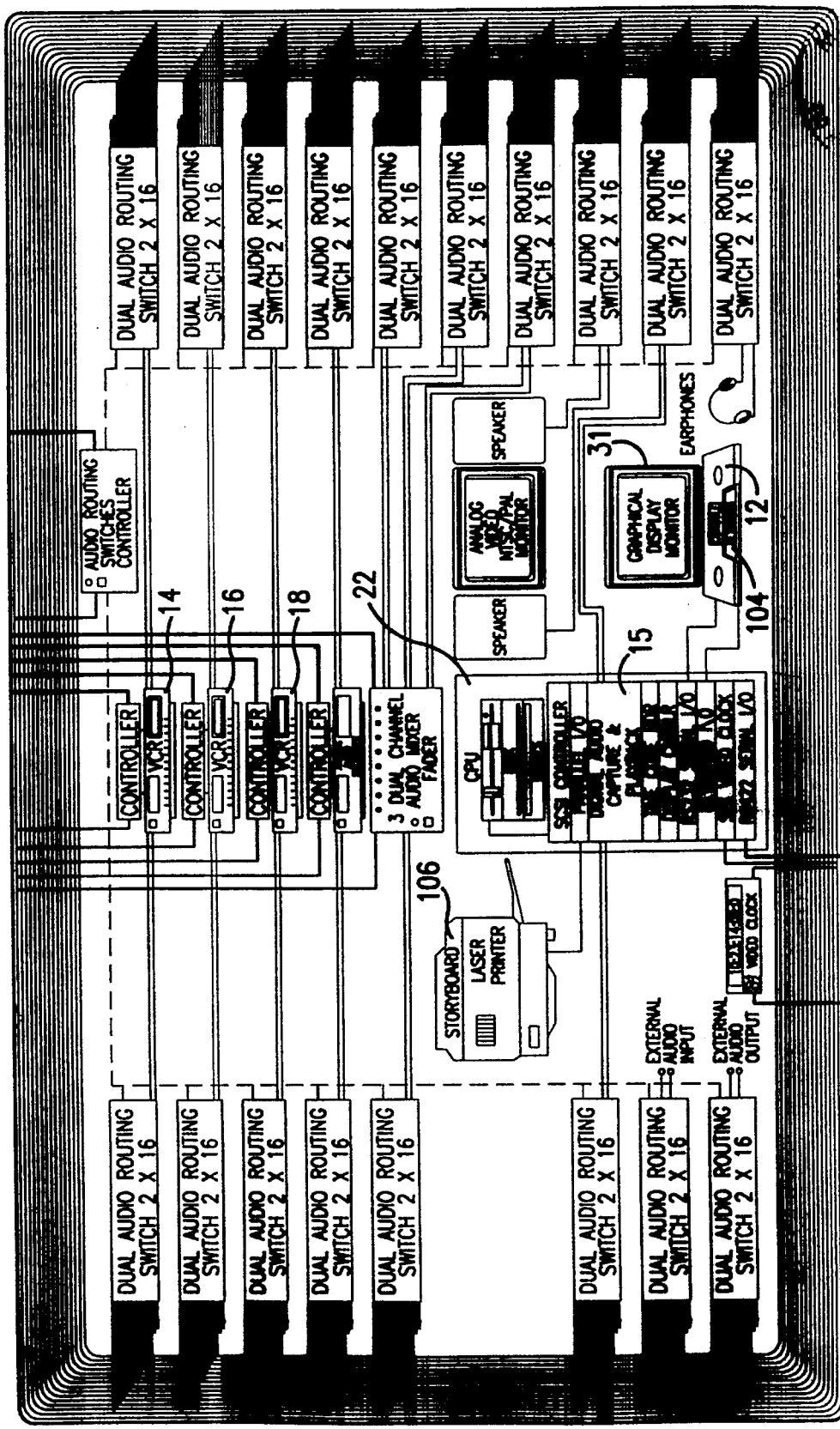
FIG. 18 illustrates a schematic block diagram of another routing circuitry to a system including both analog and digital storage and playback capability for audio.
Figure 19:
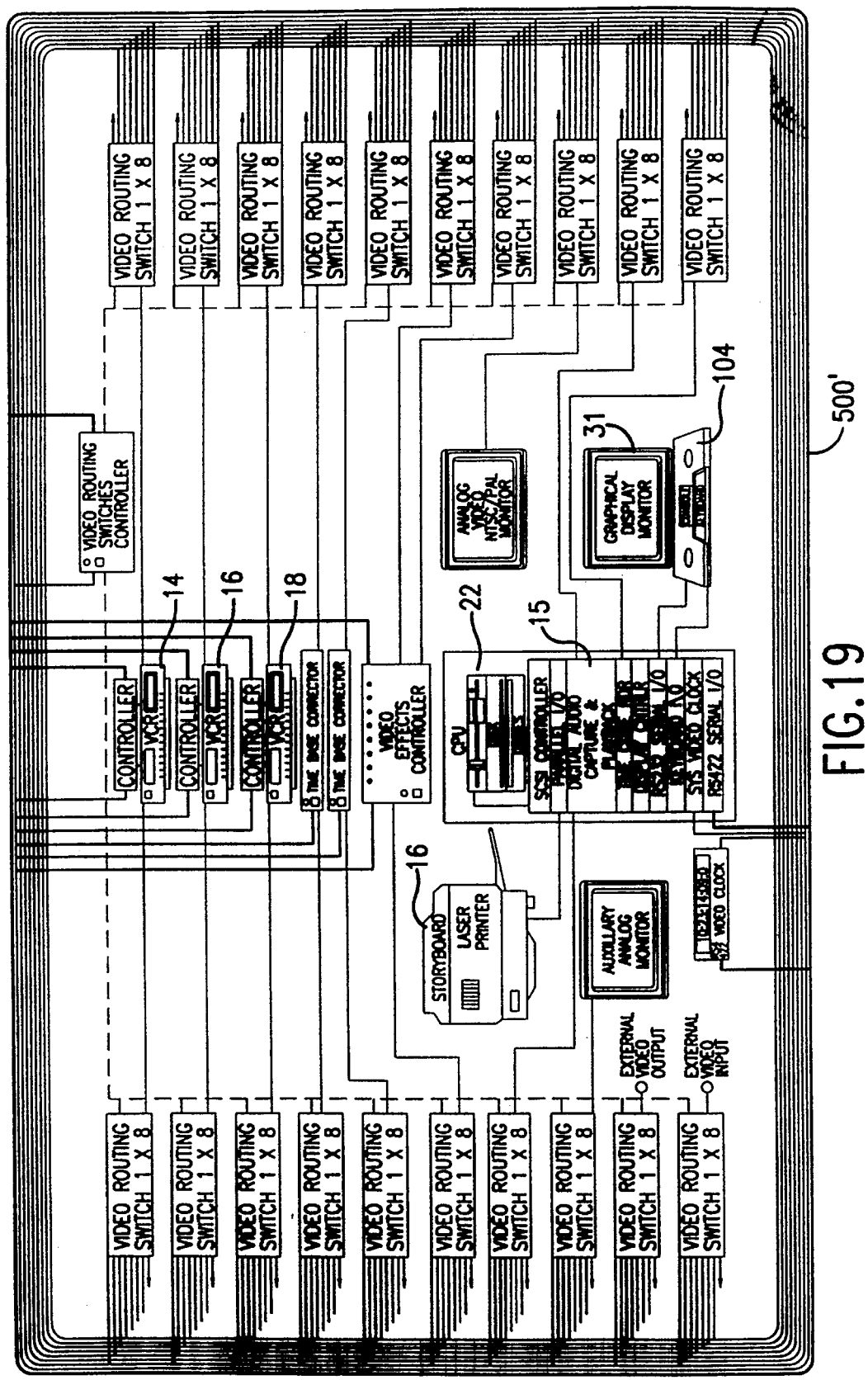
FIG. 19 illustrates a substantially similar schematic as that shown in FIG. 1B relating to video rather than audio.

Referring to FIGS. 18 and 19, there are shown block diagrams according to another preferred embodiment of the invention which includes both serial (analog) and random access (digital) storage and playback capability for video and stereo audio. The CPU 22, graphics display 31, console 12, keyboard. 104, VTRs 14, 16, 18, 20 and random access storage means 15 are common to the opertion of both the audio subsystem of FIG. 18 and the video subsystem of FIG. 19. The routing buses, as shown, handle the assignment of the both inputs and outputs via the bus paths acting as assignable modes. Both subsystems have an outermost RS422 control bus 500' by which the computer 22 sends commands and receives status from all the external devices within its domain. The next inner most bus on both systems, contains the common clock signal by which all events are synchronized, similar to the embodiment of FIG. 14. The remainder of the bus paths are arbitrarily assignable video and audio connection modes for their respective subsystems.

The video composing method and apparatus described herein provide the user with great flexibility in manipulating and editing the video source material. The assembled material can be collected from many sources, in any order, for assembly and editing to form a finished program. Furthermore, after assembling his story, the user can go back and further edit the shots and scenes as required. He can resequence scenes and shots, adjust their length, or the transitions therebetween, just as he had done during a previous composing session. This recomposition process can continue with as many iterations as required without any loss of flexibility until the assembled material is satisfactory.

It is also important to realize that even though one considers the editing process as the editing of the source material, the source material is typically not disturbed after recording on the composing apparatus VTR's. Instead, it is the label pair representations, and not the segments, which are moved, changed, etc.; and it is the storage of the labels as PAIRS of IMAGES which further provides great flexibility and power to the apparatus.

Since the composition process always has available unmodified copies of the source material as its reference, rather than second or third generation partially composed material, the editor/operator can always reinsert shots or scenes previously deleted or add completely new shots from the original source material or, from direct video input ports by receiving signals from external devices such as video cameras or remote feeds. The editor can even compose multiple versions of the same story using a single set of source materials (and the plural program bins) and decide at a later time which one to use for final release.

When the composition is complete, the apparatus and method will produce a complete program package for news and/or an edit confirmation list in machine readable form (for programs) that can be used by conventional computer controlled on-line editing systems. This implementation can be accomplished with remote autoconfirmation with little or no operator intervention. In the illustrated embodiment, the system will also drive ¾, 1, and 2 inch tape transports directly as external interfaces, through interface 124, under the control of controller 22, to provide full on-line editing capability.

The invention illustratively disclosed herein suitably may be practiced in the absence of any element or step which is not specifically disclosed herein.

While there have been described herein what are at present considered to be preferred embodiments of the invention, it will be understood that various modifications may be made therein without departing from the spirit and scope of the invention. The scope of the invention is indicated by the appended claims rather than by the foregoing description.

I claim:

1. Apparatus for composing image source material stored on at least one image storage medium, said source material being composed of a sequence of stored fields representing a time sequential visual image, sequences of said fields being associated to form a visual segment, said apparatus comprising:

an active pictorial display means for providing a temporal pictorial presentation of a selected segment, designated the current segment;

a plurality of passive pictorial display means, each for providing a visual presentation of a selected field of a sequence of fields forming said visual segment, each said selected field thereby labeling one said visual segment;

said passive pictorial display means being arranged in a plurality of ordered arrays, each said ordered array providing a visual presentation of a temporal snapshot representation of a plurality of related visual segments;

a plurality of storage memories;

operator control means; and a composing control means operative with said medium and said operator control means, said composing control means comprising:

means responsive to said operator control means for repeatedly selecting among said sequences of fields for editing said sequences, a last selected sequence being the segment designated the current segment;

means for repetitively providing said active display means with electrical signals from said at least one storage medium pictorially representing said current segment in a repeating display;

means for selectively supplying each said passive display means with electrical data signals representing a selected one of a sequence of labeling fields;

means for associating with each said current segment at least one current label field;

means for maintaining a record of the sequence of current segments;

wherein said active display means and said passive display means comprise a plurality of display window on a monitor screen; and means for displaying said active display and said passive display windows substantially concurrently on the monitor screen.

2. The composing apparatus according to claim 1 wherein said control means further comprises means for manipulating the label fields representing said visual segments for forming a composed medium representation.

3. The composing apparatus of claim 1 wherein each said ordered array comprises:

an ordered plurality of pictorial display means pairs, each pair having a first display window for providing a visual presentation of a beginning label and a second display window for providing a visual presentation of an ending label, each said pair of beginning and ending labels being associated with a segment of the sequence of the current segments; and said repetitively providing means further comprising means for selecting a segment corresponding to a selected label for display by said active display means.

4. The composing apparatus of claim 1 further comprising:

an operator console having the monitor screen thereon;

said active display means being adapted to provide at least one display window on said monitor screen of said console;

each said passive display means being adapted to provide a plurality of display windows on said monitor screen of said console, all said windows being positioned in said plurality of ordered arrays, said selectively supplying means being further adapted to provide each said ordered array with electrical signals representing a sequence of pictorial labels, and said passive display means further comprising a display interface for receiving instructions from said composing control means and video data representing the pictorial labels and for effecting an ordered pictorial presentation of said pictorial labels on said window of each said ordered array, whereby the display on said windows of each said ordered array provides in effect a temporal snapshot representation of a sequence of said visual segments.

5. The composing apparatus of claim 4, further including means for associating any of said stored fields with stored text material; and switch means for selectively displaying said text material on said passive display windows.

6. The composing apparatus of claim 1, wherein:

each said ordered array provides a visual representation of a different temporal snapshot representation; and one said temporal snapshot representation is associated with said current segment presented by said active display means.

7. The composing apparatus of claim 6, wherein:

said composing control means further includes means for selecting which temporal snapshot representation is associated with said active display means.

8. The composing apparatus of claim 1, further including:

means, associated with said operator control means, for selecting a size of said ordered array of said passive pictorial display means for display.

9. The composing apparatus of claim 3, further including:

a monitor; and means associated with said operator control means, for selectively controlling the number of said pictorial display means pairs which are substantially concurrently displayed on said monitor.

10. The composing apparatus of claim 1, further including:

means for selectively configuring the monitor screen for display of said active display means and said passive display means substantially concurrently.

11. The composing apparatus of claim 9, wherein:

said pictorial display pair control means includes means for selectively configuring a display of said active display means and said passive display means on said monitor.

12. The composing apparatus as recited in claim 10, wherein:

said configuring means comprises a means for selectively controlling a display of the monitor screen so as to selectively place said active display window and said passive display windows on the monitor screen.

13. The composing apparatus as recited in claim 1, further including:

a means for selectively controlling the size of said active display window and said passive display windows.

14. An apparatus as recited in claim 1, wherein:

said at least one storage medium comprises a random access storage medium.

15. An apparatus as recited in claim 14, wherein:

said random access storage medium is selected from the group consisting of a Winchester hard disk, an analog video disk, a laser read/write disk, a large computer RAM, a bubble memory, and a crystal memory.

* * * * *

Disclaimer 5,517,320 — Chester L. Schuler, Sudbury, Mass. ANALOG/DIGITAL VIDEO AND AUDIO PICTURE COMPOSITION APPARATUS AND METHOD FOR VIDEO COMPOSITIONS. Patent dated May 14, 1996. Disclaimer filed Mar. 21, 2002, by the assignee, LEX Computer and Management Corporation.

Hereby enters this disclaimer to all claims, of said patent.

*(Official Gazette, May 6, 2003)*